US012694787B2

(12) United States Patent
Jha et al.

(10) Patent No.: US 12,694,787 B2
(45) Date of Patent: Jul. 28, 2026

(54) GENERATION AND TRANSMISSION OF VULNERABLE ROAD USER AWARENESS MESSAGES

(71) Applicant: Intel Corporation, Santa Clara, CA (US)

(72) Inventors: Satish C. Jha, Portland, OR (US); Kathiravetpillai Sivanesan, Portland, OR (US); Vesh Raj Sharma Banjade, Portland, OR (US); Leonardo Gomes Baltar, Munich (DE)

(73) Assignee: Intel Corporation, Santa Clara, CA (US)

( * ) Notice: Subject to any disclaimer, the term of this patent is extended or adjusted under 35 U.S.C. 154(b) by 452 days.

(21) Appl. No.: 17/916,731

(22) PCT Filed: May 4, 2021

(86) PCT No.: PCT/US2021/030621
§ 371 (c)(1),
(2) Date: Oct. 3, 2022

(87) PCT Pub. No.: WO2021/226059
PCT Pub. Date: Nov. 11, 2021

(65) Prior Publication Data

US 2023/0298468 A1 Sep. 21, 2023

Related U.S. Application Data

(60) Provisional application No. 63/033,576, filed on Jun. 2, 2020, provisional application No. 63/019,911, filed
(Continued)

(51) Int. Cl.
*G08G 1/16* (2006.01)
*G08G 1/09* (2006.01)

(52) U.S. Cl.
CPC ............ *G08G 1/164* (2013.01); *G08G 1/092* (2013.01)

(58) Field of Classification Search
CPC .............................. G08G 1/164; G08G 1/092
(Continued)

(56) References Cited

U.S. PATENT DOCUMENTS 8,922,391 B2 12/2014 Rubin et al.
10,235,882 B1 3/2019 Aoude et al.
(Continued)

FOREIGN PATENT DOCUMENTS

JP 2015032312 A 2/2015
JP 2017156844 A 9/2017
(Continued)

OTHER PUBLICATIONS

International Search Report and Written Opinion mailed Aug. 20, 2021 for International Patent Application No. PCT/US2021/030621, 13 pages.
(Continued)

*Primary Examiner* — Mahmoud S Ismail
(74) *Attorney, Agent, or Firm* — Schwabe, Williamson & Wyatt, P.C.

(57) ABSTRACT

The present disclosure is related to Intelligent Transport Systems (ITS), and in particular, to Vulnerable Road User (VRU) basic services (VBS) of a VRU ITS Station (ITS-S). Different arrangements and configurations of the VBS within the facilities layer of an ITS-S are described. Also described are different rules and/or conditions for VRU Awareness Message (VAM) formats, VAM generation and coding, and VAM dissemination.

29 Claims, 11 Drawing Sheets

Related U.S. Application Data on May 4, 2020, provisional application No. 63/019,903, filed on May 4, 2020.

(58) Field of Classification Search
USPC .......................................................... 701/117
See application file for complete search history.

(56) References Cited

U.S. PATENT DOCUMENTS

| | | | | |
|---|---|---|---|---|
| 2013/0278440 | A1* | 10/2013 | Rubin .............. | G08G 1/096791 340/903 |
| 2016/0381538 | A1* | 12/2016 | Tan ....................... | H04W 4/027 455/404.2 |
| 2018/0096605 | A1* | 4/2018 | Bai ........................ | B60Q 1/525 |
| 2018/0132208 | A1 | 5/2018 | Pan et al. | |
| 2018/0342154 | A1 | 11/2018 | Lee et al. | |
| 2021/0256321 | A1* | 8/2021 | Gerardo Castro ...... | G06F 18/23 |
| 2021/0311183 | A1* | 10/2021 | Marsh ................... | G01S 13/931 |
| 2022/0248382 | A1* | 8/2022 | Dinan ................... | H04W 72/23 |

FOREIGN PATENT DOCUMENTS

| | | | |
|---|---|---|---|
| KR | 20170008703 | A | 1/2017 |
| WO | 2021118675 | A1 | 6/2021 |

OTHER PUBLICATIONS

ETSI, "Intelligent Transport Systems (ITS); Vulnerable Road Users (VRU) awareness; Part 3: Specification of VRU awareness basic service; Release 2", ETSI TS 103 300-3 V2.1.2 (Apr. 2021) [online], Apr. 2021 [retrieved on Jul. 14, 2021], Retrieved from the Internet: <URL: https://www.etsi.org/deliver/etsi_ts/103300_103399/10330003/02.01.02_60/ts_10330003v020102p.pdf>.

Office Action issued May 7, 2025 for JP Application No. 2022-559420 and Machine-Translation, 38 pages.

Extended European Search Report issued Apr. 24, 2024 for EP Application No. 21799974.7, 14 pages.

SAE International, "Surface Vehicle: Recommended Practice; J2945.9 Vulnerable Road User Safety Message Minimum Performance Requirements", 2015, 26 pages.

ETSI, "Intelligent Transport Systems (ITS); Vehicular Communications; Basic Set of Applications; Part 2: Specification of Cooperative Awareness Basic Service", ETSI EN 302 637-2 V1.4.1 (Apr. 2019), 45 pages.

ETSI, "Intelligent Transport Systems (ITS); Vulnerable Road Users (VRU) Awareness, Part 3: Specification of VRU Awareness Basic Service; Release 2", ETSI TS 103 300-3 V0.1.1 (Mar. 2020), 38 pages.

ETSI, "Intelligent Transport Systems (ITS); Vulnerable Road Users (VRU) Awareness, Part 2: Functional Architecture and Requirements Definition; Release 2", ETSI TS 103 300-2 V0.4.3 (Mar. 2020), 75 pages.

Office Action issued Dec. 2, 2025 for JP Application No. 2022-559420 and Machine-Translation, 6 pages.

Notice of Grant issued Apr. 28, 2026 for JP Application No. 2022-559420 with Machine Translation, 2 pages.

Notice of Preliminary Rejection issued May 21, 2026 for KR Application No. 2022-7034535 with Machine Translation, 16 pages.

* cited by examiner

GENERATION AND TRANSMISSION OF VULNERABLE ROAD USER AWARENESS MESSAGES

RELATED APPLICATIONS

The present application is a national phase entry under 37 U.S.C. § 371 of Int'l App. No. PCT/US2021/030621, filed May 4, 2021 which designated, among various States, the United States of America and which claims priority to U.S. Provisional App. No. 63/019,903 filed May 4, 2020 (AC9632-Z), U.S. Provisional App. No. 63/019,911 filed May 4, 2020 (AC9208-Z), and U.S. Provisional App. No. 63/033,576 filed Jun. 2, 2020 (AD0302-Z), the contents of each of which are hereby incorporated by reference in their entireties and for all purposes.

TECHNICAL FIELD

The present disclosure described herein generally relate to edge computing, network communication, and communication system implementations, and in particular, to connected and computer-assisted (CA)/autonomous driving (AD) vehicles, Internet of Vehicles (IoV), Internet of Things (IoT) technologies, and Intelligent Transportation Systems.

BACKGROUND

Intelligent Transport Systems (ITS) comprise advanced applications and services related to different modes of transportation and traffic to enable an increase in traffic safety and efficiency, and to reduce emissions and fuel consumption. Various forms of wireless communications and/or Radio Access Technologies (RATs) may be used for ITS. These RATs may need to coexist in one or more communication channels, such as those available in the 5.9 Gigahertz (GHz) band.

Cooperative Intelligent Transport Systems (C-ITS) have been developed to enable an increase in traffic safety and efficiency, and to reduce emissions and fuel consumption. The initial focus of C-ITS was on road traffic safety and especially on vehicle safety. Recent efforts are being made to increase traffic safety and efficiency for vulnerable road users (VRUs), which refers to both physical entities (e.g., pedestrians) and/or user devices (e.g., mobile stations, and/or the like) used by physical entities. Regulation (EU) No 168/2013 of the European Parliament and of the Council of 15 Jan. 2013 on the approval and market surveillance of two- or three-wheel vehicles and quadricycles ("EU regulation 168/2013") provides various examples of VRUs. Computer-assisted and/or autonomous driving (AD) vehicles ("CA/AD vehicles") are expected to reduce VRU-related injuries and fatalities by eliminating or reducing human-error in operating vehicles. However, to date CA/AD vehicles can do very little about detection, let alone correction of the human-error at VRUs' end, even though it is equipped with a sophisticated sensing technology suite, as well as computing and mapping technologies.

BRIEF DESCRIPTION OF THE DRAWINGS

In the drawings, which are not necessarily drawn to scale, like numerals may describe similar components in different views. Like numerals having different letter suffixes may represent different instances of similar components. The description is illustrated without limitation, in the figures of the accompanying drawings in which.

DETAILED DESCRIPTION

Figure 1:
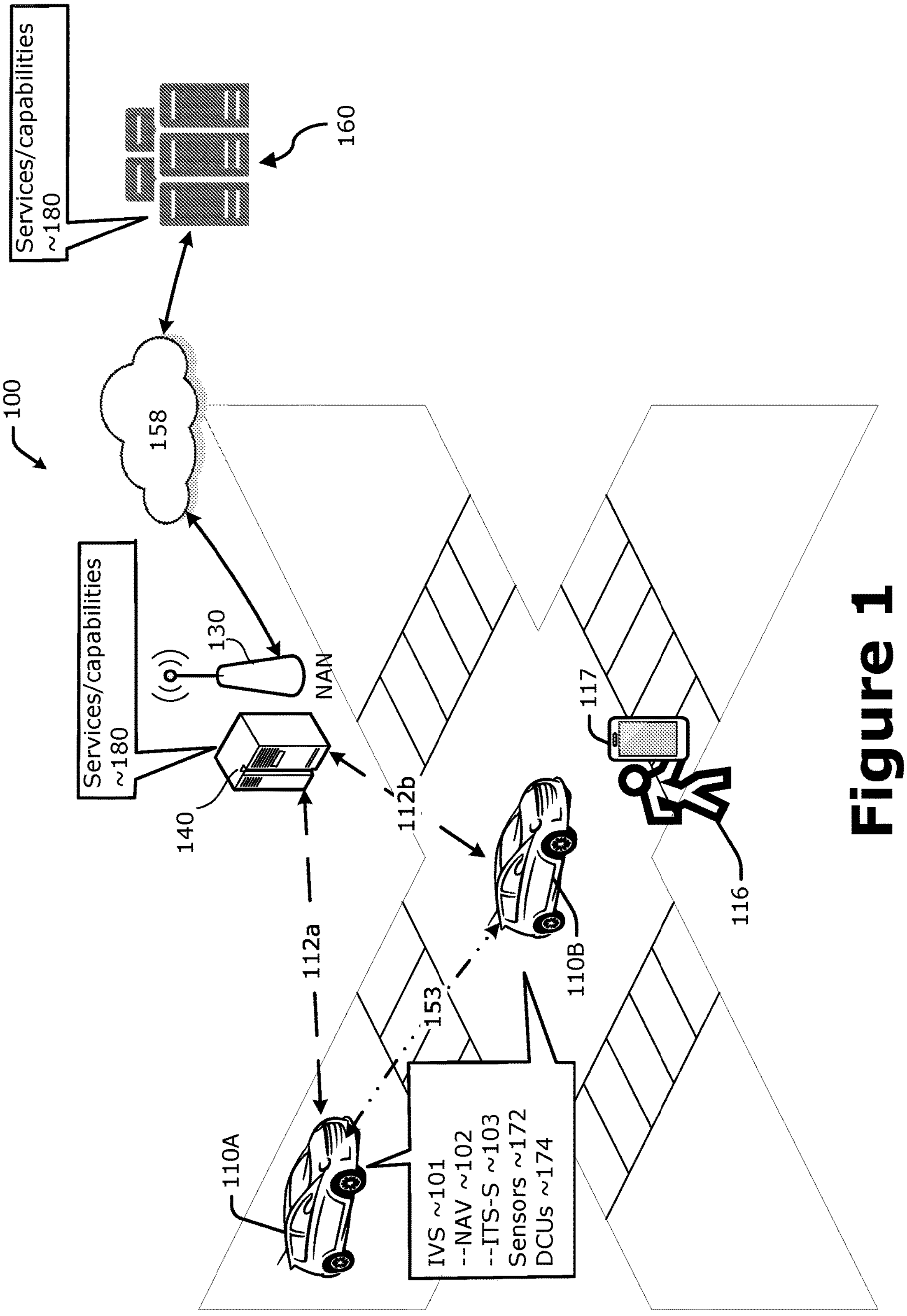
FIG. 1 illustrates an operative arrangement.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, and/or the like in order to provide a thorough understanding.

The operation and control of vehicles is becoming more autonomous over time, and most vehicles will likely become fully autonomous in the future. Vehicles that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), and/or other like self-learning systems to enable autonomous operation. Typically, these systems perceive their environment (e.g., using sensor data) and perform various actions to maximize the likelihood of successful vehicle operation.

Vehicle-to-Everything (V2X) applications (referred to simply as "V2X") include the following types of communications Vehicle-to-Vehicle (V2V), Vehicle-to-Infrastructure (V2I) and/or Infrastructure-to-Vehicle (I2V), Vehicle-to-Network (V2N) and/or network-to-vehicle (N2V), Vehicle-to-Pedestrian communications (V2P), and ITS station (ITS-S) to ITS-S communication (X2X). V2X can use co-operative awareness to provide more intelligent services for end-users. This means that entities, such as vehicle stations or vehicle user equipment (vUEs) including such as CA/AD vehicles, roadside infrastructure or roadside units (RSUs), application servers, and pedestrian devices (e.g., smartphones, tablets, and/or the like), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like.

One such V2X application include Intelligent Transport Systems (ITS), which are systems to support transportation of goods and humans with information and communication technologies in order to efficiently and safely use the transport infrastructure and transport means (e.g., automobiles, trains, aircraft, watercraft, and/or the like). Elements of ITS are standardized in various standardization organizations, both on an international level and on regional levels.

Communications in ITS (ITSC) may utilize a variety of existing and new access technologies (or radio access technologies (RAT)) and ITS applications. Examples of these V2X RATs include Institute of Electrical and Electronics Engineers (IEEE) RATs and Third Generation Partnership (3GPP) RATs. The IEEE V2X RATs include, for example, Wireless Access in Vehicular Environments (WAVE), Dedicated Short Range Communication (DSRC), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes the IEEE 802.16 protocol referred to as Worldwide Interoperability for Microwave Access (WiMAX). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The 3GPP V2X RATs include, for example, cellular V2X (C-V2X) using Long Term Evolution (LTE) technologies (sometimes referred to as "LTE-V2X") and/or using Fifth Generation (5G) technologies (sometimes referred to as "5G-V2X" or "NR-V2X"). Other RATs may be used for ITS and/or V2X applications such as RATs using UHF and VHF frequencies, Global System for Mobile Communications (GSM), and/or other wireless communication technologies.

1. Vulnerable Road Users (VRUs)

FIG. 1 illustrates an overview of an environment 100. As shown, environment includes vehicles 110A and 10B (collectively "vehicle 110"). Vehicles 110 includes an engine, transmission, axles, wheels and so forth (not shown). The vehicles 110 may be any type of motorized vehicles used for transportation of people or goods, each of which are equipped with an engine, transmission, axles, wheels, as well as control systems used for driving, parking, passenger comfort and/or safety, and/or the like. The terms "motor", "motorized", and/or the like as used herein refer to devices that convert one form of energy into mechanical energy, and include internal combustion engines (ICE), compression combustion engines (CCE), electric motors, and hybrids (e.g., including an ICE/CCE and electric motor(s)). The plurality of vehicles 110 shown by FIG. 1 may represent motor vehicles of varying makes, models, trim, and/or the like.

For illustrative purposes, the following description is provided for deployment scenarios including vehicles 110 in a 2D freeway/highway/roadway environment wherein the vehicles 110 are automobiles. However, also it can be applicable to other types of vehicles, such as trucks, busses, motorboats, motorcycles, electric personal transporters, and/or any other motorized devices capable of transporting people or goods. Also, it can be applicable to social networking between vehicles of different vehicle types and 3D deployment scenarios where some or all of the vehicles 110 are implemented as flying objects, such as aircraft, drones, UAVs, and/or to any other like motorized devices.

The vehicles 110 include in-vehicle systems (IVS) 101, which are discussed in more detail infra. However, the vehicles 110 could include additional or alternative types of computing devices/systems such as smartphones, tablets, wearables, laptops, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, microcontroller, control module, engine management system, and the like that may be operable. Vehicles 110 including a computing system (e.g., IVS 101) as well as the vehicles referenced throughout the present disclosure, may be referred to as vehicle user equipment (vUE) 110, vehicle stations 110, vehicle ITS stations (V-ITS-S) 110, computer assisted (CA)/autonomous driving (AD) vehicles 110, and/or the like.

Each vehicle 110 includes an in-vehicle system (IVS) 101, one or more sensors 172, and one or more driving control units (DCUs) 174. The IVS 100 includes a number of vehicle computing hardware subsystems and/or applications including, for example, various hardware and software elements to implement the ITS architecture of FIG. 2. The vehicles 110 may employ one or more V2X RATs, which allow the vehicles 110 to communicate directly with one another and with infrastructure equipment (e.g., network access node (NAN) 130). The V2X RATs may refer to 3GPP cellular V2X RAT (e.g., LTE, 5G/NR, and beyond), a WLAN V2X (W-V2X) RAT (e.g., DSRC in the USA or ITS-G5 in the EU), and/or some other RAT such as those discussed herein. Some or all of the vehicles 110 include positioning circuitry to (coarsely) determine their respective geolocations and communicate their current position with the NAN 130 in a secure and reliable manner. This allows the vehicles 110 to synchronize with one another and/or the NAN 130. Additionally, some or all of the vehicles 110 may be computer-assisted or autonomous driving (CA/AD) vehicles, which may include artificial intelligence (AI) and/or robotics to assist vehicle operation.

Figure 6:
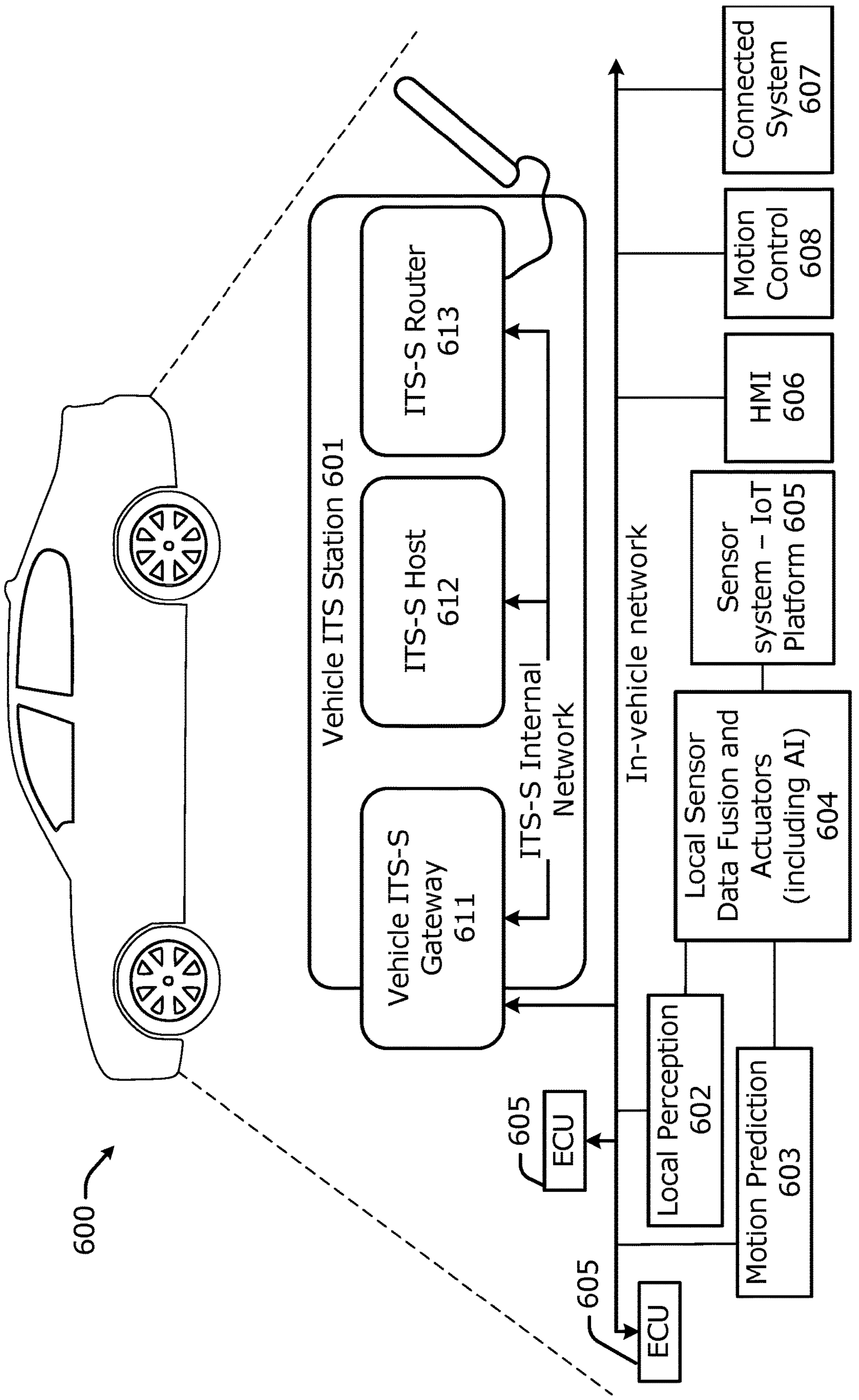
FIG. 6 depicts a vehicle ITS station (V-ITS-S) in a vehicle system.

The IVS 101 includes the ITS-S 103, which may be the same or similar to the ITS-S 601 of FIG. 6. The IVS 101 may be, or may include, Upgradeable Vehicular Compute Systems (UVCS) such as those discussed infra. As discussed herein, the ITS-S 1 103 (or the underlying V2X RAT circuitry on which the ITS-S 103 operates) is capable of performing a channel sensing or medium sensing operation, which utilizes at least energy detection (ED) to determine the presence or absence of other signals on a channel in order to determine if a channel is occupied or clear. ED may include sensing radiofrequency (RF) energy across an intended transmission band, spectrum, or channel for a period of time and comparing the sensed RF energy to a predefined or configured threshold. When the sensed RF energy is above the threshold, the intended transmission band, spectrum, or channel may be considered to be occupied.

Except for the UVCS technology of the present disclosure, IVS 101 and CA/AD vehicle 110 otherwise may be any one of a number of in-vehicle systems and CA/AD vehicles, from computer-assisted to partially or fully autonomous vehicles. Additionally, the IVS 101 and CA/AD vehicle 110 may include other components/subsystems not shown by FIG. 1 such as the elements shown and described throughout the present disclosure. These and other aspects of the underlying UVCS technology used to implement IVS 101 will be further described with references to remaining FIGS. 2-8.

In addition to the functionality discussed herein, the ITS-S 601 (or the underlying V2X RAT circuitry on which the ITS-S 601 operates) is capable of measuring various signals or determining/identifying various signal/channel characteristics. Signal measurement may be performed for cell selection, handover, network attachment, testing, and/or other purposes. The measurements/characteristics collected by the ITS-S 601 (or V2X RAT circuitry) may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate (PLR), packet reception rate (PRR), Channel Busy Ratio (CBR), Channel occupancy Ratio (CR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 130 reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0 (2019-09), 3GPP TS 38.215 v16.1.0 (2020-04), IEEE 802.11, Part 11: "Wireless LAN Medium Access Control (MAC) and Physical Layer (PHY) specifications, IEEE Std.", and/or the like. The same or similar measurements may be measured or collected by the NAN 130.

The subsystems/applications may also include instrument cluster subsystems, front-seat and/or back-seat infotainment subsystems and/or other like media subsystems, a navigation subsystem (NAV) 102, a vehicle status subsystem/application, a HUD subsystem, an EMA subsystem, and so forth. The NAV 102 may be configurable or operable to provide navigation guidance or control, depending on whether vehicle 110 is a computer-assisted vehicle, partially or fully autonomous driving vehicle. NAV 102 may be configured with computer vision to recognize stationary or moving objects (e.g., a pedestrian, another vehicle, or some other moving object) in an area surrounding vehicle 110, as it travels enroute to its destination. The NAV 102 may be configurable or operable to recognize stationary or moving objects in the area surrounding vehicle 110, and in response, make its decision in guiding or controlling DCUs of vehicle 110, based at least in part on sensor data collected by sensors 172.

The DCUs 174 include hardware elements that control various systems of the vehicles 110, such as the operation of the engine, the transmission, steering, braking, and/or the like. DCUs 174 are embedded systems or other like computer devices that control a corresponding system of a vehicle 110. The DCUs 174 may each have the same or similar components as devices/systems of FIG. 174 discussed infra, or may be some other suitable microcontroller or other like processor device, memory device(s), communications interfaces, and the like. Individual DCUs 174 are capable of communicating with one or more sensors 172 and actuators (e.g., actuators 174 of FIG. 12). The sensors 172 are hardware elements configurable or operable to detect an environment surrounding the vehicles 110 and/or changes in the environment. The sensors 172 are configurable or operable to provide various sensor data to the DCUs 174 and/or one or more AI agents to enable the DCUs 174 and/or one or more AI agents to control respective control systems of the vehicles 110. Some or all of the sensors 172 may be the same or similar as the sensor circuitry 1272 of FIG. 1. The IVS 101 may include or implement a facilities layer and operate one or more facilities within the facilities layer.

IVS 101, on its own or in response to user interactions, communicates or interacts with one or more vehicles 110 via interface 153, which may be, for example, 3GPP-based direct links or IEEE-based direct links. The 3GPP (e.g., LTE or 5G/NR) direct links may be sidelinks, Proximity Services (ProSe) links, and/or PC5 interfaces/links, IEEE (WiFi) based direct links or a personal area network (PAN) based links may be, for example, WiFi-direct links, IEEE 802.11p links, IEEE 802.11bd links, IEEE 802.15.4 links (e.g., ZigBee, IPv6 over Low power Wireless Personal Area Networks (6LoWPAN), WirelessHART, MiWi, Thread, and/or the like). Other technologies could be used, such as Bluetooth/Bluetooth Low Energy (BLE) or the like. The vehicles 110 may exchange ITS protocol data units (PDUs) or other messages with one another over the interface 153.

IVS 101, on its own or in response to user interactions, communicates or interacts with one or more remote/cloud servers 160 via NAN 130 over interface 112 and over network 158. The NAN 130 is arranged to provide network connectivity to the vehicles 110 via respective interfaces 112 between the NAN 130 and the individual vehicles 110. The NAN 130 is, or includes, an ITS-S, and may be a roadside ITS-S(R-ITS-S). The NAN 130 is a network element that is part of an access network that provides network connectivity to the end-user devices (e.g., V-ITS-Ss 110 and/or VRU ITS-Ss 117). The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some implementations, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. The CRAN, CR, or vBBUP may implement a RAN function split, wherein one or more communication protocol layers are operated by the CRAN/CR/vBBUP and other communication protocol entities are operated by individual RAN nodes 130. This virtualized framework allows the freed-up processor cores of the NAN 130 to perform other virtualized applications, such as virtualized applications for the VRU 116 and/or V-ITS-S 110 as discussed herein.

Environment 100 also includes VRU 116, which includes a VRU ITS-S 117. The VRU 116 is a non-motorized road users as well as L class of vehicles (e.g., mopeds, motorcycles, Segways, and/or the like), as defined in Annex I of EU regulation 168/2013 (see e.g., International Organization for Standardization (ISO) D., "Road vehicles—Vehicle dynamics and road-holding ability—Vocabulary", ISO 8855 (2013) (hereinafter "[ISO8855]")). A VRU 116 is an actor that interacts with a VRU system 117 in a given use case and behavior scenario. For example, if the VRU 116 is equipped with a personal device, then the VRU 116 can directly interact via the personal device with other ITS-Stations and/or other VRUs 116 having VRU devices 117. The VRU ITS-S 117 could be either pedestrian-type VRU (see e.g., P-ITS-S 701 of FIG. 7) or vehicle-type (on bicycle, motorbike) VRU. The term "VRU ITS-S" as used herein refers to any type of VRU device or VRU system. Before the potential VRU 116 can even be identified as a VRU 116, it may be referred to as a non-VRU and considered to be in IDLE state or inactive state in the ITS.

If the VRU 116 is not equipped with a device, then the VRU 116 interacts indirectly, as the VRU 116 is detected by another ITS-Station in the VRU system 117 via its sensing devices such as sensors and/or other components. However, such VRUs 116 cannot detect other VRUs 116 (e.g., a bicycle). In ETSI TS 103 300-2 V0.3.0 (2019-12) ("[TS103300-2]"), the different types of VRUs 116 have been categorized into the following four profiles: VRU Profile-1: Pedestrians (pavement users, children, pram, disabled persons, elderly, and/or the like); VRU Profile-2: Bicyclists (light vehicles carrying persons, wheelchair users, horses carrying riders, skaters, e-scooters, Segways, and/or the like); VRU Profile-3: Motorcyclists (motorbikes, powered two wheelers, mopeds, and/or the like); and VRU Profile-4: Animals posing safety risk to other road users (dogs, wild animals, horses, cows, sheep, and/or the like).

and/or the like) These profiles further define the VRU functional system and communications architectures for VRU ITS-S 117. For robustly supporting the VRU profile awareness enablement, VRU related functional system requirements, protocol and message exchange mechanisms (e.g., VAMs) are discussed in more detail infra. Additionally, the applicable VRU device types are listed in Table 1-1 (see also e.g., [TS103300-2]).

TABLE 1-1

| VRU Type | Description |
|---|---|
| VRU-Tx | VRU device 117 is equipped with transmitter only and can broadcast beacon messages about the VRU 116 |
| VRU-RX | VRU device 117 is equipped with a receiver only and application to receive message from other ITS-Ss and capable of warning/notifying the VRU 116 |
| VRU-St | VRU device 117 contains and ITS-S including both VRU-Tx and VRU-Rx capabilities |

A VRU 116 can be equipped with a portable device (e.g., device 117). The term "VRU" may be used to refer to both a VRU 116 and its VRU device 117 unless the context dictates otherwise. The VRU device 117 may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VRU basic service when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

A "VRU system" (e.g., VRU ITS-S 117) comprises ITS artefacts that are relevant for VRU use cases and scenarios such as those discussed herein, including the primary components and their configuration, the actors and their equipment, relevant traffic situations, and operating environments. The terms "VRU device," "VRU equipment," and "VRU system" refers to a portable device (e.g., mobile stations such as smartphones, tablets, wearable devices, fitness tracker, and/or the like) or an IoT device (e.g., traffic control devices) used by a VRU 116 integrating ITS-S technology, and as such, the VRU ITS-S 117 may include or refer to a "VRU device," "VRU equipment," and/or "VRU system".

The VRU systems considered in the present disclosure are Cooperative Intelligent Transport Systems (C-ITS) that comprise at least one Vulnerable Road User (VRU) and one ITS-Station with a VRU application. The ITS-S can be a Vehicle ITS-Station or a Road side ITS-Station that is processing the VRU application logic based on the services provided by the lower communication layers (Facilities, Networking & Transport and Access layer (see e.g., ETSI EN 302 665 V1.1.1 (2010-09) ("[EN302665]")), related hardware components, other in-station services and sensor sub-systems. A VRU system may be extended with other VRUs, other ITS-S and other road users involved in a scenario such as vehicles, motorcycles, bikes, and pedestrians. VRUs may be equipped with ITS-S or with different technologies (e.g., IoT) that enable them to send or receive an alert. The VRU system considered is thus a heterogeneous system. A definition of a VRU system is used to identify the system components that actively participate in a use case and behavior scenario. The active system components are equipped with ITS-Stations, while all other components are passive and form part of the environment of the VRU system.

The VRU ITS-S 117 may operate one or more VRU applications. A VRU application is an application that extends the awareness of and/or about VRUs and/or VRU clusters in or around other traffic participants. VRU applications can exist in any ITS-S, meaning that VRU applications can be found either in the VRU itself or in non-VRU ITS stations, for example cars, trucks, buses, road-side stations or central stations. These applications aim at providing VRU-relevant information to actors such as humans directly or to automated systems. VRU applications can increase the awareness of vulnerable road users, provide VRU-collision risk warnings to any other road user or trigger an automated action in a vehicle. VRU applications make use of data received from other ITS-Ss via the C-ITS network and may use additional information provided by the ITS-S own sensor systems and other integrated services.

In general, there are four types of VRU equipment 117 including non-equipped VRUs (e.g., a VRU 116 not having a device); VRU-Tx (e.g., a VRU 116 equipped with an ITS-S 117 having only a transmission (Tx) but no reception (Rx) capabilities that broadcasts awareness messages or beacons about the VRU 116); VRU-Rx (e.g., a VRU 116 equipped with an ITS-S 117 having only an Rx (but no Tx) capabilities that receives broadcasted awareness messages or beacons about the other VRUs 116 or other non-VRU ITS-Ss); and VRU-St (e.g., a VRU 116 equipped with an ITS-S 117 that includes the VRU-Tx and VRU-Rx functionality). The use cases and behavior scenarios consider a wide set of configurations of VRU systems 117 based on the equipment of the VRU 116 and the presence or absence of V-ITS-S 110 and/or R-ITS-S 130 with a VRU application. Examples of the various VRU system configurations are shown by table 2 of ETSI TR 103 300-1 v2.1.1 (2019-09) ("[TR103300-1]").

The message specified for VRUs 116/117 is the VRU awareness message (VAM). VAMs are messages transmitted from VRU ITSs 117 to create and maintain awareness of VRUs 116 participating in the VRU/ITS system. VAMs are harmonized in the largest extent with the existing Cooperative Awareness Messages (CAM) defined in [EN302637-2]. The transmission of the VAM is limited to the VRU profiles specified in clause 6.1 of [TS103300-2] The VAMs contain all required data depending on the VRU profile and the actual environmental conditions. The data elements in the VAM should be as described in Table 1-2.

TABLE 1-2

| VAM data elements | |
|---|---|
| Parameter | Comments |
| VAM header including VRU identifier | The VRU ID is a unique identifier of a VRU 116/117 within the coverage region of an ITS-S such as an R-ITS-S 130. |
| VRU position | The VRU position is a unique position, set of coordinates, geolocation, Geo-Area, and/or the like., associated with a VRU's physical location in 2D or 3D plane |
| (VAM) Generation time | A timestamp of VAM generation; the time required for a VAM generation refers to the time difference between time at which a VAM generation is triggered and the time at which the VAM is delivered to the networking & transport layer. |
| VRU Profile | profiles derived from the use cases and analysis in clause 7.2 of [TS103300-1] |
| VRU type | For example, VRU profile is pedestrian, VRU type is infant, animal, adult, child, and/or the like. |
| VRU cluster identifier (ID) | Random and/or locally unique ID of a VRU cluster; locally unique in that it is different from any cluster identifier in a VAM received by the VBS in the last timeClusterUniquenessThreshold time. |
| VRU cluster position | The reference position of a VRU cluster, which refers to a ground position at the center point of the face side of the first VRU bounding box. |
| VRU cluster dimension | geographical size and/or bounding box size |
| VRU cluster size | number of members in the cluster |
| VRU size class | mandatory if outside a VRU cluster, optional if inside a VRU cluster |
| VRU weight class | mandatory if outside a VRU cluster, optional if inside a VRU cluster |
| VRU speed | Velocity of an individual VRU or coherent speed of a VRU cluster; speed in moving direction and/or speed accuracy of the originating ITS-S, |
| VRU direction | Heading and/or heading accuracy of the originating ITS-S with regards to the true north or some other geodetic direction. |
| VRU orientation | The angle of a VRU with respect to its longitudinal axis with regards to WGS84 north or true north. |

TABLE 1-2-continued

| VAM data elements | |
|---|---|
| Parameter | Comments |
| Predicted trajectory | succession of way points |
| Predicted velocity | including 3D heading and average speed |
| Heading change indicators | turning left or turning right indicators |
| Hard braking indicator | Indicator alerting drivers/riders of any hard braking that is performed by vehicles or vehicle VRUs in front. |

NOTE:
"M" stands for "mandatory" which means that the data element is always included in the VAM message. "O" stands for "optional" which means that the data element can be included in the VAM message. "C" stands for "conditional" which means that the data element is included in the VAM message under certain conditions The VRU system 117 supports the flexible and dynamic triggering of messages with generation intervals from X milliseconds (ms) at the most frequent, where X is a number (e.g., X=100 ms). The VAMs frequency is related to the VRU motion dynamics and chosen collision risk metric as discussed in clause 6.5.10.5 of [TS103300-3].

The number of VRUs 116 operating in a given area can get very high. In some cases, the VRU 116 can be combined with a VRU vehicle (e.g., rider on a bicycle or the like). In order to reduce the amount of communication and associated resource usage (e.g., spectrum requirements), VRUs 116 may be grouped together into one or more VRU clusters. A VRU cluster is a set of two or more VRUs 116 (e.g., pedestrians) such that the VRUs 116 move in a coherent manner, for example, with coherent velocity or direction and within a VRU bounding box. A "coherent cluster velocity" refers to the velocity range of VRUs 116 in a cluster such that the differences in speed and heading between any of the VRUs in a cluster are below a predefined threshold. A "VRU bounding box" is a rectangular area containing all the VRUs 116 in a VRU cluster such that all the VRUs in the bounding box make contact with the surface at approximately the same elevation.

VRU clusters can be homogeneous VRU clusters (e.g., a group of pedestrians) or heterogeneous VRU clusters (e.g., groups of pedestrians and bicycles with human operators). These clusters are considered as a single object/entity. The parameters of the VRU cluster are communicated using VRU Awareness Messages (VAMs), where only the cluster head continuously transmits VAMs. The VAMs contain an optional field that indicates whether the VRU 116 is leading a cluster, which is not present for an individual VRUs (e.g., other VRUs in the cluster should not transmit VAM or should transmit VAM with very long periodicity). The leading VRU also indicates in the VAM whether it is a homogeneous cluster or heterogeneous, the latter one being of any combination of VRUs. Indicating whether the VRU cluster is heterogeneous and/or homogeneous may provide useful information about trajectory and behaviors prediction when the cluster is disbanded.

The use of a bicycle or motorcycle will significantly change the behavior and parameters set of the VRU using this non-VRU object (or VRU vehicle such as a "bicycle"/"motorcycle"). A combination of a VRU 116 and a non-VRU object is called a "combined VRU." VRUs 116 with VRU Profile 3 (e.g., motorcyclists) are usually not involved in the VRU clustering.

A VAM contains status and attribute information of the originating VRU ITS-S 117. The content may vary depending on the profile of the VRU ITS-S 117. A typical status information includes time, position, motion state, cluster status, and others. Typical attribute information includes data about the VRU profile, type, dimensions, and others. The generation, transmission and reception of VAMs are managed by the VRU basic service (VBS) (see e.g., FIGS. 2-3). The VBS is a facilities layer entity that operates the VAM protocol. The VBS provides the following services: handling the VRU role, sending and receiving of VAMs to enhance VRU safety. The VBS also specifies and/or manages VRU clustering in presence of high VRU 116/117 density to reduce VAM communication overhead. In VRU clustering, closely located VRUs with coherent speed and heading form a facility layer VRU cluster and only cluster head VRU 116/117 transmits the VAM. Other VRUs 116/117 in the cluster skip VAM transmission. Active VRUs 116/117 (e.g., VRUs 116/117 not in a VRU cluster) send individual VAMs (called single VRU VAM or the like). An "individual VAM" is a VAM including information about an individual VRU 116/117. A VAM without a qualification can be a cluster VAM or an individual VAM.

The Radio Access Technologies (RATs) employed by the NAN 130, the V-ITS-Ss 110, and the VRU ITS-S 117 may include one or more V2X RATs, which allow the V-ITS-Ss 110 to communicate directly with one another, with infrastructure equipment (e.g., NAN 130), and with VRU devices 117. In the example of FIG. 1, any number of V2X RATs may be used for V2X communication. In an example, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize an air interface 112*a* and the WLAN V2X RAT may utilize an air interface 112*b*. The access layer for the ITS-G5 interface is outlined in ETSI EN 302 663 V1.3.1 (2020-01) (hereinafter "[EN302663]") and describes the access layer of the ITS-S reference architecture 200. The ITS-G5 access layer comprises IEEE 802.11-2016 (hereinafter "[IEEE80211]") and IEEE 802.2 Logical Link Control (LLC) (hereinafter "[IEEE8022]") protocols. The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03). The NAN 130 or an edge compute node 140 may provide one or more services/capabilities 180.

In V2X scenarios, a V-ITS-Ss 110 or a NAN 130 may be or act as a RSU or R-ITS-S 130, which refers to any transportation infrastructure entity used for V2X communications. In this example, the RSU 130 may be a stationary RSU, such as an gNB/eNB-type RSU or other like infrastructure, or relatively stationary UE. The RSU 130 may be a mobile RSU or a UE-type RSU, which may be implemented by a vehicle (e.g., V-ITS-Ss 110), pedestrian, or some other device with such capabilities. In these cases, mobility issues can be managed in order to ensure a proper radio coverage of the translation entities.

RSU 130 is a computing device coupled with radio frequency circuitry located on a roadside that provides connectivity support to passing V-ITS-Ss 110. The RSU 130 may also include internal data storage circuitry to store intersection map geometry, traffic statistics, media, as well as applications/software to sense and control ongoing vehicular and pedestrian traffic. The RSU 130 provides various services/capabilities 180 such as, for example, very low latency communications required for high speed events, such as crash avoidance, traffic warnings, and the like. Additionally or alternatively, the RSU 130 may provide other services/capabilities 180 such as, for example, cellular/WLAN communications services. In some implementations, the components of the RSU 130 may be packaged in a weatherproof enclosure suitable for outdoor installation, and may include a network interface controller to provide a wired connection (e.g., Ethernet) to a traffic signal controller and/or a backhaul network. Further, RSU 130 may include wired or wireless interfaces to communicate with other RSUs 130 (not shown by FIG. 1).

In arrangement 100, V-ITS-S 110*a* may be equipped with a first V2X RAT communication system (e.g., C-V2X) whereas V-ITS-S 110*b* may be equipped with a second V2X RAT communication system (e.g., W-V2X which may be DSRC, ITS-G5, or the like). Additionally or alternatively, the V-ITS-S 110*a* and/or V-ITS-S 110*b* may each be employed with one or more V2X RAT communication systems. The RSU 130 may provide V2X RAT translation services among one or more services/capabilities 180 so that individual V-ITS-Ss 110 may communicate with one another even when the V-ITS-Ss 110 implement different V2X RATs. The RSU 130 (or edge compute node 140) may provide VRU services among the one or more services/capabilities 180 wherein the RSU 130 shares CPMs, MCMs, VAMs DENMs, CAMs, and/or the like, with V-ITS-Ss 110 and/or VRUs for VRU safety purposes. The V-ITS-Ss 110 may also share such messages with each other, with RSU 130, and/or with VRUs. These messages may include the various data elements and/or data fields as discussed herein.

The NAN 130 may be a stationary RSU, such as an gNB/eNB-type RSU or other like infrastructure. The NAN 130 may be a mobile RSU or a UE-type RSU, which may be implemented by a vehicle, pedestrian, or some other device with such capabilities. In these cases, mobility issues can be managed in order to ensure a proper radio coverage of the translation entities. The NAN 130 that enables the connections 112 may be referred to as a "RAN node" or the like. The RAN node 130 may comprise ground stations (e.g., terrestrial access points) or satellite stations providing coverage within a geographic area (e.g., a cell). The RAN node 130 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 130 is embodied as a NodeB, evolved NodeB (eNB), or a next generation NodeB (gNB), one or more relay nodes, distributed units, or Road Side Unites (RSUs). Any other type of NANs can be used. Additionally, the RAN node 130 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, and/or the like.

The network 158 may represent a network such as the Internet, a wireless local area network (WLAN), or a wireless wide area network (WWAN) including proprietary and/or enterprise networks for a company or organization, a cellular core network (e.g., an evolved packet core (EPC) network, a NextGen Packet Core (NPC) network, a 5G core (5GC), or some other type of core network), a cloud computing architecture/platform that provides one or more cloud computing services, and/or combinations thereof. As examples, the network 158 and/or access technologies may include cellular technology such as LTE, MuLTEfire, and/or NR/5G (e.g., as provided by Radio Access Network (RAN)

node 130), WLAN (e.g., WiFi®) technologies (e.g., as provided by an access point (AP) 130), and/or the like. Different technologies exhibit benefits and limitations in different scenarios, and application performance in different scenarios becomes dependent on the choice of the access networks (e.g., WiFi, LTE, and/or the like) and/or the like) and the used network and transport protocols (e.g., Transfer Control Protocol (TCP), Virtual Private Network (VPN), Multi-Path TCP (MPTCP), Generic Routing Encapsulation (GRE), and/or the like).

The remote/cloud servers 160 may represent one or more application servers, a cloud computing architecture/platform that provides cloud computing services, and/or some other remote infrastructure. The remote/cloud servers 160 may include any one of a number of services and capabilities 180 such as, for example, ITS-related applications and services, driving assistance (e.g., mapping/navigation), content provision (e.g., multi-media infotainment streaming), and/or the like.

Additionally, the NAN 130 is co-located with an edge compute node 140 (or a collection of edge compute nodes 140), which may provide any number of services/capabilities 180 to vehicles 110 such as ITS services/applications, driving assistance, and/or content provision services 180. The edge compute node 140 may include or be part of an edge network or "edge cloud." The edge compute node 140 may also be referred to as an "edge host 140," "edge server 140," or "compute platforms 140." The edge compute nodes 140 may partition resources (e.g., memory, CPU, GPU, interrupt controller, I/O controller, memory controller, bus controller, network connections or sessions, and/or the like) and/or the like) where respective partitionings may contain security and/or integrity protection capabilities. Edge nodes may also provide orchestration of multiple applications through isolated user-space instances such as containers, partitions, virtual environments (VEs), virtual machines (VMs), Servlets, servers, and/or other like computation abstractions. The edge compute node 140 may be implemented in a data center or cloud installation; a designated edge node server, an enterprise server, a roadside server, a telecom central office; or a local or peer at-the-edge device being served consuming edge services. The edge compute node 140 may provide any number of driving assistance and/or content provision services 180 to vehicles 110. The edge compute node 140 may be implemented in a data center or cloud installation; a designated edge node server, an enterprise server, a roadside server, a telecom central office; or a local or peer at-the-edge device being served consuming edge services. Examples of such other edge computing/networking technologies that may implement the edge compute node 140 and/or edge computing network/cloud include Multi-Access Edge Computing (MEC), Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used.

2. VAM Overhead Reduction and Redundancy Mitigation

The generation, transmission and reception of VAM are managed by the VRU basic service (VBS) by implementing the VAM protocol (see e.g., [TS103300-3]). The VRU basic service is a Facility layer entity that operates the VAM protocol. It provides three main services: handling the VRU role, sending and receiving of VAMs to enhance VRU safety. However, current standards (see e.g., [TS103300-3]) do not provide details of VAM generation trigger, VAM generation frequency, and VAM segmentation if the VAM size becomes larger than that the lower layer can handle. Frequent transmission of VAM may be desirable to achieve better VRU awareness in the proximity to improve VRU safety, however, it may create significant or unacceptable communication overhead in the access layer. VRU clustering concept is adopted in [TS103300-3] in presence of high VRU density to reduce VAM communication overhead to some extent. In VRU clustering, closely located VRUs with coherent speed and heading forms a facility layer VRU cluster and only cluster leader/head transmits the VAM. However, cluster joining constrains limit the scenarios to form clusters in most of the cases resulting in VRUs transmitting individual VAMs over the same radio resources at access layer.

Currently, ETSI ITS working group 1 (WG1) is working on developing VRU Basic Service (see e.g., [TS103300-3]) protocols and procedures. Details of VAM dissemination is still not defined. A balance between frequency and size of VAM generation by VBS at Facility Layer and communication overhead at Access layer is needed without impacting VRU safety and VRU awareness in the proximity.

VAM transmission frequency is dynamically adjusted based on the several parameters/perceived contexts in the proximity to reduce VAM communication overhead. This disclosure enables efficient dissemination of VAM: VBS activation and deactivation conditions for various station types (e.g., VRU, RSE, vehicular stations, and/or the like) based on their role and context; generation frequency management by VBS for efficient VAM dissemination, including trigger events for first time generation and transmission of various types of VAMs (Single VRU VAM, VRU Cluster VAM and Infrastructure VAMs), and conditions and procedure for consecutive transmission of these VAMs once they are triggered to be generated and transmission; mechanisms for VAM redundancy mitigations for communication overhead reduction; and VAM segmentation algorithm in case VAM size exceeds maximum transmission unit (MTU) than that lower layer can handle.

In summary, the descriptions herein enable efficient mechanisms of VAM dissemination with reduced communication overhead in Vehicular Networks (including Internet of Vehicles (IoV) networks and/or autonomous wireless sensor networks) addressing above mentioned issues/challenges.

In various implementations, ITS-Ss provide ITS services, which involve the transmission and reception of ITS service messages (e.g., VAMs). The ITS services are readily scalable across a city or geographical area. In the facilities layer messages, an application container would be used along with ITS PDU header(s) and/or ITS service containers.

Furthermore, ETSI ITS standards/frameworks and/or edge computing standards/frameworks (e.g., the Multi-access Edge Computing (MEC) or the like) can standardize and/or specify various implementations discussed herein. In these implementations, one or more edge computing applications (e.g., MEC apps) provide the VBS and generate, receive, and transmit VAMs.

2.1. VRU Basic Service (VBS) Activation and Termination

As mentioned earlier, VAM generation, transmission, and reception are handled by a VRU basic service (VBS) facility in/at the facilities layer. Therefore, the VBS must be active when a VAM needs to be transmitted or received by a VRU ITS-S. The following VBS activation and deactivation triggers are used for different types of ITS-Ss and their current status.

2.1.1. VRU ITS-S:

VBS can be activated for a VRU ITS-S whenever VRU is in an active VRU state such as when VRU may get in risk from other road users like vehicles, motorbikes, and/or the like. VRU should be in active state when it is in zebra-crossing, at intersection, on sidewalk/bike lane, and/or the like. VBS should be terminated for a VRU ITS-S whenever it moves to Idle VRU state e.g., when a VRU gets into bus. As long as the VBS Service is active, VAM generation, transmission and reception should be managed by the VBS.

2.1.2. V-ITS-S

The VBS service is activated with the ITS-S activation for V-ITS-S to receive VAM messages. The VBS service should be terminated when the ITS-S is deactivated. As long as the VBS Service is active, VAM reception should be managed by the VBS.

2.1.3. R-ITS-S

The VBS service can be activated either with the ITS-S activation or through remote configuration. Similarly, the VBS service can be de-activated either with the ITS-S de-activation or through remote configuration. For example in case of remote configuration based activation/deactivation, VBS for R-ITS-S near school can be configured to be activated during student drop off and pick up hours, while it can be deactivated other time. As long as the VBS Service is active, VAM reception should be managed by the VBS at R-ITS-S. As long as the VBS Service is active and R-ITS-S is configured to transmit infrastructure VAM, VAM generation is managed by the VBS.

2.2. VAM Generation Frequency Management for VRU Devices

Each VAM generation event results in the generation of one VAM. The generated VAM may be segmented as discussed infra.

The minimum time elapsed between the start of consecutive VAM generation events should be equal to or larger than a value T_GenVam and T_GenVam is limited to T_GenVamMin≤T_GenVam≤T_GenVamMax, where T_GenVamMin=Minimum time between consecutive VAM transmissions (e.g., 100 ms) and T_GenVamMax=Maximum time between consecutive VAM transmissions (e.g., 500 ms).

If information about channel congestion at access layer is available at Facility layer, T_GenVam should be adjusted accordingly, e.g., longer T_GenVam can be defined for higher channel congestion case. Congestion layer at access layer can be estimated at facility layer as well, for example, by monitoring the average success rate of periodic data (such as BSM, CAM, PSM, VAM) from the neighbors over a past moving window of time. Drop in such average success rate can indicate increased congestion level at access layer.

The parameter T_GenVam should be provided by the management entity at facility layer. If the management entity provides this parameter with a value above T_GenVamMax, then T_GenVam is set to T_GenVamMax and if the value is below T_GenVamMin or if this parameter is not provided, the T_GenVam is set to T_GenVamMin. The parameter T_GenVam represents the currently valid lower limit for the time elapsed between consecutive VAM generation events.

If VRU ITS-S is in VRU-ACTIVE-STANDALONE VBS State (as specified in [TS103300-3]), it sends VAM as type 'Single VRU VAM'. If VRU ITS-S in VRU-ACTIVE-CLUSTERHEAD VBS State (see e.g., [TS103300-3]) (e.g., if the VRU ITS-S is cluster head of a VRU cluster), it transmits VAM type 'VRU Cluster VAM' on behalf of the VRU Cluster. Single VRU VAM includes information about the originating VRU ITS while VRU Cluster VAM has information about the VRU cluster 2.2.1. Individual VAM Transmission Management by VBS at VRU ITS-S First time 'Single VRU VAM' should be generated immediately or at earliest time for transmission if any of the following conditions is satisfied and the Single VRU VAM transmission does not subject to redundancy mitigation techniques specified in section 2.2.3, infra: (1) a VRU is in VRU-IDLE VBS State and has entered VRU-ACTIVE-STANDALONE VBS State; (2) a VRU is in VRU-PASSIVE VBS State; has decided to leave the cluster and enter VRU-ACTIVE-STANDALONE VBS State; (3) a VRU is in VRU-PASSIVE VBS State (e.g., VRU has determined that one or more new vehicles or other VRUs (e.g., VRU Profile 3—Motorcyclist) have come closer than minimum safe lateral distance (MSLaD) laterally, closer than minimum safe longitudinal distance (MSLoD) longitudinally and closer than minimum safe vertical distance (MSVD) vertically, and has determined to leave cluster and enter VRU-ACTIVE-STANDALONE VBS State in order to transmit immediate VAM); (4) a VRU is in VRU-PASSIVE VBS State; has determined that VRU Cluster Head is lost and has decided to enter VRU-ACTIVE-STANDALONE VBS State; and/or (5) a VRU is in VRU-ACTIVE-CLUSTER-HEAD VBS State; has determined breaking down the cluster and has transmitted VRU Cluster VAM with disband indication; and has decided to enter VRU-ACTIVE-STANDALONE VBS State.

Consecutive VAM transmissions are contingent to conditions as described herein. Consecutive Single VRU VAM generation events should occur at an interval equal to or larger than T_GenVam. An individual VAM should be generated for transmission as part of a generation event if the originating VRU ITS-S is still in VBS VRU-ACTIVE-STANDALONE VBS State, and any of the following conditions is/are satisfied and the individual VAM transmission is not subject to redundancy mitigation techniques (which are discussed infra):

1. The time elapsed since the last time the Single VRU VAM was transmitted exceeds T_GenVamMax
2. The Euclidian absolute distance between the current estimated position of the reference point of the VRU and the estimated position of the reference point lastly included in a Single VRU VAM exceeds a predefined threshold (e.g., 4 m). In some implementations, the predefined threshold may be minReferencePointPositionChangeThreshold.
3. The difference between the current estimated ground speed of the reference point of the VRU and the estimated absolute speed of the reference point of the VRU lastly included in a Single VRU VAM exceeds a predefined threshold (e.g., 0.5 m/s). In some implementations, the predefined threshold may be minGroundSpeedChangeThreshold.

4. The difference between the orientation of the vector of the current estimated ground velocity of the reference point of the VRU and the estimated orientation of the vector of the ground velocity of the reference point of the VRU lastly included in a Single VRU VAM exceeds a predefined threshold (e.g., 4 degrees). In some implementations, the predefined threshold may be minGroundVelocityOrientationChangeThreshold.
5. The difference between the current estimated collision probability with vehicle(s) or other VRU(s) (e.g., as measured by Trajectory Interception Probability) and the estimated collision probability with vehicle(s) or other VRU(s) lastly reported in a Single VRU VAM exceeds a predefined threshold (e.g., 4%) In some implementations, the predefined threshold may be minTrajectoryInterceptionProbChangeThreshold.
6. The originating ITS-S is a VRU in VRU-ACTIVE-STANDALONE VBS State and has decided to join a Cluster after its previous Single VRU VAM transmission.
7. The VRU has determined that one or more new vehicles or other VRUs (e.g., VRU Profile 3—Motorcyclist) have satisfied the following conditions simultaneously after the lastly transmitted VAM:
   a. coming closer than a minimum safe lateral distance (MSLaD) laterally;
   b. coming closer than a minimum safe longitudinal distance (MSLoD) longitudinally;
   c. coming closer than a minimum safe vertical distance (MSVD) vertically.
8. The VRU has determined that one or more vehicles or other VRUs (e.g., VRU Profile 3—Motorcyclist) have satisfied the following conditions simultaneously after the lastly transmitted VAM (e.g., after the previously transmitted VAM):
   a. moving farther than minimum safe lateral distance (MSLaD) laterally;
   b. moving farther than minimum safe longitudinal distance (MSLoD) longitudinally;
   c. moving farther than minimum safe vertical distance (MSVD) vertically; and
   d. these vehicles or these VRUs (e.g., VRU Profile 3—Motorcyclist) were
      i. closer than minimum safe lateral distance (MSLaD) laterally,
      ii. closer than minimum safe longitudinal distance (MSLoD) longitudinally, and
      iii. closer than minimum safe vertical distance (MSVD) vertically in lastly transmitted VAM.

2.2.2. VRU Cluster VAM Transmission Management by VBS at VRU ITS-S

First time VRU Cluster VAM should be generated immediately or at earliest time for transmission if any of the following conditions is satisfied and the VRU Cluster VAM transmission does not subject to redundancy mitigation techniques: (1) a VRU in VRU-ACTIVE-STANDALONE VBS State determines to form a VRU Cluster.

Consecutive VRU Cluster VAM Transmission is contingent to conditions as described here. Consecutive VRU Cluster VAM generation events should occur at cluster head at an interval equal to or larger than T_GenVam. A VRU Cluster VAM should be generated for transmission by the cluster head as part of a generation event if any of the following conditions is satisfied and VRU Cluster VAM transmission does not subject to redundancy mitigation techniques:

(1) The time elapsed since the last time the VRU Cluster VAM was transmitted exceeds T_GenVamMax.
(2) The Euclidian absolute distance between the current estimated position of the reference point of the VRU Cluster and the estimated position of the reference point lastly included in a VRU cluster VAM exceeds a predefined threshold (e.g., 4 m). In some implementations, the predefined threshold is minReferencePointPositionChangeThreshold.
(3) The difference between the current estimated ground speed of the reference point of the VRU cluster and the estimated absolute speed of the reference point lastly included a VRU cluster VAM exceeds a predefined threshold. In some implementations, the predefined threshold is minClusterDistanceChangeThreshold.
(4) the difference between the current estimated ground speed of the reference point of the VRU cluster and the estimated absolute speed of the reference point lastly included a VRU cluster VAM exceeds a predefined threshold. In some implementations, the predefined threshold is minClusterDistanceChangeThreshold.
(5) The difference between the current estimated Length of the Cluster and the estimated Length included in the lastly transmitted VAM exceeds a predefined threshold (e.g., 2 m).
(6) The difference between the current estimated ground speed of the reference point of the VRU Cluster and the estimated absolute speed of the reference point lastly included a VRU Cluster VAM exceeds a predefined threshold (e.g., 0.5 m/s). In some implementations, the predefined threshold may be minGroundSpeedChangeThreshold.
(7) The difference between the orientation of the vector of the current estimated ground velocity of the reference point of the VRU Cluster and the estimated orientation of the vector of the ground velocity of the reference point lastly included in a VRU Cluster VAM exceeds a predefined threshold (e.g., 4 degrees). In some implementations, the predefined threshold may be minGroundVelocityOrientationChangeThreshold.
(8) The difference between the current estimated probability of collision of the VRU Cluster with vehicle(s) or other VRU(s) (e.g., as measured by Trajectory Interception Probability of other vehicles/VRUs with Cluster Bounding Area) and the estimated collision probability with vehicle(s) or other VRU(s) lastly reported in a VAM exceeds Y % (e.g., 4%). In some implementations, the predefined threshold may be minTrajectoryInterceptionProbChangeThreshold.
(9) VRU Cluster type has been changed (e.g., from Homogeneous to Heterogeneous Cluster or vice versa) after a previous VAM generation event.
(10) Cluster head has determined to disband (break-up) the cluster after transmission of previous VRU cluster VAM.
(11) Cluster head has determined to merge the cluster with other cluster(s) after transmission of previous VRU cluster VAM.
(12) Cluster head became aware of the split of the current cluster after transmission of previous VRU cluster VAM.
(13) More than a predefined number of new VRUs (e.g., 3) has joined the VRU Cluster after transmission of previous VRU cluster VAM.
(14) More than a predefined number of member VRUs (e.g., 3) has left the VRU Cluster after transmission of previous VRU cluster VAM.

(15) VRU in VRU-ACTIVE-CLUSTERHEAD VBS State has determined that one or more new vehicles or non-member VRUs (e.g., VRU Profile 3—Motorcyclist) have satisfied the following conditions simultaneously after the lastly transmitted VAM: (a) come closer than minimum safe lateral distance (MSLaD) laterally; (b) come closer than minimum safe longitudinal distance (MSLoD) longitudinally, and (c) come closer than minimum safe vertical distance (MSVD) vertically to the cluster bounding box after the lastly transmitted VAM.

(16) VRU in VRU-ACTIVE-CLUSTERHEAD VBS State has determined that one or more vehicles or non-member VRUs (with VRU Profile 3—Motorcyclist) have satisfied the following conditions simultaneously after the lastly transmitted VAM: (a) moved farther than minimum safe lateral distance (MSLaD) laterally, (b) moved farther than minimum safe longitudinal distance (MSLoD) longitudinally, (c) moved farther than minimum safe vertical distance (MSVD) vertically to the cluster bounding box, and (d) the vehicles and/or non-member VRUs (e.g., VRU Profile 3—Motorcyclist) were closer than the minimum safe lateral distance (MSLaD) laterally, closer than minimum safe longitudinal distance (MSLoD) longitudinally and closer than minimum safe vertical distance (MSVD) vertically to the Cluster Bounding Box in lastly transmitted VAM.

2.2.3. VAM Redundancy Mitigation Techniques

A balance between Frequency of VAM generation at the facility layer and communication overhead at the access layer should be considered without impacting VRU safety and VRU awareness in the proximity. VAM transmission at a VAM generation event is subject to one or more of the following redundancy mitigation techniques. Additionally or alternatively, one or more conditions of any of the following redundancy mitigation techniques may be combined or divided. Furthermore, in the following discussion the "peer ITS-S" may refer to any of the ITS-Ss discussed herein, such as another VRU ITS-S 116/117, a V-ITS-S 110, an R-ITS-S 130, and/or any other ITS station.

2.2.3.1. Redundancy Mitigation Technique 1

An originating VRU ITS-S skips a current individual VAM if all the following conditions are satisfied simultaneously: the time elapsed since the last time VAM was transmitted by originating VRU ITS-S does not exceed numSkipVamsForRedundancyMitigation (e.g., 4) times T_GenVamMax; the Euclidian absolute distance between the current estimated position of the reference point of the originating VRU ITS-S and the estimated position of the reference point in the received VAM from a peer ITS-S is less than minReferencePointPositionChangeThreshold (e.g., 4 m); the difference between the current estimated speed of the reference point of the originating VRU ITS-S and the estimated absolute speed of the reference point in the received VAM from a peer ITS-S is less than minGroundSpeedChangeThreshold (e.g., 0.5 m/s); and/or the difference between the orientation of the vector of the current estimated ground velocity of the originating VRU ITS-S and the estimated orientation of the vector of the ground velocity of the reference point in the received VAM from a peer ITS-S is less than minGroundVelocityOrientationChangeThreshold (e.g., 4 degrees).

Additionally or alternatively, an originating VRU ITS-S skips a current individual VAM if at least one of the following conditions are satisfied: the VRU consults appropriate maps to verify if the VRU is in protected or non-drivable areas such as buildings, and/or the like; the VRU is in a geographical area designated as a pedestrian only zone (low-risk geographical area). Only VRU profiles 1 and 4 allowed in the area (see e.g., Table 4-3); the VRU considers itself as a member of a VRU cluster and cluster break up message has not been received from the cluster leader; and/or the information about the ego-VRU has been reported by another ITS-S within T_GenVam.

2.2.3.2. Redundancy Mitigation Technique 2

An originating VRU ITS-S skips a current individual VAM if some or all the following conditions are satisfied simultaneously: the time elapsed since the last time VAM was transmitted by originating VRU ITS-S does not exceed numSkipVamsForRedundancyMitigation (e.g., 4) times T_GenVamMax; a VAM has been received from a peer ITS-S during a last T_GenVamMax duration; the Euclidian absolute distance between the current estimated position of the reference point of the originating VRU ITS-S and the estimated position of the reference point in the received VAM from a peer ITS-S is less than minReferencePointPositionChangeThreshold (e.g., 4 m); the difference between the current estimated speed of the reference point of the originating VRU ITS-S and the estimated absolute speed of the reference point in the received VAM from a peer ITS-S is less than minGroundSpeedChangeThreshold (e.g., 0.5 m/s); and/or the difference between the orientation of the vector of the current estimated ground velocity of the originating VRU ITS-S and the estimated orientation of the vector of the ground velocity of the reference point in the received VAM from a peer ITS-S is less than minGroundVelocityOrientationChangeThreshold (e.g., 4 degrees).

2.2.3.3. Redundancy Mitigation Technique 3

An originating VRU ITS-S skips a current VAM if some or all the following conditions are satisfied simultaneously: time elapsed since the last time VAM was transmitted by originating VRU ITS-S does not exceed N (e.g., 4) times T_GenVamMax; a VAM (VRU Cluster VAM or VRU Cluster container in Infrastructure VAM) has been received from a peer ITS-S during last T_GenVamMax duration; the Euclidian absolute distance between the current estimated position of the reference point of the originating VRU ITS-S and the nearest point in the bounding Box of the cluster specified in the received VAM is less than a predefined threshold (e.g., 4 m); the difference between the current estimated speed of the reference point of the originating VRU ITS-S and the estimated absolute speed of the reference point of the VRU Cluster in the received VAM is less than a predefined threshold (e.g., 0.5 m/s); and/or the difference between the orientation of the vector of the current estimated ground velocity of the reference point of the originating VRU ITS-S and the estimated orientation of the vector of the ground velocity of the reference point of the VRU Cluster in the received VAM is less than a predefined threshold (e.g., 4 degrees).

2.2.4. VAM Segmentation

The size of a generated VAM should not exceed a maximum transmission unit (MTU) supported by the NF-SAP (see e.g., [TS103300-3]) of the VBS. The MTU for VAMs may be referred to as "MTU_VAM" or the like. The MTU_VAM depends on the MTU of the access layer technology (MTU_AL) over which the VAM is transported. Specifically, the MTU_VAM should be less than or equal to MTU_AL reduced by the header size of the facilities layer protocol (HD_VAM) and the header size of the networking and transport layer protocol (HD_NT) with MTU_VAM≤(MTU_AL−HD_VAM−HD_NT).

The current VAM capability is extended to enable segmentation of a VAM into two or more segments. Current VAM format specifications do not allow for VAM segmentation. VAM segmentation is inevitable to limit the VAM size to be below the MTU supported by lower layers. A new container 'VamManagementParameters' can be added to the existing VAM structure for this purpose in order to carry segmentation information as shown by Table 2.2-1.

TABLE 2.2-1

```
VAM ::= SEQUENCE {
    header ItsPduHeaderVam,
    vam VruAwareness
  }
  -- contains StationId
  -- StationId should change when certificate changes, or when VRU
  -- enters or leaves a cluster (as leader or otherwise)
  ItsPduHeaderVam ::= ItsPduHeader(WITH COMPONENTS {
    ...,
    messageID(vam)
  })
  VruAwareness ::= SEQUENCE {
    generationDeltaTime GenerationDeltaTime,
managementParameters VamManagementParameters OPTIONAL,
    vamParameters VamParameters,
    vamExtensions SEQUENCE (SIZE(0..MAX)) OF VamExtension
  }
VamManagementParameters ::= SEQUENCE {
originatingStationType              OriginatingStationType,
vamType                             VamType,
vamSegmentInfo                      VamSegmentInfo OPTIONAL,
originatingStationReferencePosition OriginatingReferencePosition OPTIONAL,
  ...
}
VamSegmentInfo ::= SEQUENCE {
totalMsgSegments SegmentCount,
thisSegmentNum SegmentCount
}
SegmentCount ::= INTEGER( 1..32)
```

In case the size of the ASN.1 UPER encoded VAM for transmission exceeds MTU_VAM, message segmentation should occur. Contents are included in the VAM segments in a descending order of inclusion priorities.

Message segmentation should be indicated by populating the VamSegmentInfo DF. All message segments should indicate the same generationDeltaTime DE.

Message segments may be transmitted in the same order in which they have been generated. This is to ensure that segments containing containers of higher priority are not deferred in favour of segments containing containers of lower priority by lower layer mechanisms.

2.2.4.1. VAM Segmentation Management by VBS at VRU ITS-S

In case the size of the ASN.1 UPER encoded VAM (Single VRU VAM or VRU Cluster VAM) for transmission in the current VAM generation event exceeds MTU_VAM, message segmentation should occur. Selected containers should be included in a VAM segment in the following descending order: VruProfileId, VruDynamicProperties, VruPhysicalProperties, VamExtension.

A segment should be populated with containers as long as the resulting ASN.1 UPER encoded message size of the segment to be generated does not exceed MTU_VAM. A container should not be split in two VAM segments. Segments are generated in this fashion until all containers are included in a VAM segment. Each segment is transmitted at the next transmission opportunity.

2.3. VAM Time Requirements 2.3.1. VAM Generation Time

Besides the VAM generation frequency, the time required for the VAM generation and the timeliness of the data taken for the message construction are decisive for the applicability of data in the receiving ITS-Ss. In order to ensure proper interpretation of received VAMs, each VAM is timestamped. It is assumed that there is an acceptable time synchronization among different ITS-Ss.

The time required for a VAM generation should be less than a threshold T_AssembleVAM (e.g., 50 ms). The time required for a VAM generation refers to the time difference between a time at which a VAM generation is triggered and the time at which the VAM is delivered to the Networking & Transport layer.

2.3.2. VAM Timestamp

Following requirements apply for VAM timestamping: The reference timestamp provided in a VAM disseminated by an ITS-S corresponds to the time at which the reference position provided in the BasicContainer DF and/or the VruPhysicalProperties DF is determined by the originating ITS-S. The format and range of the timestamp is discussed in Table 2.3-1 and/or defined in clause B.1.3 of [TS103300-3] and/or clause B.3 of [EN302637-2].

TABLE 2.3-1

| generationDeltaTime | |
|---|---|
| Description | Time corresponding to the time of the reference position in the VAM, considered as time of the VAM generation. The value of the DE shall be wrapped to 65 536. This value shall be set as the remainder of to the corresponding value of TimestampIts divided by 65 536 as below.<br>generationDeltaTime = TimestampIts mod 65 536<br>TimestampIts represents an integer value in milliseconds since 2004-01-01T00:00:00:000Z as defined in [TS102894-2] |

TABLE 2.3-1-continued

| generationDeltaTime | |
|---|---|
| Insertion in VAM | Mandatory. |
| Data setting and presentation requirements | The DE shall be presented as specified in annex A of [TS103300-3] and/or [EN302637-2]. |

The difference between VAM generation time and reference timestamp shall be less than 32 767 ms.

2.4. Example VAM Parameters

The parameters in Table 2.4-1 govern the VRU decision to create, join or leave a cluster. The parameters may be set on individual devices or system wide and may depend on external conditions or be independent of them.

TABLE 2.4-1

Parameters for VRU clustering decisions (clause 5.4.2)

| Parameter | Type | Meaning | Recommended range |
|---|---|---|---|
| numCreateCluster | Integer | Number of VRU devices that a potential cluster leader anticipates will join a cluster, if one is created | [3 to 5] |
| maxClusterDistance | distance (in m) | maximum distance between the edge of the cluster and the VRU performing the evaluation. This value also restricts the size of a VRU cluster | [3 to 5] |
| maxClusterVelocityDifference | percentage | maximum speed velocity difference inside a cluster | 5% |
| maxCombinedClusterDistance | distance (in m) | maximum distance between the edge of the combined VRU cluster and the VRU performing the evaluation. This value also restricts the size of a combined VRU cluster | [1 to 2] |
| minClusterSize | Integer | minimal size of a VRU cluster. It is used to fill the clusterCardinalitySize field, just after creation and before any VRU has joined (see note 1). | 1 |
| maxClusterSize | Integer | maximal size (or number of active ITS-S) of a VRU cluster. It is used by a VRU to check whether it can join the cluster. In practice, the cluster may be larger and include non-equipped VRUs, which cannot take part in the clustering operation and be identified as such by the cluster leader. | 20 (see note 2) |
| numClusterVAMRepeat | Integer | Number of VAM repetitions with former identifiers in case of a cluster cancelled-join or a failed-join | 3 |

NOTE 1:
The minimal size of 1 for the cluster cardinality size does not mean any VRU can be its own cluster as a VRU should comply with the criteria set in clause 5.4.2.4 before it creates a cluster. This value is set to 1 to reflect the cluster condition just after it was created and before any other VRU has had an opportunity to join.
NOTE 2:
The value given in the present document is an initial indicative value. It may be revised in a later revision after more evaluations of clustering have been performed.

The parameters in Table 2.4-2 govern the messaging behaviour around joining and leaving clusters. The parameters may be set on individual devices or system wide and may depend on external conditions or be independent of them.

TABLE 2.4-2

Cluster membership parameters

| Parameter | Type | Meaning | Recommended default value |
|---|---|---|---|
| timeClusterUniquenessThreshold | Time period | When a cluster leader selects a cluster ID, it has to be different from any cluster ID received by the cluster leader within this time | 30 seconds |
| timeClusterBreakupWarning | Time period | When a cluster leader has made the decision to end a cluster, it includes in its VAMs an indication of the forthcoming end of the cluster for this time. | 3 seconds |

TABLE 2.4-2-continued

| Cluster membership parameters | | | |
|---|---|---|---|
| Parameter | Type | Meaning | Recommended default value |
| timeClusterJoinNotification | Time period | When a VRU device sending individual VAMs intends to join a cluster, it includes in its VAMs an indication of this intention for this time | 3 seconds |
| timeClusterJoinSuccess | Time period | After a VRU device joins a cluster, it waits this amount of time for the cluster VAM to reflect the fact that the VRU device has joined and leaves the cluster if not | 0.5 seconds |
| timeClusterIdChangeNotification | Time period | The time for which a cluster leader advertises that it is going to change its ID before changing it | 3 seconds |
| timeClusterIdPersist | Time period | If the cluster ID for a particular device changes, the time for which it can continue to use the old ID in a cluster leave indication | 3 seconds |
| timeClusterContinuity | Time period | If a VRU device that is a member of a cluster does not receive a cluster VAM for this period of time, it leaves the cluster | 2 seconds |
| timeClusterLeaveNotification | Time period | After a VRU device has left a cluster, it includes in its VAMs an indication of the cluster it has left for this time | 1 second |
| timeCombinedVruClusterOpportunity | Time period | The time for which an ITS-S advertises that it is offering to form a combined VRU cluster | 15 seconds |

Table 2.4-3 shows the parameters for a VAM generation. The parameters may be set on individual devices or system wide and may depend on external conditions or be independent of them.

TABLE 2.4-3

| Parameters for VAM generation | | | |
|---|---|---|---|
| Parameter | Type | Meaning | Recommended value |
| T_GenVamMin | Time in ms | The minimum time elapsed between the start of consecutive VAM generation events. For VRU LF container 2 000 ms shall be used | 100 |

TABLE 2.4-3-continued

| Parameters for VAM generation | | | |
|---|---|---|---|
| Parameter | Type | Meaning | Recommended value |
| T_GenVamMax | Time in ms | The maximum time elapsed between the start of consecutive VAM generation events | 5 000 |
| T_AssembleVAM | Time in ms | The time allocated for assembling a VAM packet in the facilities layer | 50 |

The parameters in Table 2.4-4 govern the VAM generation triggering. The parameters may be set on individual devices or system wide and may depend on external conditions or be independent of them.

TABLE 2.4-4

| Parameters for VAM generation triggering (clause 6.4) | | | |
|---|---|---|---|
| Parameter | Type | Meaning | Recommended Range |
| minReferencePointPositionChangeThreshold | distance (in m) | Minimum Euclidian absolute distance between the current estimated position of the reference point of the VRU (or VRU cluster) and the estimated position of the reference point lastly included in a VAM in order to trigger VAM generation based on position change of VRU (or VRU cluster). This restricts triggering VAM generation. | 4 |
| minGroundSpeedChangeThreshold | Speed (in m/s) | Minimum difference between the current estimated ground speed of the reference point of the VRU (or VRU cluster) and the estimated absolute speed of the reference point of the VRU (or VRU Cluster) lastly included in a VAM in order to trigger VAM generation based on speed change of VRU (or VRU cluster). This restricts triggering VAM generation. | ±0.5 |

TABLE 2.4-4-continued

| Parameters for VAM generation triggering (clause 6.4) | | | |
|---|---|---|---|
| Parameter | Type | Meaning | Recommended Range |
| minGroundVelocityOrientationChangeThreshold | orientation (in degrees) | Minimum difference between the orientation of the vector of the current estimated ground velocity of the reference point of the VRU (or VRU cluster) and the estimated orientation of the vector of the ground velocity of the reference point of the VRU (or VRU cluster) lastly included in a VAM in order to trigger VAM generation based on change in orientation of the vector of the ground velocity of VRU (or VRU cluster). This restricts triggering VAM generation. | ±4 |
| minTrajectoryInterceptionProbChangeThreshold | Probability (in percentage) | Minimum difference between the current estimated Trajectory Interception probability of VRU (or VRU cluster) with vehicle(s) or other VRU(s) and the estimated collision probability of VRU (or VRU cluster) with vehicle(s) or other VRU(s) lastly reported in a VAM in order to trigger VAM generation based on Trajectory Interception probability change of VRU (or VRU cluster). This restricts triggering VAM generation. | 10 |
| numSkipVamsForRedundancyMitigation | Number of times | If conditions are satisfied for redundancy mitigation, an originating VRU ITS-S shall skip current individual VAM numSkipVamsForRedundancyMitigation times. | [2 to 10] |
| minClusterDistanceChangeThreshold | length (in m) | Minimum difference between the current estimated distance from the VRU cluster boundary and the estimated distance based on the last transmitted VAM in order to trigger VAM generation based on VRU cluster bounding box size change. This restricts triggering VAM generation. | 2 |
| minimumSafeLateralDistance (MSLaD) | length (in m) | Minimum safe lateral distance between ego-VRU and another traffic participant (equipped or not). It depends on the ego-VRU profiles, their speeds, and the other traffic participants' profiles and their speeds. The maximum value between 2 m and lateral distance ego-VRU could travel in T_GenVamMax seconds is set as MSLaD. A = the lateral distance ego-VRU could travel in T_GenVamMax seconds | Max [2, A] |
| minimumSafeLongitudinalDistance (MSLoD) | length (in m) | Minimum safe longitudinal distance between ego-VRU and another traffic participant (equipped or not). It depends on the ego-VRU profiles, their speeds, and the other traffic participants' profiles and their speeds. B = the longitudinal distance ego-VRU could travel in T_GenVamMax seconds. | B |
| minimumSafeVerticalDistance (MSVD) | length (in m) | Minimum safe vertical distance between ego-VRU and another traffic participant (equipped or not). The overpass normally has 5 m clearance. | 5 |

2.5. Example Implementations of VAM

An example implementation of the VAM may include data fields (DFs) and data elements (DEs) is shown by Table 2.5-1, which is expressed in ASN.1 representation based on SAE International, "Dedicated Short Range Communications (DSRC) Message Set Dictionary", V2X Core Technical Committee, SAE Ground Vehicle Standard J2735, DOI: https://doi.org/10.4271/J2735_202007 (23 Jul. 2020) ("[SAE-J2735]").

TABLE 2.5-1

```
VAM-PDU-Descriptions {itu-t(0) identified-organization(4) etsi(0) itsDomain(5)
  wg1(1) ts(103300) vam(3) version(1)}
DEFINITIONS AUTOMATIC TAGS ::=
BEGIN
  IMPORTS
      ItsPduHeader, ReferencePosition, AccelerationControl,
        Heading, HeadingValue, Speed, StationID, VehicleLength, VehicleWidth,
        PathHistory, ProtectedCommunicationZone, PtActivation,
        Latitude, Longitude, ProtectedCommunicationZonesRSU
      FROM ITS-Container {itu-t(0) identified-organization(4) etsi(0)
        itsDomain(5) wg1(1) ts(102894) cdd(2) version(2)}
  GenerationDeltaTime
  FROM CAM-PDU-Descriptions {itu-t(0) identified-organization(4) etsi(0)
    itsDomain(5) wg1(1) en(302637) cam(2) version(2)}
  ;
  VAM ::= SEQUENCE {
    header ItsPduHeaderVam,
    vam VruAwareness
  }
  -- contains StationId
  -- StationId should change when certificate changes, or when VRU
  -- enters or leaves a cluster (as leader or otherwise)
  ItsPduHeaderVam ::= ItsPduHeader(WITH COMPONENTS {
    ...,
    messageID(vam)
  })
  VruAwareness ::= SEQUENCE {
    generationDeltaTime GenerationDeltaTime,
-- @details managementParameters
-- The management Parameters comprise basic information about the originating ITS-S and
-- other common information, which may not be specific to VRU, RSUs or vehicles
-- originated VAM such as Segmentation information of VAM.
managementParameters                VamManagementParameters OPTIONAL,
    vamParameters             VamParameters,
    vamExtensions             SEQUENCE (SIZE(0..MAX)) OF VamExtension
  }
-- @brief VAM Management Parameters
-- The VAM Management Parameters comprise basic information about the originating ITS-S,
-- which are not specific to VRU, RSUs or vehicles originated VAM
-- such as Segmentation information of VAM. Default is VAM not segmented
VamManagementParameters ::= SEQUENCE {
-- @details Originating Station Type
-- OriginatingStationType by Default is VRU for Single VRU and VRU cluster VAM.
--However it can be RSU (or Designated Vehicles in future) for Infrastructure VAM
originatingStationType OriginatingStationType,
-- @details VAM Types
-- VamType indicates types of VAM
-- Single VRU VAM (e.g., transmitted by VRU ITS-S in VRU-ACTIVE-STANDALONE VBS State)
-- VRU Cluster VAM (e.g., transmitted by VRU ITS-S in VRU-ACTIVE-CLUSTERHEAD VBS State)
-- Infrastructure VAM (e.g., transmitted by R-ITS-S)
-- and so on
vamType                             VamType OPTIONAL,
-- @details vamSegmentInfo
-- The VAM segment info describes the segmentation information in case
-- the data for VAM transmission needs to be split up into multiple messages due to
-- message size constraints.
vamSegmentInfo VamSegmentInfo OPTIONAL,
-- @details OriginatingStationReferencePosition
-- It provides reference position of the VAM reporting station. It may be same as
-- SingleVruPhysicalInfo referencePoint in case of individual VAM originated by VRU station
Type
-- and can be skipped.
-- However, it may be different if VAM is reported by RSU; or VAM is Cluster VAM.
-- Default is stationReferencePosition is same as referencePoint DE.
originatingStationReferencePosition         OriginatingReferencePosition OPTIONAL,
  ...
}
-- @brief VamType
-- VamType indicates types of VAM
-- Single VRU VAM (e.g., transmitted by VRU ITS-S in VRU-ACTIVE-STANDALONE VBS State)
-- VRU Cluster VAM (e.g., transmitted by VRU ITS-S in VRU-ACTIVE-CLUSTERHEAD VBS State)
-- Infrastructure VAM (e.g., transmitted by R-ITS-S)
-- and so on
```

TABLE 2.5-1-continued

```
VamType ::= INTEGER {
    singleVruVam            (0), -- Single VRU VAM (e.g., transmitted by VRU ITS-S
                                 -- in VRU-ACTIVE-STANDALONE VBS State)
  vruClusterVam           (1), -- VRU Cluster VAM (e.g., transmitted by VRU ITS-S
                                 -- in VRU-ACTIVE-CLUSTERHEAD VBS State)
  infrastructureVam         (2), -- Infrastructure VAM (e.g., transmitted by a R-ITS-S)
  vehicleVam                (3), -- vehicle VAM (e.g., transmitted by a V-ITS-S)
}(0..7)
-- @brief VAM Segment Information
-- Information about segmented VAM and the number of generated segments.
VamSegmentInfo ::= SEQUENCE {
-- @details totalMsgSegments
-- The total number of messages required on the transmitter side to distribute the
information
-- to several messages.
totalMsgSegments SegmentCount,
-- @details thisSegmentNum
-- Indicates the number of the received message out of the total number of messages
-- used to realize segmentation.
thisSegmentNum SegmentCount
}
-- @brief Segment Count
-- A data element for representing either the total number of generated segments by the
transmitter
-- or the identification of the received message segment.
-- @unit n/a
SegmentCount ::= INTEGER( 1..32)
  VamParameters ::= SEQUENCE {
    activeProfile             VruProfileId,
    physicalProperties             VruPhysicalProperties,
    dyanmicProperties             VruDynamicProperties,
    ...
  }
  VruProfileId ::= ENUMERATED {
    pedestrian(1), lowSpeedTwoWheel(2), fullSpeedTwoWheel(3), animal(4), ...
  }
  VruPhysicalProperties ::= CHOICE {
    singleVruPhysInfo             SingleVruPhysicalInfo,
    clusterPhysInfo             VruClusterPhysicalInfo,
    ...
  }
  SingleVruPhysicalInfo ::= SEQUENCE {
    referencePoint             ReferencePosition,
    orientation   Heading,
    clusterJoinInfo            ClusterJoinInfo OPTIONAL,
    clusterExitInfo            StationID OPTIONAL,
    ...
  }
  ClusterJoinInfo ::= SEQUENCE {
    clusterId StationID,
    countdown INTEGER(0..7),
    ...
  }
  VruClusterPhysicalInfo ::= SEQUENCE {
    referencePoint            ReferencePosition, -- middle of front edge of cluster
    heading             HeadingValue, -- direction of perp. line through referencePoint
    width            VruClusterSideLength, -- width (with referencePoint in the
                        -- middle) in units of 10 cm
    length             VruClusterSideLength, -- length (from referencePoint to rear of
                        -- cluster) in units of 10 cm
    number             INTEGER(0..255), -- 0 means unknown
    ...
  }
  VruClusterSideLength ::= INTEGER {tenCentimeters(1), outOfRange(61), unavailable(62)}
(1..62)
  -- none of these fields are OPTIONAL as each of the types below has an "unknown" value,
which
  -- should be used if the value isn't provided.
  VruDynamicProperties ::= SEQUENCE {
    heading             Heading,
    speed             Speed,
    longitudinalAcceleration LongitudinalAcceleration,
    laterialAcceleration                LateralAcceleration,
    verticalAcceleration                VerticalAcceleration,
    yawRate             YawRate,
    pastLocations             PathHistory,
    predictedLocations             PathHistory,
    ...
  }
  VamExtension ::= CHOICE {
```

TABLE 2.5-1-continued

```
    dummy   NULL,
    ...
  }
END
```

3. VAM Generation and Transmission by Non-VRU ITS-Ss

Vulnerable Road User Awareness Messages (VAMs) are messages transmitted from VRU ITSs to create and maintain awareness of vulnerable road users participating in the VRU system. A VAM contains status and attribute information of the originating VRU ITS-S. The content may vary depending on the profile of the VRU ITS-S. A typical status information includes time, position, motion state, cluster status, and others. Typical attribute information includes data about the VRU profile, type, dimensions, and others. The generation, transmission and reception of VAM are managed by the VRU basic service (VBS). The VRU basic service is a facilities layer entity that operates the VAM protocol. It provides three main services: handling the VRU role, sending and receiving of VAMs to enhance VRU safety. It also specifies the VRU clustering concept in presence of high VRU density to reduce VAM communication overhead. In VRU clustering, closely located VRUs with coherent speed and heading form a facility layer VRU cluster and only cluster head VRU transmits the VAM. Other VRUs in the cluster skips VAM transmission. Active VRUs (not in VRU cluster) send individual VAM (called Single VRU VAM).

The VAM originated from VRU ITS-s does not address awareness of non-equipped VRUs (e.g., VRUs without any ITS-S for Tx, Rx or both Tx/Rx) effectively. In many crowded situations such as busy intersection, zebra crossing, school drop off and pick up area, public bus stops, school bus stops, busy crossing near shopping mall, construction work area, and others, both equipped and non-equipped VRUs will be present. Cluster formation and management by an individual VRU ITS-S (as the cluster-leader) is limited by the available resources (computational, communication, sensing) VRU cluster formed by an individual VRU cannot include non-equipped VRUs in the cluster. In such cases, the VRUs should be able to decode and interpret the collective perception message (CPM) to obtain the full environment awareness for safety. To this end, Infrastructure (such as R-ITS-S) can play a vital role in detecting (via sensors) potential VRUs and grouping them together into clusters in such scenarios including both equipped and non-equipped VRUs. For example, a static RSE may be installed at busy intersection, zebra crossing, school drop off and pick up area, busy crossing near shopping mall, and the like while a mobile RSE can be installed on designated vehicles (like school bus, city bus, service vehicle) to serve as infrastructure/RSE on public bus stops, school bus stops, construction work area, and/or the like, for this purpose.

Although current standards (see e.g., [TS103300-3]) discuss various aspects of VAM format and transmission by VRU ITS-S only, the current standards do not enable non-VRU ITS-Ss to transmit VAMs.

Existing VAM allows information sharing of either one ego-VRU or one VRU cluster. However, in case of non-VRU ITS-S (e.g., RSE or designated vehicles) VAM, non-VRU ITS-S may be able to detect one or more individual VRUs, and/or one or more VRU clusters in the FOV which need to be reported in the VAM. Modifications to the existing VAM format to enable non-VRU ITS-S VAM are presented herein. In a non-VRU ITS-S VAM, the VRU awareness contents of one or more VRUs and/or one or more VRU clusters are carried.

In the following discussion, VAMs generated and transmitted by non-VRU ITS-Ss (e.g., R-ITS-S 130, V-ITS-S 110, and/or the like) may be referred to as "non-VRU VAMs" (or "nVAMs") and VAMs generated and transmitted by infrastructure equipment (e.g., R-ITS-S 130) may be referred to as "infrastructure VAMs" (or "iVAMs"). Although iVAMs are transmitted by infrastructure equipment and nVAMs are transmitted by other non-VRU ITS-Ss (e.g., V-ITS-S 110, R-ITS-S 130, and/or the like), the these terms may be used interchangeably throughout the present disclosure.

In addition, detailed mechanism of non-VRU ITS-S assisted VRU clustering including both equipped and non-equipped VRUs are considered where a non-VRU ITS-S (such as R-ITS-S) acts as a cluster leader and transmits non-VRU ITS-S VAM.

Reporting all detected VRUs and/or VRU clusters individually by non-VRU ITS can be very inefficient in certain scenarios such as presence of large number of VRUs or overlapping view of VRUs or occlusion of VRUs in the FOV of sensors at the originating non-VRU ITS-S. Such reporting via existing DFs/DEs in the VAM in case of large number of perceived VRUs and/or VRU clusters require large communication overhead and increased delay in reporting all VRUs and/or VRU clusters. Non-VRU ITS-Ss may need to use self-admission control, redundancy mitigation or self-contained segmentation to manage the congestion in the access layers. The self-contained segments are independent VAM messages and can be transmitted in each successive VAM generation events.

3.1. Infrastructure VAMs

Infrastructure assisted VRU clustering includes both equipped and non-equipped VRUs where infrastructure (e.g., R-ITS-S 130) acts as cluster head and transmits VAMs. These VAMs may be referred to herein as "infrastructure VAM" (or "iVAMs"). Accordingly, the existing VBS is extended to allow non-VRU ITS-S (e.g., R-ITS-S 130 and/or designated V-ITS-S 110) to transmit infrastructure VAMs ("iVAM"). VAM triggering conditions/events and VAM format are also changed for this purpose. Additionally or alternatively, some or all of the trigger events/conditions for iVAMs/nVAMs and/or and VAM format discussed infra are specific to non-VRUs and/or specific to infrastructure equipment.

VAM format specifications (see e.g., [TS103300-3]) lack details of contents to be included in the VRU cluster VAM. Contents for the VRU cluster VAMs transmitted either by non-VRU cluster head, and new DFs and DEs that include such contents in the VAM, are discussed infra.

Existing VAMs allow information sharing about either one VRU or one VRU Cluster. However, in case of non-VRU ITS-S VAM transmission, non-VRU ITS-Ss may detect one or more individual VRUs 116, and/or one or more VRU clusters that need to be reported in the VAM. As discussed infra, the VBS and VAM format are extended to enable non-VRU ITS-S to report VRU Awareness content for one or more VRUs 116 and/or one or more VRU clusters in the same infrastructure VAM.

Current standards (see e.g., [TS103300-3]) do not allow segmentation of VAMs. However, VAM segmentation is inevitable to limit VAM size below a maximum transmission unit (MTU) supported by lower layers. Specifically, VAM segmentation can be useful for iVAMs reported by non-VRU ITS-Ss because iVAMs include VRU Awareness content for one or more VRUs 116 and/or one or more VRU clusters in the same VAM. VBS operation(s) and VAM format are modified as discussed infra to enable segmentation of a VAM into two or more VAM segments. Per-candidate (e.g., perceived VRU and VRU clusters selected to include in VAM to be segmented) utility function calculations are also discussed herein, which serves as priority to decide an order of inclusion in the consecutive VAM segments. Various implementations herein include mechanisms of infrastructure (e.g., RSU, edge node, and/or the like) assisted VRU clustering including both equipped and non-equipped VRUs where infrastructure (e.g., R-ITS-S 130) acts as cluster head and transmits VAM (called Infrastructure VAM); extend existing VRU Basic Service (VBS) to enable non-VRU ITS-S (such as RSU or designated vehicles) to transmit infrastructure VAM, including changes in VAM triggering and VAM format for this purpose; provide contents for the VRU Cluster VAMs (transmitted either by V-ITS-S Cluster Head or R-ITS-S cluster head) and new DFs and DEs to include these provided contents in the VAM; modify to the existing VBS and VAM format to enable non-VRU ITS-S to report VRU Awareness content for one or more VRU and/or one or more VRU Clusters in the same Infrastructure VAM; modify VBS operation and VAM format to enable Segmentation of VAM into two or more segments, including per-candidate (e.g., perceived VRU and VRU Clusters selected to include in VAM to be segmented) utility function calculation which serves as priority to decide order of inclusion in the consecutive VAM segments; provide new DEs/DFs for VAM to enable CH (cluster head) sending multiple indication along with disband reason to its members before disbanding the VRU cluster. In the existing VAM format, CH cannot send any disbanding indication before disbanding the VRU cluster; extend exiting VAM to enable CH Role handover to new ITS-S if the exiting CH is no more interested in CH role, CH is about to move out of VRU cluster bounding box, and/or the like; provide a new container (ClusterMergeInfo) is to merge two or more clusters which come closer with partially or fully overlapped bounding boxes; and provide a new container (ClusterSplitInfo) to enable splitting of a cluster in two or more new clusters.

In various implementations, stations provide ITS services, which involve the transmission and reception of ITS service messages (e.g., VAMs). In the facilities layer messages, an application container would be used along with ITS PDU header(s) and/or ITS service containers.

Some implementations can be specified and/or standardized in ETSI ITS standards/frameworks and/or the edge computing standards/frameworks (e.g., Multi-access Edge Computing (MEC) or the like) and are readily scalable across a city or geographical area. In these implementations, one or more edge computing applications (e.g., MEC apps) may provide the VBS and generate, receive, and transmit VAMs.

3.1.1. VAM Generation by Non-VRU ITS-Ss

Non-VRU ITS-Ss may include, for example, R-ITS-Ss 130 and/or V-ITS-Ss 110. Current standards and solutions (see e.g., [TS103300-3]) do not address awareness of non-equipped VRUs effectively. In many cases such as at busy intersection, zebra crossing, school drop off and pick up area, public bus stops, school bus stops, busy crossing near shopping mall, construction work area, and so on, both equipped and non-equipped VRUs are present. Forming cluster by an individual VRU may not be easy and also VRU cluster formed by a VRU cannot include non-equipped VRUs in the cluster. Infrastructure (e.g., RSU ITS-S) can play a vital role in detecting potential VRU clusters in such scenarios including equipped and non-equipped both VRUs. For example, a static RSU may be installed at busy intersection, zebra crossing, school drop off and pick up area, busy crossing near shopping mall, and/or the like, while a mobile RSU can be installed on designated vehicles (like school bus, city bus, service vehicle) to serve as infrastructure/RSU on public bus stops, school bus stops, construction work area, and/or the like for this purpose. Similarly sensors at vehicles can detect equipped as well as non-equipped VRUs or VRU clusters and report a VAM. Any VAM transmitted from Non-VRU ITS-S (e.g., R-ITS-Ss 130 and/or V-ITS-Ss 110) are referred to as 'Infrastructure VAM'. The following discussion is related to an example of R-ITS-S/RSU transmitting and/or receiving VAMs, however, the description herein are also applicable to VAM generated and transmitted/received from vehicle ITS-S as well.

Non-VRU ITS-S (e.g., R-ITS-Ss 130) continuously detect/perceive equipped as well as non-equipped VRUs from local sensors and/or receiving V2X messages such as BSM, CAM, DENM, CPM, VAM, and/or the like, from vehicles and VRUs. RSU may have detected several VRUs at the intersection or on the side walk.

In another case, R-ITS-Ss 130 (e.g., Roadside Equipment (RSE), Road Side Units (RSUs), and/or the like) may be co-located with smart traffic light controller and/or other traffic control elements. Several VRUs waiting to cross an intersection may has asked or indicated Traffic light-controller to cross the intersection. RSU may get these information from traffic-light container and use this information to create a VRU cluster.

Once a number of VRUs 116 are detected by an R-ITS-S 130, it determines to generate Infrastructure VAM as described in Section 2.2 infra. If several perceived VRUs 116 (e.g., beyond a threshold number) is very close to each other with coherent speed and heading as defined in (see e.g., [TS103300-3]), an R-ITS-S 130 may determine to report them as a cluster acting as a cluster head (CH). RSU may find more than one such VRU cluster for reporting, e.g., VRUs crossing intersections and VRUs walking on the side walk. Some VRUs may need to be reported individually as they may be far away from other VRUs or their speed may be different beyond a speed-difference threshold.

Once an R-ITS-S 130 determines to report one or more individual perceived VRUs and/or one or more perceived VRU clusters, it generates a VAM and report them together in a single Infrastructure VAM. The R-ITS-S 130 indicates that it is serving as cluster head to the perceived clusters by sending VAM and specifying the cluster bounding box. Equipped VRUs in the reported bounding box stops sending VAM.

In some cases, a VRU cluster may already be reported by a VRU-ITS-S and RSU perceives non-equipped VRUs within the reported cluster bounding box and/or around the bounding box. RSU may send VAM including both equipped and non-equipped VRUs with same or increased bounding box. VRU-ITS-S acting as cluster head then stops sending VRU Cluster VAM 3.1.2. Facilities VAM Generation Frequency Management for VRU Device 3.1.2.1. VAM Generation and Frequency for Infrastructure VAM Each VAM generation event results in the generation of one VAM. The generated VAM may be segmented as discussed infra.

The minimum time elapsed between the start of consecutive VAM generation events should be equal to or larger than a value T_GenVam and T_GenVam is limited to T_GenVamMin≤T_GenVam≤T_GenVamMax, where T_GenVamMin=Minimum time between consecutive VAM transmissions (e.g., 100 ms) and T_GenVamMax=Maximum time between consecutive VAM transmissions (e.g., 500 ms).

If information about channel congestion at access layer is available at Facility layer, T_GenVam should be adjusted accordingly, e.g., longer T_GenVam can be defined for higher channel congestion case. Congestion layer at access layer can be estimated at facility layer as well, for example, by monitoring the average success rate of periodic data (e.g., BSM, CAM, PSM, VAM) from the neighbors over a past moving window of time. Drop in such average success rate can indicate increased congestion level at access layer.

The parameter T_GenVam should be provided by the management entity at facility layer. If the management entity provides this parameter with a value above T_GenVamMax, then T_GenVam is set to T_GenVamMax. If the value is below T_GenVamMin or if this parameter is not provided, then the T_GenVam is set to T_GenVamMin. The parameter T_GenVam represents the currently valid lower limit for the time elapsed between consecutive VAM generation events.

3.1.2.2. Transmitting VAMs at Non-VRU ITS-S

A VRU ITS-S in VRU-ACTIVE-STANDALONE state shall send 'individual VAMs', while VRU ITS-S in VRU-ACTIVE-CLUSTERLEADER VBS state shall transmit 'Cluster VAMs' on behalf of the VRU cluster. Cluster member VRU ITS-S in VRU-PASSIVE VBS State shall send individual VAMs containing VruClusterOperationContainer while leaving the VRU cluster. VRU ITS-S in VRU-ACTIVE-STANDALONE shall send VAM as 'individual VAM' containing VruClusterOperationContainer while joining the VRU cluster.

In some cases, non-VRU ITS-S (e.g., Static RSE or Mobile RSE on designated vehicles like school bus, construction work vehicle, police cars) may need to transmit a VAM (e.g., Infrastructure VAM) specifically when non-equipped VRUs are detected. Such Infrastructure VAM may be transmitted for reporting either individual detected VRUs or cluster(s) of VRUs. Non-VRU ITS-S may select to transmit Infrastructure VAM reporting individual detected VRUs and cluster(s) of VRUs in the same Infrastructure VAM by including zero or more individual detected VRUs and zero or more clusters of VRUs in the same infrastructure VAM.

3.1.2.3. VAM Transmission Management by VBS at Non-VRU ITS-S

If Non-VRU ITS-S is not already transmitting consecutive (such as periodic) infrastructure VAM and the infrastructure VAM transmission does not subject to redundancy mitigation techniques, first time Infrastructure VAM should be generated immediately or at earliest time for transmission when any of the following conditions is satisfied: (1) At least one VRU is detected by originating Non-VRU ITS-S where the detected VRU has not transmitted VAM for at least T_GenVamMax duration; the perceived location of the detected VRU does not fall in a bounding box of Cluster specified in any VRU Cluster VAMs received by originating Non-VRU ITS-S during last T_GenVamMax duration; and the detected VRU is not included in any Infrastructure VAMs received by originating Non-VRU ITS-S during last T_GenVamMax duration; and/or (2) At least one VRU Cluster is detected by originating Non-VRU ITS-S where the Cluster head of the detected VRU Cluster has not transmitted VRU Cluster VAM for at least T_GenVamMax duration; the perceived bounding box of the detected VRU cluster does not overlap more than a predefined threshold maxInterVRUClusterOverlapInfrastructureVAM with the bounding box of any VRU Clusters specified in VRU Cluster VAMs or Infrastructure VAMs received by originating Non-VRU ITS-S during last T_GenVamMax duration.

Consecutive Infrastructure VAM Transmission is contingent to conditions as described here. Consecutive Infrastructure VAM generation events should occur at an interval equal to or larger than T_GenVam. An Infrastructure VAM should be generated for transmission as part of a generation event if the originating non-VRU ITS-S has at least one selected perceived VRU or VRU Cluster to be included in current Infrastructure VAM.

The current VAM capability is extended to enable non-VRU ITS-S (e.g., RSU or Vehicle) to transmit VAM. Current VAM format allows only VRU ITS-S (as an individual VRU or as a VRU Cluster head) to send VAM. Since VAM transmitting ITS-S may not be VRU as in case of VAM generated by R-ITS-S (or V-ITS-S), new data elements (originatingStationType and originatingStationReferencePosition) are included in the existing VAM to enable non-VRU ITS-S to transmit VAM. These new DEs are added to the new 'VamManagementParameters' DF/Container. OriginatingStationType indicates whether VAM transmitting station is VRU, vehicle, or RSU. originatingStationReferencePosition provides reference point for all measurements related to reported VRU or VRU cluster in case of non-VRU ITS-S generated VAM. A new DE VamType to is introduced to indicate whether VAM is Single VRU VAM, VRU Cluster VAM or Infrastructure VAM and so on as shown by Table 3.1-1. The current VAM capability is extended to enable non-VRU ITS-S to report VRU Awareness content for one or more VRU and/or one or more VRU Clusters in the same VAM—by defining 'vamParameters SEQUENCE (SIZE(0 . . . MAX)) OF VamParameters,'. Existing VAM allows information sharing about either one VRU or one VRU Cluster in each VAM. These changes are shown by Table 3.1-1.

TABLE 3.1-1

```
VAM ::= SEQUENCE {
  header ItsPduHeaderVam,
  vam VruAwareness
  }
  -- contains StationId
```

TABLE 3.1-1-continued

```
  -- StationId should change when certificate changes, or when VRU
  -- enters or leaves a cluster (as leader or otherwise)
  ItsPduHeaderVam ::= ItsPduHeader(WITH COMPONENTS {
  ...,
  messageID(vam)
  })
  VruAwareness ::= SEQUENCE {
  generationDeltaTime GenerationDeltaTime,
        managementParameters VamManagementParameters OPTIONAL,
  vamParameters SEQUENCE (SIZE(0..MAX)) OF VamParameters,
  vamExtensions SEQUENCE (SIZE(0..MAX)) OF VamExtension
  }
VamManagementParameters ::= SEQUENCE {
originatingStationType              OriginatingStationType,
vamType                             VamType OPTIONAL,
vamSegmentInfo                      VamSegmentInfo OPTIONAL,
originatingStationReferencePosition OriginatingReferencePosition OPTIONAL,
  ...
}
VamType ::= INTEGER {
     singleVruVam   (0), -- Single VRU VAM (e.g., transmitted by VRU ITS-S
                          -- in VRU-ACTIVE-STANDALONE VBS State)
  vruClusterVam   (1), -- VRU Cluster VAM (e.g., transmitted by VRU ITS-S
                          -- in VRU-ACTIVE-CLUSTERHEAD VBS State)
  infrastructureVam (2), -- Infrastructure VAM (e.g., transmitted by a R-ITS-S)
  vehicleVam        (3), -- vehicle VAM (e.g., transmitted by a V-ITS-S)
}(0..7)
VamSegmentInfo ::= SEQUENCE {
totalMsgSegments SegmentCount,
thisSegmentNum SegmentCount
}
SegmentCount ::= INTEGER( 1..32)
```

A new ClusterID DE is used to specify cluster ID enabling non-VRU ITS-S (e.g., R-ITS-S and V-ITS-S) to report multiple VRU clusters in the same VAM. The new clusterID includes Station ID of cluster head as well as intraClusterHeadID to separate multiple clusters lead/managed by the same non-VRU ITS-S. An example ClusterID DE is shown by Table 3.1-2.

TABLE 3.1-2

```
ClusterID ::= SEQUENCE {
  clusterHeadId StationID,
    -- @details intraClusterHeadID
  -- it differenentiate Clusters for which same ITS-S (e.g., R-ITS-S)
  serving as CH
    -- Needed for Infrastructure VAM (VAM generated by RSU or
    Vehicle)
    -- Default is that ClusterHead is leading only one cluster
    intraClusterHeadID INTEGER(0..128) OPTIONAL,
}
```

Infrastructure VAM should be generated immediately or at earliest time for transmission if Non-VRU ITS-S is not already transmitting consecutive (e.g., periodic) infrastructure VAM, the infrastructure VAM transmission does not subject to redundancy mitigation techniques and any of the following conditions is satisfied: (1) At least one VRU is detected by originating Non-VRU ITS-S where the detected VRU has not transmitted VAM for at least T_GenVamMax duration; the perceived location of the detected VRU does not fall in abounding box of Cluster specified in any VRU Cluster VAMs received by originating Non-VRU ITS-S during last T_GenVamMax duration; and the detected VRU is not included in any Infrastructure VAMs received by originating Non-VRU ITS-S during last T_GenVamMax duration; and/or at least one VRU Cluster is detected by originating Non-VRU ITS-S where the Cluster head of the detected VRU Cluster has not transmitted VRU Cluster VAM for at least T_GenVamMax duration; the perceived bounding box of the detected VRU cluster does not overlap more than a predefined threshold (e.g., 80%) with the bounding box of any VRU Clusters specified in VRU Cluster VAMs or Infrastructure VAMs received by originating Non-VRU ITS-S during last T_GenVamMax duration.

Consecutive Infrastructure VAM Transmission is contingent to conditions as described infra. Consecutive Infrastructure VAM generation events should occur at an interval equal to or larger than T_GenVam. An Infrastructure VAM should be generated for transmission as part of a generation event if the originating non-VRU ITS-S has at least one selected perceived VRU or VRU Cluster to be included in current Infrastructure VAM.

3.1.2.4. Perceived VRU Inclusion Management in Current Infrastructure VAM and/or Other Non-VRU ITS-S VAM The perceived VRUs considered for inclusion in current Infrastructure VAM should fulfil all these conditions: (1) originating non-VRU ITS-S has not received any VAM from the detected VRU for at least T_GenVamMax duration; (2) the perceived location of the detected VRU does not fall in a bounding box of VRU Clusters specified in any VRU Cluster VAMs received by originating Non-VRU ITS-S during last T_GenVamMax duration; (3) the detected VRU is not included in any Infrastructure VAMs received by originating Non-VRU ITS-S during last T_GenVamMax duration; and/or (4) the detected VRU does not fall in any Infrastructure VAMs being reported (including VRU clusters to be included in the current Infrastructure VAM) by originating Non-VRU ITS-S.

A VRU perceived with sufficient confidence level fulfilling above conditions and not subject to redundancy mitigation techniques should be selected for inclusion in the current VAM generation event if the perceived VRU additionally satisfy one of the following conditions: (1) the VRU has first been detected by originating Non-VRU ITS-S after the last Infrastructure VAM generation event; (2) the time elapsed since the last time the perceived VRU was included in an Infrastructure VAM exceeds T_GenVamMax; (3) the Euclidian absolute distance between the current estimated position of the reference point for the perceived VRU and the estimated position of the reference point for the perceived VRU lastly included in the Infrastructure VAM exceeds a predefined threshold minReferencePointPosinonChangeThreshold (e.g., 4 m); (4) the difference between the current estimated ground speed of the reference point for the perceived VRU and the estimated absolute speed of the reference point for the perceived VRU lastly included in the Infrastructure VAM exceeds a predefined threshold minGroundSpeedChangeThreshold (e.g., 0.5 m/s); (5) the difference between the orientation of the vector of the current estimated ground velocity of the reference point for the perceived VRU and the estimated orientation of the vector of the ground velocity of the reference point for the perceived VRU lastly included in the Infrastructure VAM exceeds a predefined threshold minGroundVelocityOrientationChangeThreshold (e.g., 4 degrees); (6) the difference between the current estimated collision probability (e.g., as measured by Trajectory Interception Probability) of the perceived VRU with vehicle(s) or other VRU(s) and the estimated collision probability with vehicle(s) or other VRU(s) lastly reported in an Infrastructure VAM exceeds a predefined threshold (e.g., 4%); (7) the one or more new vehicles or other VRUs (e.g., VRU Profile 3—Motorcyclist) have come closer than minimum safe lateral distance (MSLaD) laterally, closer than minimum safe longitudinal distance (MSLoD) longitudinally and closer than minimum safe vertical distance (MSVD) vertically to the VRU after the lastly transmitted Infrastructure VAM; and/or (8) the one or more vehicles or other VRUs (with VRU Profile 3—Motorcyclist) have moved farther than minimum safe lateral distance (MSLaD) laterally, farther than minimum safe longitudinal distance (MSLoD) longitudinally and farther than minimum safe vertical distance (MSVD) vertically to the VRU and these vehicles or these VRUs (e.g., VRU Profile 3—Motorcyclist) were closer than minimum safe lateral distance (MSLaD) laterally, closer than minimum safe longitudinal distance (MSLoD) longitudinally and closer than minimum safe vertical distance (MSVD) vertically to the VRU in lastly transmitted Infrastructure VAM.

3.1.2.5. Perceived VRU Cluster Inclusion Management in Current Infrastructure VAM and/or Other Non-VRU ITS-S VAM The perceived VRU Clusters considered for inclusion in current Infrastructure VAM should fulfil all of the following conditions: (1) the perceived bounding box of the detected VRU cluster does not overlap more than X % (80%) with the bounding box of VRU Cluster specified in any of the VRU Cluster VAMs or Infrastructure VAMs received by originating Non-VRU ITS-S during last T_GenVamMax duration.

A VRU Cluster perceived with sufficient confidence level fulfilling above conditions and not subject to redundancy mitigation techniques should be selected for inclusion in the current VAM generation if the perceived VRU Cluster additionally satisfy one of the following conditions: (1) the VRU Cluster has first been detected by originating Non-VRU ITS-S after the last Infrastructure VAM generation event; (2) the time elapsed since the last time the perceived VRU Cluster was included in an Infrastructure VAM exceeds T_GenVamMax; (3) the Euclidian absolute distance between the current estimated position of the reference point of the perceived VRU Cluster and the estimated position of the reference point of the perceived VRU Cluster lastly included in an Infrastructure VAM exceeds a predefined threshold minReferencePointPositionChangeThreshold (e.g., 4 m); (4) the difference between the current estimated Width of the perceived VRU Cluster and the estimated Width of the perceived VRU Cluster included in the lastly transmitted VAM exceeds a predefined threshold minClusterWidthChangeThreshold (e.g., 2 m); (5) the difference between the current estimated Length of the perceived VRU Cluster and the estimated Length of the perceived VRU Cluster included in the lastly transmitted VAM exceeds a predefined threshold minClusterLengthChangeThreshold (e.g., 2 m); (6) the difference between the current estimated ground speed of the reference point of the perceived VRU Cluster and the estimated absolute speed of the reference point included in the lastly transmitted VAM exceeds a predefined threshold minGroundSpeedChangeThreshold (e.g., 0.5 m/s); (7) the difference between the orientation of the vector of the current estimated ground velocity of the reference point of the perceived VRU Cluster and the estimated orientation of the vector of the ground velocity of the reference point included in the lastly transmitted Infrastructure VAM exceeds a predefined threshold minGroundVelocityOrientationChangeThreshold (e.g., 4 degrees); (8) the difference between the current estimated probability of collision (e.g., as measured by Trajectory Interception Probability of trajectory of other vehicles/VRUs with trajectory of VRU Cluster Bounding Box) of the perceived VRU Cluster with vehicle(s) or other VRU(s) and the estimated collision probability with vehicle(s) or other VRU(s) lastly reported in an Infrastructure VAM exceeds a predefined threshold (e.g., 4%); (9) the originating non-VRU ITS-S has determined to merge the perceived cluster with other cluster(s) after previous Infrastructure VAM generation event; (10) the originating non-VRU ITS-S has determined to split the current cluster after previous Infrastructure VAM generation event; (11) the originating non-VRU ITS-S has determined change in type of perceived VRU cluster (e.g., from Homogeneous to Heterogeneous Cluster or vice versa) after previous Infrastructure VAM generation event; (12) the originating non-VRU ITS-S has determined that one or more new vehicles or non-member VRUs (e.g., VRU Profile 3—Motorcyclist) have come closer than minimum safe lateral distance (MSLaD) laterally, closer than minimum safe longitudinal distance (MSLoD) longitudinally and closer than minimum safe vertical distance (MSVD) vertically to the Cluster bounding box after the lastly transmitted InfrastructureVAM; and/or (13) the originating Non-VRU ITS-S has determined that one or more vehicles or non-member VRUs (with VRU Profile 3—Motorcyclist) have moved farther than minimum safe lateral distance (MSLaD) laterally, farther than minimum safe longitudinal distance (MSLoD) longitudinally and farther than minimum safe vertical distance (MSVD) vertically to the Cluster Bounding Box and these vehicles or these VRUs (e.g., VRU Profile 3—Motorcyclist) were closer than the minimum safe lateral distance (MSLaD) laterally, closer than minimum safe longitudinal distance (MSLoD) longitudinally and closer than minimum safe vertical distance (MSVD) vertically to the Cluster Bounding Box in lastly transmitted Infrastructure VAM.

The description extends current VAM capability to enable Segmentation of VAM into two or more segments. Current VAM format does not allow segmentation. VAM segmentation is inevitable to limit VAM size below maximum transmission unit (MTU) supported by lower layer—specifically for the case of Infrastructure VAM reported by non-VRU ITS-S (like RSU). Note that proposed infrastructure VAM can include VRU Awareness content for one or more VRUs and/or one or more VRU Clusters in the same VAM message. A new container 'VamManagementParameters' is added to the existing VAM structure in order to carry segmentation information as shown by Table 3.1-3.

TABLE 3.1-3

```
VAM ::= SEQUENCE {
  header ItsPduHeaderVam,
  vam VruAwareness
  }
  -- contains StationId
  -- StationId should change when certificate changes, or when VRU
  -- enters or leaves a cluster (as leader or otherwise)
  ItsPduHeaderVam ::= ItsPduHeader (WITH COMPONENTS {
  ...,
  messageID(vam)
  })
  VruAwareness ::= SEQUENCE {
  generationDeltaTime GenerationDeltaTime,
    managementParameters VamManagementParameters OPTIONAL,
  vamParameters SEQUENCE (SIZE(0..MAX)) OF VamParameters,
  vamExtensions SEQUENCE (SIZE(0..MAX)) OF VamExtension
  }
VamManagementParameters ::= SEQUENCE {
originatingStationType                OriginatingStationType,
vamType                               VamType,
vamSegmentInfo                        VamSegmentInfo OPTIONAL,
originatingStationReferencePosition OriginatingReferencePosition OPTIONAL,
  ...
}
VamSegmentInfo ::= SEQUENCE {
totalMsgSegments SegmentCount,
thisSegmentNum SegmentCount
}
SegmentCount ::= INTEGER( 1..32)
```

3.1.2.6. Other Enhancements to VAM Capabilities

Details of modification in the existing VAM is provided in the Section 2.3 infra. Some of the modifications are as follows.

The description includes modification in the existing VAM format to enable reporting each VRU Profile types present in the VRU cluster by defining 'activeProfile as SEQUENCE (Size(0 . . . MAX)) OF VruProfileId'. Existing VAM format in (see e.g., [TS103300-3]) cannot indicate whether a VRU cluster is homogeneous or heterogeneous and in case of heterogeneous what types of VRUs are present in the VRU cluster. An example is shown by Table 3.1-4.

TABLE 3.1-4

```
VamParameters ::= SEQUENCE {
    -- @details activeProfile
    -- it indicates VRU profile type. It can be more than one for
heterogeneous VRU Cluster
  activeProfile SEQUENCE (Size(0..MAX)) OF VruProfileId,
  physicalProperties VruPhysicalProperties,
  dyanmicProperties VruDynamicProperties,
  ...
  }
```

Changes in the VAM format discussed herein enable a VRU to provide details related to joining and exiting (leaving) a cluster along with the reason(s) for doing so. Table 3.1-5 shows an example of such a VAM.

TABLE 3.1-5

```
ClusterJoinInfo ::= SEQUENCE {
  joiningClusterId ClusterID,
    --@details countdownForClusterJoiningIndication
    -- VRU may send more than one VAM with cluster joining
    indication
    --before it stops VAM transmission. DEFAULT value is 0 - means
  only one indication countdownForClusterJoiningIndication
  INTEGER(0..7),
  ...
```

TABLE 3.1-5-continued

```
  }
    ClusterExitInfo ::= SEQUENCE {
  exitingClusterId ClusterID,
      --@details countdownForClusterExitingIndication
      -- VRU may send more than one VAM with cluster leaving
      indication
      -- to ensure cluster head knows exit. DEFAULT value is 0 - means
only one indication
  countdownForClusterexitingIndication INTEGER(0..7),
      clusterExitReason        ClusterExitReason OPTIONAL,
  ...
  }
-- @brief ExitReason
-- Reasons for exiting the cluster
ExitReason ::= INTEGER {
    clusterHeadLost   (0),
  clusterDisbandedByCH   (1),
  outOfClusterBoundingBox (2),
  outOfClusterSpeedRange (3),
    dueToClusterSplit        (4)
}(0 .. 7)
```

A ClusterID DE is used to specify cluster ID enabling non-VRU ITS-S (e.g., R-ITS-S and V-ITS-S) to report multiple VRU clusters in the same VAM. The new clusterID includes a station ID of the cluster head as well as intraClusterHeadID to separate multiple clusters lead/managed by the same non-VRU ITS-S. Table 3.1-6 shows an example of such a VAM.

TABLE 3.1-6

```
ClusterID ::= SEQUENCE {
  clusterHeadId StationID,
    -- @details intraClusterHeadID
  -- it differenentiate Clusters for which same ITS-S (e.g., R-ITS-S or
  V-ITS-S) serving
    -- as CH Needed for Infrastructure VAM (VAM generated by RSE or
    Vehicle)
    -- Default is that ClusterHead is leading only one cluster
    intraClusterHeadID INTEGER(0..128) OPTIONAL,
}
```

New DEs/DFs are provided to enable a cluster head (CH) to send multiple indications along with disband reason to its members before disbanding a VRU cluster. In the existing VAM format the CH cannot send any disbandment indication before disbanding the VRU cluster, which may result in longer delay for its members to identify disbanding of the cluster. An example is shown by Table 3.1-7.

TABLE 3.1-7

```
VruClusterPhysicalInfo ::= SEQUENCE {
  -- Cluster ID is needed as in case of same non-VRU ITS-S can lead or report
    -- multiple VRU Clusters
    clusterID ClusterID,
    clusterCreationTime GenerationDeltaTime, -- keep track of cluster start time
        referencePoint ReferencePosition, -- middle of front edge of cluster
  heading HeadingValue, -- direction of perp. line through referencePoint
  width VruClusterSideLength, -- width (with referencePoint in the
      -- middle) in units of 10 cm
  length VruClusterSideLength, -- length (from referencePoint to rear of
      -- cluster) in units of 10 cm
  clusterSize ClusterSize, -- 0 means unknown
        -- @details clusterDisbandIndication
        -- CH set this flag to indicate disbanding indication
        -- Default is no Disband in progress
        clusterDisbandIndication                BOOLEAN OPTONAL,
        -- @details clusterDisbandReason
        -- Indicates reason for cluster disband
        clusterDisbandReason                 clusterDisbandReason OPTIONAL,
        --@details countdownForClusterDisbandIndication
        -- CH may send more than one VAM with cluster disband indication
        --before it disbands cluster.
  countdownForClusterDisbandIndication INTEGER(0..7),
  ...
  }
-- @brief ClusterDisbandReason
--Indicates reason for cluster disband
  ClusterDisbandReason                   ::= INTEGER {
    notProvided                                 (0),
    clusteringPurposeCompleted               (1), -- like all members crossed
                                                    -- intersection/zebra-crossing
  cHmovedOutOfClusterBoundingBox         (2),
  noMoreClusterMemberExists              (3)
}(0..7)
```

The descriptions extends of exiting VAM to enable CH Role handover to new ITS-S if the exiting CH is no more interested in CH role, CH is about to move out of VRU cluster bounding box, and/or the like in some scenario. For example, during intersection crossing CH may reach sidewalk on other side of the road and no more needed to be in cluster, while others are still on intersection/zebra-crossing requiring clustering. These changes allow existing CH to elect new CH and handover CH role smoothly. Otherwise, VRU cluster need to be disbanded and a new process of VRU cluster formation need to be started creating significant VAM overhead. Note that after disbanding every member need to send at least one VAM before joining the new cluster. An example is shown by Table 3.1-8.

TABLE 3.1-8

```
VruClusterPhysicalInfo ::= SEQUENCE {
  -- Cluster ID is needed as in case of same non-VRU ITS-S can lead or report
    -- multiple VRU Clusters
    clusterID   ClusterID,
    clusterCreationTime GenerationDeltaTime, -- keep track of cluster start time
        referencePoint ReferencePosition, -- middle of front edge of cluster
  heading HeadingValue, -- direction of perp. line through referencePoint
  width VruClusterSideLength, -- width (with referencePoint in the
      -- middle) in units of 10 cm
  length VruClusterSideLength, -- length (from referencePoint to rear of
      -- cluster) in units of 10 cm
```

TABLE 3.1-8-continued

```
clusterSize ClusterSize, -- 0 means unknown
        -- @details CHRoleHandoverInfo cluster head role handover info
        -- it provides info about new CH elected by the current CH to handover CH role
        -- in some scenario along with reason
        -- For example, during intersection crossing CH may reach sidewalk on other side of
the
        -- road, while others are still on intersection/zebra-crossing requiring clustering
        -- Default is no CH role handover in progress
        cHRoleHandoverInfo CHRoleHandoverInfo OPTIONAL,
  ...
  }
-- @brief CHRoleHandoverInfo cluster head role handover info
-- it provides info about new CH elected by the current CH to handover CH role
-- in some scenario along with reason
-- For example, during intersection crossing CH may reach sidewalk on other side of the
-- road, while others are still on intersection/zebra-crossing requiring clustering
-- Default is no CH role handover in progress
CHRoleHandoverInfo ::= SEQUENCE {
cHRoleHandedOver                    BOOLEAN,
newClusterHeadID                    StationID,
cHRoleHandOverReason                CHRoleHandOverReason OPTIONAL,
...
}
-- @brief CHRoleHandOverReason
-- Indicates reason for cluster head role handover to new CH
-- For example, during intersection crossing CH may reach sidewalk on other side of the
-- road, while others are still on intersection/zebra-crossing requiring clustering
  CHRoleHandOverReason                    ::= INTEGER {
    notProvided                                   (0),
    cHAboutToMoveOutOfClusterBoundingBox          (1),
  cHNoMoreNeedToBeInCluster              (2) -- like CH crossed intersection/zebra-crossing
while other members are still on the intersection/zebra-crossing
}(0..7)
```

A new container (ClusterMergeInfo) is provided to merge two or more clusters which come closer with partially or fully overlapped bounding boxes and have coherent speed and heading. These DEs and DFs in this container allow CHs of these clusters to negotiate, agree and merge the cluster to a new bigger cluster further reducing VAM overhead. The provided containers also keep members of these clusters aware of ongoing merge process. An example is shown by Table 3.1-9.

TABLE 3.1-9

```
-- @brief ClusterMergeInfo
-- contains related info for negotiation during clusters merge;
-- and results of cluster merging
-- Default is no merging in progress
    ClusterMergeInfo ::= SEQUENCE {
    -- @ details mergingWithClusterID
    -- Cluster IDs of other clusters being considered for merging
    mergingWithClustersID SEQUENCE (Size(0..MAX)) OF ClusterID
    -- @details mergeRequested
    -- A cluster can set this flag to request other clusters (in mergingWithClustersID)
    -- to consider merging
    mergeRequested                    BOOLEAN OPTIONAL,
    -- @details mergeAgreedAck
    -- Clusters involved (in mergingWithClustersID) set this flag to accept
    -- merging request. Only agreed clusters are merged
    mergeAgreedAck                    BOOLEAN OPTONAL,
    -- @details leavingCHRoleDueToMerging
    -- if merge is successful, all CHs in negotiation of merging who are not selected
as
    -- CH of merged Cluster set this flag
    leavingCHRoleDueToMerging           BOOLEAN OPTONAL,
    -- @details mergedClusterHeadID
    -- if merge is successful, all CHs of in negotiation of merging who are not
selected as
    -- CH inform their current members about new CH after merge
    mergedClusterHeadID                 ClusterID OPTIONAL,
    ...
  }
```

The description also includes new container (ClusterSplitInfo) to enable splitting of a cluster in two or more new clusters, election of CHs for after-split clusters and keep members informed of on-going split process in a timely manner. An example is shown by Table 3.1-10.

TABLE 3.1-10

```
-- @details ClusterSplitInfo
-- contains related info for negotiation during cluster split;
-- and results of cluster spliting
-- Default is no spliting in progress
    clusterSplitInfo        ::= SEQUENCE {
    -- @details clusterSplitInProgress
    -- current CH indicates to members that split is in process
    -- Default is no split in consideration
    clusterSplitInProgress          BOOLEAN OPTONAL,
    -- @details ClusterSplitReason
    -- current CH indicates to members the reason for split in process
    clusterSplitReason          ClusterSplitReason OPTONAL,
    -- @details leavingCHRoleDueToSpliting
    -- if split is successful and current CH is not selected as
    -- CH of any of the split resulted clusters, set this flag
    leavingCHRoleDueToSpliting   BOOLEAN OPTONAL,
    -- @details splitClusterHeadsID
    -- if split is successful, current CH informs current members about new CHs of
    -- after-split clusters
    splitClusterHeadsID                SEQUENCE (SIZE (0...MAX)) OF ClusterID OPTIONAL,
    ...
  }
-- @brief ClusterSplitReason
-- current CH indicates to members the reason for split in process
ClusterSplitReason ::= INTEGER {
  intersectionCrossing (0), -- some members crosses intersection requiring new cluster
zebraCrossing          (1)
}(0..7)
```

3.1.3. Example Implementations VAMs

An example implementation of the VAM discussed herein including relevant DFs and DEs is shown by Table 3.1-11, which is expressed in ASN.1 representation based on [SAE-J2735].

TABLE 3.1-11

```
VAM-PDU-Descriptions {itu-t(θ) indentified-organization(4) etsi(θ) itsDomain(5)
  wg1(1) ts(103300) vam(3) version(1)}
DEFINITIONS AUTOMATIC TAGS ::=
BEGIN
  IMPORTS
    ItsPduHeader, ReferencwPosition, AccelerationControl,
      Heading, HeadingValue, Speed, StationID, VehicleLength, VehicleWidth, ObjectConfidence
      PathHistory, ProtectedCommunicationZone, PtActivation,
      Latitude, Longitude, ProtectedCommunicationZonesRSU
    FROM ITS-Container {itu-t(θ) identified-organization(4) etsi(θ)
      itsDomain(5) wg1(1) ts(102894) cdd(2) version(2)}
GenerationDeltaTime
FROM CAM-PDU-Descriptions {itu-t(θ) identified-organization(4) etsi(θ)
itsDomain(5) wgl(1) en(302637) cam(2) version(2)}
;
  VAM :: = SEQUENCE {
  header ItsPduHeaderVam,
  vam VruAwareness
  }
  -- contains StationId
  -- StationId should change when certificate changes, or when VRU
  -- enters or leaves a cluster (as leader or otherwise)
  ItsPduHeaderVam ::= ItsPduHeader(WITH COMPONENTS {
  ...,
  messageID(vam)
  })
  VruAwareness ::= SEQUENCE {
  generationDeltaTime GenerationDeltaTime,
      -- @details managementParameters
  -- The management Parameters comprise basic information about the originating ITS-S and
    -- other common information, which may not be specific to VRU, RSUs or vehicles
    -- originated VAM such as Segmentation information of VAM.
    managementParameters VamManagementParameters OPTIONAL,
```

TABLE 3.1-11-continued

```
      -- @details VAM Parameters
      -- VamParameters comprise information about either a VRU or a VRU Cluster included in
      -- this VAM. For VRU ITS-S generated VAM, there will be only one VamParameters
container -- for Single VRU VAM
      -- For Cluster Head VRU ITS-S generated VAM, there will be only one VamParameters
      -- container for VRU Cluster VAM
      -- For Non-VRU ITS-S generated Infrastructure VAM, there will be one or more
      -- VamParameters containers: one container for each of perceived VRUs and one container
      -- for each of perceived VRU
      -- clusters to be included in the current Infrastructure VAM
   vamParameters SEQUENCE (SIZE(0..MAX)) OF VamParameters,
   vamExtensions SEQUENCE (SIZE(0..MAX)) OF VamExtension
   }
-- @breif VAM Management Parameters
-- The VAM Management Parameters comprise basic information about the originating ITS-S,
-- which are not specific to VRU, RSUs or vehicles originated VAM
-- such as Segmentation information of VAM. Default is VAM not segmented
VamManagementParameters ::= SEQUENCE {
-- @details Originating Station Type
-- OriginatingStationType by Default is VRU for Single VRU and VRU cluster VAM.
-- However it can be RSU (or Designated Vehicles in future) for Infrastructure VAM
originatingStationType OriginatingStationType,
-- @details VAM Types
-- VamType indicates types of VAM
-- Single VRU VAM (e.g., transmitted by VRU ITS-S in VRU-ACTIVE-STANDALONE VBS State)
-- VRU Cluster VAM (e.g., transmitted by VRU ITS-S in VRU-ACTIVE-CLUSTERHEAD VBS State)
-- Infrastructure VAM (e.g., transmitted by R-ITS-S)
-- and so on
vamType                 VamType OPTIONAL,
-- @details vamSegmentInfo
-- The VAM segment info describes the segmentation information in case
-- the data for VAM transmission needs to be split up into multiple messages due to
-- message size constraints.
vamSegmentInfo VamSegmentInfo OPTIONAL,
-- @details OriginatingStationReferencePosition
-- It provides reference position of the VAM reporting station. It may be same as
-- SingleVruPhysicalInfo referencePoint in case of individual VAM originated by VRU station
Type
-- and can be skipped.
-- However, it may be different if VAM is reported by RSU; or VAM is Cluster VAM.
-- Default is stationReferencePosition is same as referencePoint DE.
originatingStationReferencePosition OriginatingReferencePosition OPTIONAL,
   ...
}
-- @brief VamType
-- VamType indicates types of VAM
-- Single VRU VAM (e.g., transmitted by VRU ITS-S in VRU-ACTIVE-STANDALONE VBS State)
-- VRU Cluster VAM (e.g., transmitted by VRU ITS-S in VRU-ACTIVE-CLUSTERHEAD VBS State)
-- Infrastructure VAM (e.g., transmitted by R-ITS-S)
-- and so on
VamType :: = INTEGER {
      singleVruVam (0), -- Single VRU VAM (e.g., transmitted by VRU ITS-S
                                              -- in VRU-ACTIVE-STANDALONE VBS State)
   vruClusterVam (1), -- VRU Cluster VAM (e.g., transmitted by VRU ITS-S
                                              -- in VRU-ACTIVE-CLUSTERHEAD VBS State)
   infrastructureVam (2), -- Infrastructure VAM (e.g., transmitted by a R-ITS-S)
   vehicleVam          (3), -- vehicle VAM (e.g., transmitted by a V-ITS-S)
}(0..7)
-- @brief VAM Segment Information
-- Information about segmented VAM and the number of generated segments.
VamSegmentInfo ::= SEQUENCE {
-- @details totalMsgSegments
-- The total number of messages required on the transmitter side to distribute the
information
-- to several messages.
totalMsgSegments SegmentCount,
-- @details thisSegmentNum
-- Indicates the number of the received message out of the total number of messages
-- used to realize segmentation.
thisSegmentNum SegmentCount
}
-- @brief Segment Count
-- A data element for representing either the total number of generated segments by the
transmitter
-- or the identification of the received message segment.
-- @unit n/a
SegmentCount ::= INTEGER(1..32)
   VamParameters ::= SEQUENCE {
         -- @details activeProfile
         -- it indicates VRU profile type. It can be more than one for heterogeneous VRU
```

TABLE 3.1-11-continued

```
Cluster
   activeProfile SEQUENCE (Size(0.. MAX)) OF VruProfileId,
   physicalProperties VruPhysicalProperties,
   dyanmicProperties VruDynamicProperties,
   ...
   }
   VruProfileId ::= ENUMERATED {
   pedestrian(1), lowSpeedTwoWheel(2), fullSpeedTwoWheel(3), animal(4), ...
   }
   VruPhysicalProperties :: = CHOICE {
   singleVruPhysInfo SingleVruPhysicalInfo,
   clusterPhysInfo VruClusterPhysicalInfo,
   ...
   }
   SingleVruPhysicalInfo :: = SEQUENCE {
   referencePoint ReferencePosition,
   orientation Heading,
   clusterJoinInfo ClusterJoinInfo OPTIONAL,
   clusterExitInfo ClusterExitInfo OPTIONAL,
   ...
   }
   ClusterJoinInfo :: = SEQUENCE {
   joiningClusterId ClusterID,
         -- @details countdownForCluster JoiningIndication
         -- VRU may send more than one VAM with cluster joining indication
         -- before it stops VAM transmission. DEFAULT value is 0 - means only one indication
   countdownForCluster JoiningIndication INTEGER(0..7),
   ...
   }
      ClusterExitInfo :: = SEQUENCE {
   exitingClusterId ClusterID,
         -- @details countdownForClusterExitingIndication
         -- VRU may send more than one VAM with cluster leaving indication
         -- to ensure cluster head knows exit. DEFAULT value is 0 - means only one
indication
   countdownForClusterexitingIndication INTEGER(0..7),
clusterExitReason             ClusterExitReason OPTIONAL,
   ...
   }
-- @brief ExitReason
-- Reasons for exiting the cluster
ExitReason :: = INTEGER {
      clusterHeadLost (0),
   clusterDisbandedByCH (1),
   outOfClusterBoundingBox (2),
   outOfClusterSpeedRange (3),
      dueToClusterSplit          (4)
}(0..7)
ClusterID :: = SEQUENCE {
   clusterHeadId StationID,
         -- @details intraClusterHeadID
   -- it differenentiate Clusters for which same ITS-S (e.g., R-ITS-S or V-ITS-S) serving
         -- as CH Needed for Infrastructure VAM (VAM generated by RSE or Vehicle)
         -- Default is that ClusterHead is leading only one cluster
         intraClusterHeadID INTEGER(0..128) OPTIONAL,
}
   VruClusterPhysicalInfo :: = SEQUENCE {
   -- Cluster ID is needed as in case of same non-VRU ITS-S can lead or report
      -- multiple VRU Clusters
      clusterID ClusterID,
      clusterCreationTime GenerationDeltaTime, -- keep track of cluster start time
         referencePoint ReferencePosition, -- middle of front edge of cluster
   heading HeadingValue, -- direction of perp. line through referencePoint
   width VruClusterSideLength, -- width (with referencePoint in the
         -- middle) in units of 10 cm
   length VruClusterSideLength, -- length (from referencePoint to rear of
         -- cluster) in units of 10 cm
   clusterSize ClusterSize, -- 0 means unknown
         -- @details clusterDisbandIndication
         -- CH set this flag to indicate disbanding indication
         -- Default is no Disband in progress
         clusterDisbandIndication          BOOLEAN OPTONAL,
         -- @details clusterDisbandReason
         -- Indicates reason for cluster disband
         clusterDisbandReason          clusterDisbandReason OPTIONAL,
         -- @details countdownForClusterDisbandIndication
         -- CH may send more than one VAM with cluster disband indication
         -- before it disbands cluster.
```

TABLE 3.1-11-continued

```
countdownForClusterDisbandIndication INTEGER(0..7),
        -- @details ClusterMergeInfo
        -- contains related info for negotiation during clusters merge;
        -- and results of cluster merging
        -- Default is no merging in progress
        clusterMergeInfo       ClusterMergeInfoOPTIONAL,
        -- @details ClusterSplitInfo
        -- contains related info for negotiation during cluster split;
        -- and results of cluster spliting
        -- Default is no spliting in progress
        clusterSplitInfo        ClusterSplitInfo OPTIONAL,
        -- @details CHRoleHandoverInfo cluster head role handover info
        -- it provides info about new CH elected by the current CH to handover CH role
        -- in some scenario along with reason
        -- For example, during intersection crossing CH may reach sidewalk on other side of
the
        -- road, while others are still on intersection/zebra-crossing requiring clustering
        -- Default is no CH role handover in progress
        cHRoleHandoverInfo CHRoleHandoverInfo OPTIONAL,
   ...
   }
-- @brief VruClusterSideLength
-- The size of the width or length of VRU cluster bounding box
-- @unit 0,1 m
VruClusterSideLength :: = INTEGER {
   unavailableOrOutOfRange (0),
      zeroPointOneMeter (1),
   oneMeter (10)
} (0..5000)
-- @brief ClusterDisbandReason
-- Indicates reason for cluster disband
   ClusterDisbandReason                  ::= INTEGER {
      notProvided                                      (0),
      clusteringPurposeCompleted                 (1), -- like all members crossed
                                                          -- intersection/zebra-crossing
   cHmovedOutOfClusterBoundingBox (2),
   noMoreClusterMemberExists               (3)
}(0..7)
-- @brief ClusterMergeInfo
-- contains related info for negotiation during clusters merge;
-- and results of cluster merging
-- Default is no merging in progress
        ClusterMergeInfo :: = SEQUENCE {
        -- @ details mergingWithClusterID
        -- Cluster IDs of other clusters being considered for merging
        mergingWithClustersID SEQUENCE (Size(0..MAX)) OF ClusterID
        -- @details mergeRequested
        -- A cluster can set this flag to request other clusters (in mergingWithClustersID)
        -- to consider merging
        mergeRequested    BOOLEAN OPTIONAL,
        -- @details mergeAgreedAck
        -- Clusters involved (in mergingWithClustersID) set this flag to accept
        -- merging request. Only agreed clusters are merged
        mergeAgreedAck   BOOLEAN OPTONAL,
        -- @details leavingCHRoleDueToMerging
        -- if merge is successful, all CHs in negotiation of merging who are not selected
as
        -- CH of merged Cluster set this flag
        leavingCHRoleDueToMerging              BOOLEAN OPTONAL,
        -- @details mergedClusterHeadID
        -- if split is successful, current CH informs current members about new CHs of
        -- after-split clusters
        mergedClusterHeadID                        ClusterID OPTIONAL,
        ...
     }
-- @details ClusterSplitInfo
-- contains related info for negotiation during cluster split;
-- and results of cluster spliting
-- Default is no spliting in progress
        clusterSplitInfo ::= SEQUENCE {
        -- @details clusterSplitInProgress
        -- current CH indicates to members that split is in process
        -- Default is no split in consideration
        clusterSplitInProgress             BOOLEAN OPTONAL,
        -- @details ClusterSplitReason
        -- current CH indicates to members the reason for split in process
        clusterSplitReason           ClusterSplitReason OPTONAL,
        -- @details leavingCHRoleDueToSpliting
        -- if split is successful and current CH is not selected as
        -- CH of any of the split resulted clusters, set this flag
```

TABLE 3.1-11-continued

```
        leavingCHRoleDueToSpliting              BOOLEAN OPTONAL,
        -- @details splitClusterHeadsID
        -- if split is successful, current CH informs current members about new CH after
split
        splitClusterHeadsID                     SEQUENCE (SIZE (0...MAX)) OF ClusterID OPTIONAL,
        ...
    }
-- @brief ClusterSplitReason
-- current CH indicates to members the reason for split in process
ClusterSplitReason ::= INTEGER {
      intersectionCrossing (0), -- some members crosses intersection requiring new cluster
   zebraCrossing        (1)
}(0..7)
-- @brief CHRoleHandoverInfo cluster head role handover info
-- it provides info about new CH elected by the current CH to handover CH role
-- in some scenario along with reason
-- For example, during intersection crossing CH may reach sidewalk on other side of the
-- road, while others are still on intersection/zebra-crossing requiring clustering
-- Default is no CH role handover in progress
CHRoleHandoverInfo ::= SEQUENCE {
cHRoleHandedOver                                BOOLEAN,
newClusterHeadID                                StationID,
cHRoleHandOverReason                            CHRoleHandOverReason OPTIONAL,
...
}
-- @brief CHRoleHandOverReason
-- Indicates reason for cluster head role handover to new CH
-- For example, during intersection crossing CH may reach sidewalk on other side of the
```

3.2. Enabling VAM Generation and Transmission by Non-VRU ITS-Ss

As mentioned previously, VAMs) are messages transmitted from VRU ITSs to create and maintain awareness of vulnerable road users participating in the VRU system. A VAM contains status and attribute information of the originating VRU ITS-S. The content may vary depending on the profile of the VRU ITS-S. A typical status information includes time, position, motion state, cluster status, and/or the like. Typical attribute information includes data about the VRU profile, type, dimensions, and/or the like. The generation, transmission and reception of VAM are managed by the VRU basic service (VBS) by implementing the VAM protocol. The VRU basic service is a Facility layer entity that operates the VAM protocol. It provides three main services: handling the VRU role, sending and receiving of VAMs to enhance VRU safety. Current standards (see e.g., [TS103300-3]) also adopt VRU clustering concept in presence of high VRU density to reduce VAM communication overhead. In VRU clustering, closely located VRUs with coherent speed and heading forms a facility layer VRU cluster and only cluster head VRU transmits the VAM. Other VRUs in the cluster skips VAM transmission. Active VRUs (not in VRU cluster) sends individual VAM (called Single VRU VAM).

A VAM originated from an VRU ITS-s does not address awareness of non-equipped VRUs effectively. In many cases such as at busy intersection, zebra crossing, school drop off and pick up area, public bus stops, school bus stops, busy crossing near shopping mall, construction work area, and so on, both equipped and non-equipped VRUs are present. Forming cluster by an individual VRU may not be easy and also VRU cluster formed by a VRU cannot include non-equipped VRUs in the cluster. Infrastructure (e.g., stationary RSU ITS-S (R-ITS-S)) can play a vital role in detecting potential VRU clusters in such scenarios including equipped and non-equipped both VRUs. For example, a static RSU may be installed at busy intersection, zebra crossing, school drop off and pick up area, busy crossing near shopping mall, and/or the like, while a mobile R-ITS-S can be installed on designated vehicles (e.g., school bus, city bus, service vehicle) to serve as infrastructure on public bus stops, school bus stops, construction work area, and/or the like for this purpose.

The present disclosure provides infrastructure assisted VRU clustering including both equipped and non-equipped VRUs where infrastructure (e.g., R-ITS-S) acts as cluster head and transmits VAMs (referred to as "Infrastructure VAMs", "iVAMs", or the like). The existing VBS is extended to allow non-VRU ITS-S (e.g., RSU or designated vehicles) to transmit iVAMs.

Existing VAM allows information sharing about either one VRU or one VRU Cluster in each VAM. However, in case of non-VRU ITS-S (e.g., RSU or designated vehicle ITS-S (V-ITS-S)) VAM, non-VRU ITS-S may detect one or more individual VRUs, and/or one or more VRU clusters which need to be reported in the VAM. The existing VAM format is modified to enable non-VRU ITS-S to report VRU Awareness content for one or more VRU and/or one or more VRU Clusters in the same iVAM. Current standards (see e.g., [TS103300-3]) do not allow segmentation of VAMs.

Reporting all detected VRUs and/or VRU clusters by non-VRU ITS can be very inefficient in certain scenarios such as presence of large number of VRUs or overlapping view of VRUs or occlusion of VRUs in the FOV of sensors at the originating non-VRU ITS-S. For example, such reporting via exiting DFs/DEs in the VAM in case of large perceived VRUs and/or VRU clusters create huge communication overhead and also take longer time to report all VRUs and/or VRU clusters as VAM message may need to be segmented into multiple segments. One segment can be transmitted in each successive VAM generation events taking several VAM generation periods to transmit a VAM. Therefore, an occupancy grid based bandwidth efficient VRU awareness message should be supported to assist with large number of detected VRUs and/or VRU clusters or overlapping view of VRUs or occlusion of VRUs in the FOV. Value of each Grid can indicate presence of a VRU, presence of a VRU Cluster, absence of VRUs and/or VRU clusters, and so on. Moreover, non-VRU ITS-Ss have better perception of the environment through collective perception service (CPS) by exchange of collective perception message (CPM) [4]. VRUs are not expected to listen to CPMs. However, Non-VRU ITS-S can share perceived environment information acquired from CPS to VRUs via VAM by adding a DF based on occupancy grid/costmap. A layered costmap or an occupancy grid-based DF is included in a VAM, which may replace or complement existing DFs/DEs of VAM saving significant communication overhead.

Existing VRU Basic Service (VBS) is extended to enable non-VRU ITS-S to transmit VAMs. The existing VAM format is also extended and/or modified to enable non-VRU ITS-S to report VRU Awareness information for one or more VRUs and/or one or more VRU Clusters in the same iVAM. These changes in VAM format include new DFs and/or DEs, as well as modifications to existing DEs and/or DFs.

Non-VRU ITS-Ss can also generate and transmit occupancy grid based bandwidth efficient VAMs. These VAMs may be applicable for cases in which a large number of VRUs and/or VRU clusters are detected, where an overlapping view of VRUs is detected, and/or occlusion(s) of VRUs in an FoV is detected. A new DF based on layered cost map or occupancy grid is added to such VAMs to enable non-VRU ITS-S sharing perceived environment information acquired from CPS to VRUs in a bandwidth efficient manner.

Safety of VRUs is expected to be one of the critical hindrances in adoption of CA/AD vehicles on public roads. The non-VRU ITS-S VAM transmission and VAM formats discussed herein ensure safety of VRUs on the road while reducing computing and signaling overhead in comparison to existing solutions.

The various message transmissions by nodes can be traced and/or tracked using known mechanisms. The non-VRU ITS-S VAM transmission and VAM formats can be adopted, specified, standardized, or incorporated into cellular standards such as ETSI and/or 3GPP, edge computing standard (e.g., ETSI MEC or the like), and/or can be used in conjunction with various radio access technologies (RATs).

3.2.1. Generation and Transmission of VAM by Non-VRU ITS-S (e.g., R-ITS-S or V-ITS-S)

As mentioned previously, current standards/specifications do not address awareness of non-equipped VRUs effectively. In many cases, such as at busy intersection, zebra crossing, school drop off and pick up area, public bus stops, school bus stops, busy crossing near shopping mall, construction work area, and so on, both equipped and non-equipped VRUs are present. Forming cluster by an individual VRU may not be easy and also VRU cluster formed by a VRU cannot include non-equipped VRUs in the cluster. Infrastructure (e.g., RSU ITS-S) can play a vital role in detecting potential VRU clusters in such scenarios including equipped and non-equipped both VRUs. For example, a static RSU may be installed at busy intersection, zebra crossing, school drop off and pick up area, busy crossing near shopping mall, and/or the like, while a mobile RSU can be installed on designated vehicles (e.g., school bus, city bus, service vehicle) to serve as infrastructure/RSU on public bus stops, school bus stops, construction work area, and/or the like for this purpose. Similarly sensors at vehicles can detect equipped as well as non-equipped VRUs or VRU clusters and report a VAM. For purposes of the present disclosure, a VAM transmitted from a non-VRU ITS-S (e.g., R-ITS-S or V-ITS-S) is referred to as an "Infrastructure VAM", "iVAM", or the like.

Non-VRU ITS-Ss (e.g., RSUs or Vehicles) continuously detect/perceive equipped as well as non-equipped VRUs from local sensors. Non-VRU ITS-Ss can detect/perceive equipped as well as non-equipped VRUs by collaborating with each other such as by CPS [4] by sharing/receiving CPM messages. Non-VRU ITS-Ss may have detected several VRUs at the intersection or on the side walk. In another case, Roadside Equipment (RSE)/RSUs may be co-located with smart traffic light controller(s). Several VRUs waiting to cross an intersection may have asked or indicated Traffic light-controller to cross the intersection. RSU may get these information from traffic-light controller and use this information to identify one or more VRU clusters. If several perceived VRUs (beyond a threshold number) is very close to each other with coherent speed and heading as defined in [TS103300-3], Non-VRU ITS-Ss may determine to report them as a cluster. RSU may find more than one such VRU cluster for reporting, e.g., VRUs crossing intersections and VRUs walking on the side walk. Some VRUs may need to be reported individually as they may be far away from other VRUs or their speed may be different beyond a speed-difference threshold. Once Non-VRU ITS-S determine to report one or more individual perceived VRUs and/or one or more perceived VRU clusters, it generates a VAM and report them together in a single iVAM.

In some cases, a VRU cluster may already be reported by a VRU-ITS-S and Non-VRU ITS-S perceives non-equipped VRUs within the reported cluster bounding box and/or around the bounding box. Non-VRU ITS-S may send VAM including both equipped and non-equipped VRUs with same or increased bounding box. VRU-ITS-S acting as cluster head may then stop sending VRU Cluster VAM.

3.2.2. Enabling Non-VRU ITS-Ss to Report VAM Content for One or More VRUs and/or One or More VRU Clusters in the Same VAM The current VAM capability is extended to enable non-VRU ITS-S to transmit VAMs. Existing VAM format in (see e.g., [TS103300-3]) allows only VRU ITS-S (as an individual VRU or as a VRU Cluster head) to send VAM. Some of the complementary solutions are developed in P903 to enable non-VRU ITS-S to report VRU Awareness content for one or more VRU and/or one or more VRU Clusters in the same VAM. The current VAM capability is extended to enable non-VRU ITS-S to report VRU Awareness content for one or more VRUs and/or one or more VRU Clusters in the same VAM.

In some implementations, the VruHighFrequencyContainer of VamParameters DF is changed to be an optional DF (see e.g., Table 3.2-1). In case of non-VRU originated VAM, VamParameters will have only one DE 'BasicContainer'. BasicContainer includes originating station type which can be used to identity non-VRU originated VAM. Details of the VAM are then added in the VAM Extension DF as shown by Table 3.2-1 for the non-VRU ITS-S originated VAM. It will require minimum change in the existing VAM format. VAM Extension carries information such as total Individual VRUs Reported, total VRU Clusters Reported and segmentation info if VAM is segmented for the non-VRU ITS-S originated VAM. A new DF VamParametersNonVruItsStation is defined in the VAM Extension to carry other existing information (e.g., DFs and/or DEs) of VamParameters for non-VRU originated VAM. A VamParametersNonVruItsStation DF is included for each of the individual VRU and VRU cluster being reported. Segmentation Info is needed as segmentation of non-VRU originated VAM is likely.

TABLE 3.2-1

```
VAM ::= SEQUENCE {
  header ItsPduHeaderVam,
  vam VruAwareness
  }
  -- contains StationID
  -- StationID should change when certificate changes, or when VRU
  -- enters or leaves a cluster (as leader or otherwise)
  ItsPduHeaderVam ::= ItsPduHeader(WITH COMPONENTS {
  ...,
  messageID(vam)
  })
  VruAwareness ::= SEQUENCE {
  generationDeltaTime GenerationDeltaTime,
  vamParameters VamParameters,
  vamExtensions SEQUENCE (SIZE(0..Max)) OF VamExtension
  }
  VamParameters ::= SEQUENCE {
  basicContainer   BasicContainer, --only BasicContainer for Non-VRU ITS-S originated VAM
      vruHighFrequencyContainer VruHighFrequencyContainer OPTIONAL,
    vruLowFrequencyContainer VruLowFrequencyContainer OPTIONAL,
    vruClusterContainer   VruClusterContainer OPTIONAL,
    vruClusterTransitionContainer VruClusterTransitionContainer OPTIONAL,
  vruMotionPredictionContainer VruMotionPredictionContainer OPTIONAL,
  ...
  }
-- identical to BasicContainer as used in CAM
  BasicContainer ::= SEQUENCE {
  stationType StationType,
  referencePosition ReferencePosition,
  ...
  }
--Only present for Non-VRU ITS-S Originated VAM
VamExtension ::= SEQUENCE {
totalIndividualVruReported                TotalIndividualVruReported OPTIONAL,
totalVruClusterReported                   TotalVruClusterReported OPTIONAL,
vamParametersNonVruItsStation     SEQUENCE     (SIZE(0..Max))VamParametersNonVruItsStation
OPTIONAL, -- Max is an integer value such as 64 or 128
vamSegmentInfo VamSegmentInfo OPTIONAL, -- Default no segmentation
vruOccupancyGridMap                       vruOccupancyGridMap OPTIONAL,
layeredCostMapVamContainer LayeredCostMapVamContainer OPTIONAL, -- imported from P903
...
}
-- Total individual VRUs reported in this VAM
totalIndividualVRUReported ::= INTEGER( 0..Max) - Max is maximum VRUs included in single VAM
such as 32 or 64
-- Total VRU Clusters reported in this VAM
totalVRUClusterReported ::= INTEGER( 0..Max) --- Max is maximum VRU Clusters included in
single VAM such as 32 or 64
VamParametersNonVruItsStation ::= SEQUENCE {
  vruHighFrequencyContainer VruHighFrequencyContainer,
    vruLowFrequencyContainer VruLowFrequencyContainer OPTIONAL,
    vruClusterContainer   VruClusterContainer OPTIONAL,
    vruClusterTransitionContainer VruClusterTransitionContainer OPTIONAL,
  vruMotionPredictionContainer VruMotionPredictionContainer OPTIONAL,
  ...
  }
-- @brief VAM Segment Information
-- Information about segmented VAM and the number of generated segments.
VamSegmentInfo ::= SEQUENCE {
-- @details totalMsgSegments
-- The total number of messages required on the transmitter side to distribute the information
--to several messages.
totalMsgSegments SegmentCount,
-- @details thisSegmentNum
-- Indicates the number of the received message out of the total number of messages
-- used to realize segmentation.
thisSegmentNum SegmentCount
}
-- @brief Segment Count
-- A data element for representing either the total number of generated segments by the
transmitter
-- or the identification of the received message segment.
-- @unit n/a
SegmentCount ::= INTEGER( 1..32)
```

Additionally or alternatively, the BasicContainer is moved from DF vamParameters to the DF VruAwareness (see e.g., Table 3.2-2). BasicContainer provides information (Station Type and Position) about the originating ITS-S. BasicContainer includes originating station type which can be used to identity non-VRU originated VAM. Details of the VAM are then added in the VAM Extension DF as shown by Table 3.2-2 for the non-VRU ITS-S originated VAM. It will require minimum change in the existing VAM format. VAM Extension carries information such as total Individual VRUs Reported, total VRU Clusters Reported and segmentation info if VAM is segmented for the non-VRU ITS-S originated VAM. A new DF VamParametersNonVruItsStation is defined in the VAM Extension to carry other existing information (e.g., DFs and/or DEs) of VamParameters for non-VRU originated VAM. A VamParametersNonVruItsStation DF is included for each of the individual VRU and VRU cluster being reported. Segmentation Info can be added in VruAwareness DF or in VAM Extension. Segmentation of non-VRU originated VAM is highly likely.

TABLE 3.2-2

```
VAM ::= SEQUENCE {
  header ItsPduHeaderVam,
  vam VruAwareness
  }
  -- contains StationID
  -- StationID should change when certificate changes, or when VRU
  -- enters or leaves a cluster (as leader or otherwise)
  ItsPduHeaderVam ::= ItsPduHeader(WITH COMPONENTS {
  ...,
  messageID(vam)
  })
  VruAwareness ::= SEQUENCE {
  generationDeltaTime GenerationDeltaTime,
      basicContainer BasicContainer,
  vamParameters VamParameters OPTIONAL, -- It is Not present in Non-VRU ITS-S originated VAM
  vamExtensions SEQUENCE (SIZE(0..Max)) OF VamExtension
  }
  VamParameters ::= SEQUENCE {
    vruHighFrequencyContainer VruHighFrequencyContainer,
    vruLowFrequencyContainer VruLowFrequencyContainer OPTIONAL,
    vruClusterContainer   VruClusterContainer OPTIONAL,
    vruClusterTransitionContainer VruClusterTransitionContainer OPTIONAL,
  vruMotionPredictionContainer VruMotionPredictionContainer OPTIONAL,
  ...
  }
-- identical to BasicContainer as used in CAM
  BasicContainer ::= SEQUENCE {
  stationType StationType,
  referencePosition ReferencePosition,
  ...
  }
--Only present for Non-VRU ITS-S Originated VAM
VamExtension ::= SEQUENCE {
totalIndividualVruReported                TotalIndividualVruReported OPTIONAL,
totalVruClusterReported                   TotalVruClusterReported OPTIONAL,
vamParametersNonVruItsStation        SEQUENCE        (SIZE(0..Max))VamParametersNonVruItsStation
OPTIONAL, -- Max is an integer value such as 64 or 128
vamSegmentInfo VamSegmentInfo OPTIONAL, -- Default no segmentation
vruOccupancyGridMap                       VruOccupancyGridMap OPTIONAL,
layeredCostMapVamContainer LayeredCostMapVamContainer OPTIONAL, -- imported from P903
...
}
-- Total individual VRUs reported in this VAM
totalIndividualVRUReported ::= INTEGER( 0..Max) - Max is maximum VRUs included in single VAM
such as 32 or 64
-- Total VRU Clusters reported in this VAM
totalVRUClusterReported ::= INTEGER( 0..Max) --- Max is maximum VRU Clusters included in
single VAM such as 32 or 64
VamParametersNonVruItsStation ::= SEQUENCE {
  vruHighFrequencyContainer VruHighFrequencyContainer,
    vruLowFrequencyContainer VruLowFrequencyContainer OPTIONAL,
    vruClusterContainer   VruClusterContainer OPTIONAL,
    vruClusterTransitionContainer VruClusterTransitionContainer OPTIONAL,
  vruMotionPredictionContainer VruMotionPredictionContainer OPTIONAL,
  ...
  }
-- @brief VAM Segment Information
-- Information about segmented VAM and the number of generated segments.
VamSegmentInfo ::= SEQUENCE {
-- @details totalMsgSegments
-- The total number of messages required on the transmitter side to distribute the information
--to several messages.
totalMsgSegments SegmentCount,
-- @details thisSegmentNum
-- Indicates the number of the received message out of the total number of messages
-- used to realize segmentation.
thisSegmentNum SegmentCount
```

TABLE 3.2-2-continued

```
}
-- @brief Segment Count
-- A data element for representing either the total number of generated segments by the
transmitter
-- or the identification of the received message segment.
-- @unit n/a
SegmentCount ::= INTEGER( 1..32)
```

Additionally or alternatively, the BasicContainer is moved from DF vamParameters to the DF VruAwareness (see e.g., Table 3.2-3). BasicContainer provides information (Station Type and Position) about the originating ITS-S. BasicContainer includes originating station type which can be used to identity non-VRU originated VAM. Additionally, vamParameters are defined as SEQUENCE OF VamParameters so that one VamParameters DF can be included in the non-VRU ITS-S originated VAM for each of the individual VRU or VRU cluster reported. Segmentation Info can be added in VruAwareness DF or in VAM Extension. Segmentation of non-VRU originated VAM is highly likely. Additional DF/DEs will be then added in the VAM Extension DF as shown by Table 3.2-3 for the non-VRU ITS-S originated VAM. VAM Extension carries information such as total Individual VRUs Reported, total VRU Clusters Reported and segmentation info if VAM is segmented for the non-VRU ITS-S originated VAM.

TABLE 3.2-3

```
header ItsPduHeaderVam,
vam VruAwareness
}
-- contains StationID
-- StationID should change when certificate changes, or when VRU
-- enters or leaves a cluster (as leader or otherwise)
ItsPduHeaderVam ::= ItsPduHeader(WITH COMPONENTS {
...,
messageID(vam)
})
VruAwareness ::= SEQUENCE {
generationDeltaTime GenerationDeltaTime,
   basicContainer  BasicContainer,
vamParameters SEQUENCE OF VamParameters,
vamExtensions SEQUENCE (SIZE(0..MAX)) OF VamExtension
}
VamParameters ::= SEQUENCE {
   vruHighFrequencyContainer VruHighFrequencyContainer,
   vruLowFrequencyContainer VruLowFrequencyContainer OPTIONAL,
   vruClusterContainer  VruClusterContainer OPTIONAL,
   vruClusterTransitionContainer VruClusterTransitionContainer OPTIONAL,
vruMotionPredictionContainer VruMotionPredictionContainer OPTIONAL,
...
}
-- identical to BasicContainer as used in CAM
   BasicContainer ::= SEQUENCE {
   stationType StationType,
   referencePosition ReferencePosition,
   ...
   }
-- Only present for Non-VRU ITS-S Originated VAM
VamExtension ::= SEQUENCE {
vamSegmentInfo VamSegmentInfo OPTIONAL, -- Default no segmentation
totalIndividualVruReported          totalIndividualVruReported OPTIONAL,
totalVruClusterReported             totalVruClusterReported OPTIONAL,
vruOccupancyGridMap                 VruOccupancyGridMap OPTIONAL,
layeredCostMapVamContainer LayeredCostMapVamContainer OPTIONAL, -- imported from P903
...
}
-- @brief VAM Segment Information
-- Information about segmented VAM and the number of generated segments.
VamSegmentInfo ::= SEQUENCE {
-- @details totalMsgSegments
-- The total number of messages required on the transmitter side to distribute the
information
--to several messages.
totalMsgSegments SegmentCount,
-- @details thisSegmentNum
-- Indicates the number of the received message out of the total number of messages
-- used to realize segmentation.
thisSegmentNum SegmentCount
}
-- @brief Segment Count
-- A data element for representing either the total number of generated segments by the
transmitter
-- or the identification of the received message segment.
```

TABLE 3.2-3-continued

```
-- @unit n/a
SegmentCount ::= INTEGER( 1..32)
-- Total individual VRUs reported in this VAM
totalIndividualVRUReported ::= INTEGER( 0..64)
-- Total VRU Clusters reported in this VAM
totalVRUClusterReported ::= INTEGER( 0..64)
```

Additionally or alternatively, a new DF 'VamParametersNonVruItsStation' is added to the existing VamParameters and changing VruHighFrequencyContainer from mandatory to optional (see e.g., Table 3.2-4). VamParametersNonVruItsStation is only for non-VRU ITS-S originated VAM. BasicContainer includes originating station type which can be used to identity non-VRU originated VAM. A VamParametersNonVruItsStation DF is added for each of the individual VRU or VRU Cluster reported in the non-VRU ITS-S originated VAM. VamParameters will have only two DFs BasicContainer and VamParametersNonVruItsStation for the case of non-VRU ITS-S originated VAM. Other DFs of VamParameters will be carried in VamParametersNonVruItsStation for non-VRU ITS-S originated VAM. Segmentation Info can be added in VruAwareness DF or in VAM Extension. Segmentation of non-VRU originated VAM is highly likely as described in P903. Additional DFs/DEs will be then added in the VAM Extension DF as shown by Table 3.2-4 for the non-VRU ITS-S originated VAM. VAM Extension carries information such as total Individual VRUs Reported, and total VRU Clusters Reported.

TABLE 3.2-4

```
VAM ::= SEQUENCE {
   header ItsPduHeaderVam,
   vam VruAwareness
   }
   -- contains StationID
   -- StationID should change when certificate changes, or when VRU
   -- enters or leaves a cluster (as leader or otherwise)
   ItsPduHeaderVam ::= ItsPduHeader(WITH COMPONENTS {
   ...,
   messageID(vam)
   })
   VruAwareness ::= SEQUENCE {
   generationDeltaTime GenerationDeltaTime,
vamSegmentInfo VamSegmentInfo OPTIONAL, -- Default no segmentation
   vamParameters VamParameters,
   vamExtensions SEQUENCE (SIZE(0..MAX)) OF VamExtension
   }
-- @brief VAM Segment Information
-- Information about segmented VAM and the number of generated segments.
VamSegmentInfo ::= SEQUENCE {
-- @details totalMsgSegments
-- The total number of messages required on the transmitter side to distribute the
information
--to several messages.
totalMsgSegments SegmentCount,
-- @details thisSegmentNum
-- Indicates the number of the received message out of the total number of messages
-- used to realize segmentation.
thisSegmentNum SegmentCount
}
-- @brief Segment Count
-- A data element for representing either the total number of generated segments by the
transmitter
-- or the identification of the received message segment.
-- @unit n/a
SegmentCount ::= INTEGER( 1..32)
   VamParameters ::= SEQUENCE {
   basicContainer   BasicContainer,
         vamParametersNonVruItsStation SEQUENCE (SIZE(0..128))VamParametersNonVruItsStation
OPTIONAL, -- only for Non-VRU ITS-S originated VAM
      vruHighFrequencyContainer VruHighFrequencyContainer OPTIONAL,
      vruLowFrequencyContainer VruLowFrequencyContainer OPTIONAL,
      vruClusterContainer   VruClusterContainer OPTIONAL,
      vruClusterTransitionContainer VruClusterTransitionContainer OPTIONAL,
   vruMotionPredictionContainer VruMotionPredictionContainer OPTIONAL,
   ...
   }
-- identical to BasicContainer as used in CAM
   BasicContainer ::= SEQUENCE {
   stationType StationType,
   referencePosition ReferencePosition,
   ...
   }
VamParametersNonVruItsStation ::= SEQUENCE {
```

TABLE 3.2-4-continued

```
  vruHighFrequencyContainer VruHighFrequencyContainer,
    vruLowFrequencyContainer VruLowFrequencyContainer OPTIONAL,
    vruClusterContainer   VruClusterContainer OPTIONAL,
    vruClusterTransitionContainer VruClusterTransitionContainer OPTIONAL,
  vruMotionPredictionContainer VruMotionPredictionContainer OPTIONAL,
  ...
  }
--Only present for Non-VRU ITS-S Originated VAM
VamExtension ::= SEQUENCE {
totalIndividualVruReported          totalIndividualVruReported OPTIONAL,
totalVruClusterReported             totalVruClusterReported OPTIONAL,
vruOccupancyGridMap                 VruOccupancyGridMap OPTIONAL,
LayeredCostMapVamContainer LayeredCostMapVamContainer OPTIONAL, -- imported from [P903]
...
}
-- Total individual VRUs reported in this VAM
totalIndividualVRUReported ::= INTEGER( 0..64)
-- Total VRU Clusters reported in this VAM
totalVRUClusterReported ::= INTEGER( 0..64)
```

Additionally or alternatively, there are two choices for VamParameters; one for VRU ITS-S originated VAM and another for non-VRU ITS-S originated VAM as shown by Table 3.2-5.

TABLE 3.2-5

```
VAM ::= SEQUENCE {
  header ItsPduHeaderVam,
  vam VruAwareness
  }
  -- contains StationID
  -- StationID should change when certificate changes, or when VRU
  -- enters or leaves a cluster (as leader or otherwise)
  ItsPduHeaderVam ::= ItsPduHeader(WITH COMPONENTS {
  ...,
  messageID(vam)
  })
  VruAwareness ::= SEQUENCE {
  generationDeltaTime GenerationDeltaTime,
  vamParameters VamParameters,
  vamExtensions SEQUENCE (SIZE(0..MAX)) OF VamExtension
  }
VamParameters ::= CHOICE {
    vruItsStationOriginatedVamParameters         VruItsStationOriginatedVamParameters,
    nonVruItsStationOriginatedVamParameters      NonVruItsStationOriginatedVamParameters,
...
}
  VruStationOriginatedVamParameters ::= SEQUENCE {
  basicContainer   BasicContainer,
        vruHighFrequencyContainer VruHighFrequencyContainer,
      vruLowFrequencyContainer VruLowFrequencyContainer OPTIONAL,
      vruClusterContainer   VruClusterContainer OPTIONAL,
      vruClusterTransitionContainer VruClusterTransitionContainer OPTIONAL,
  vruMotionPredictionContainer VruMotionPredictionContainer OPTIONAL,
  ...
  }
  NonVruStationOriginatedVamParameters ::= SEQUENCE {
  basicContainer   BasicContainer,
        vamSegmentInfo          VamSegmentInfo OPTIONAL, -- Default no segmentation
    totalIndividualVruReported TotalIndividualVruReported OPTIONAL,
        totalVruClusterReported      TotalVruClusterReported OPTIONAL,
      vamParametersNonVruItsStation SEQUENCE (SIZE(0..Max))VamParametersNonVruItsStation
OPTIONAL, -- Max is an integer value such as 64 or 128
vruOccupancyGridMap           VruOccupancyGridMap OPTIONAL,
layeredCostMapVamContainer LayeredCostMapVamContainer OPTIONAL, -- imported from P903
...
}
-- identical to BasicContainer as used in CAM
  BasicContainer ::= SEQUENCE {
  stationType StationType,
  referencePosition ReferencePosition,
  ...
  }
-- Total individual VRUs reported in this VAM
totalIndividualVRUReported ::= INTEGER( 0..Max) - Max is maximum VRUs included in single
VAM such as 32 or 64
```

TABLE 3.2-5-continued

```
-- Total VRU Clusters reported in this VAM
totalVRUClusterReported ::= INTEGER( 0..Max) --- Max is maximum VRU Clusters included in
single VAM such as 32 or 64
VamParametersNonVruItsStation ::= SEQUENCE {
  vruHighFrequencyContainer VruHighFrequencyContainer,
      vruLowFrequencyContainer VruLowFrequencyContainer OPTIONAL,
      vruClusterContainer   VruClusterContainer OPTIONAL,
      vruClusterTransitionContainer VruClusterTransitionContainer OPTIONAL,
  vruMotionPredictionContainer VruMotionPredictionContainer OPTIONAL,
  ...
  }
-- @brief VAM Segment Information
-- Information about segmented VAM and the number of generated segments.
VamSegmentInfo ::= SEQUENCE {
-- @details totalMsgSegments
-- The total number of messages required on the transmitter side to distribute the
information
--to several messages.
totalMsgSegments SegmentCount,
-- @details thisSegmentNum
-- Indicates the number of the received message out of the total number of messages
-- used to realize segmentation.
thisSegmentNum SegmentCount
}
-- @brief Segment Count
-- A data element for representing either the total number of generated segments by the
transmitter
-- or the identification of the received message segment.
-- @unit n/a
SegmentCount ::= INTEGER( 1..32)
```

3.2.3. Bandwidth Efficient Non-VRU ITS-S Originated VAM

Reporting all detected VRUs and/or VRU clusters by non-VRU ITS can be very inefficient in certain scenarios such as presence of large number of VRUs or overlapping view of VRUs or occlusion of VRUs in the FOV of sensors at the originating non-VRU ITS-S. For example, such reporting via exiting DFs/DEs in the VAM in case of large perceived VRUs and/or VRU clusters create huge communication overhead and also take longer time to report all VRUs and/or VRU clusters as VAM message may need to be segmented into multiple segments. One segment can be transmitted in each successive VAM generation events taking several VAM generation periods to transmit a VAM. Therefore, an occupancy grid-based bandwidth efficient VRU awareness message should be supported for scenarios with large number of detected VRUs and/or VRU clusters or overlapping view of VRUs or occlusion of VRUs in the FoV.

An occupancy grid-based bandwidth efficient VAM originated by non-VRU ITS-Ss, are described herein, an example of which is shown below. In particular, this occupancy grid may be used for cases where large numbers of detected VRUs and/or VRU clusters or overlapping view of VRUs or occlusion of VRUs in the FOV. For this purpose, a new DF 'VruOccupancyGridMap' is provided. Only VruOccupancyGridMap may be included in Non-VRU ITS-S originated VAM—for scenarios with large number of detected VRUs and/or VRU clusters or overlapping view of VRUs or occlusion of VRUs in the FOV. VruOccupancyGridMap can also be included as complementary information along with other DEs/DFs.

TABLE 3.2-6

```
VAM ::= SEQUENCE {
  header ItsPduHeaderVam,
  vam VruAwareness
  }
  -- contains StationID
  -- StationID should change when certificate changes, or when VRU
  -- enters or leaves a cluster (as leader or otherwise)
  ItsPduHeaderVam ::= ItsPduHeader(WITH COMPONENTS {
  ...,
  messageID(vam)
  })
  VruAwareness ::= SEQUENCE {
  generationDeltaTime GenerationDeltaTime,
  vamParameters VamParameters,
  vamExtensions SEQUENCE (SIZE(0..MAX)) OF VamExtension
  }
  VamParameters ::= SEQUENCE {
  basicContainer   BasicContainer, --only BasicContainer for Non-VRU ITS-S originated VAM
         vruHighFrequencyContainer VruHighFrequencyContainer OPTIONAL,
      vruLowFrequencyContainer VruLowFrequencyContainer OPTIONAL,
      vruClusterContainer   VruClusterContainer OPTIONAL,
      vruClusterTransitionContainer VruClusterTransitionContainer OPTIONAL,
  vruMotionPredictionContainer VruMotionPredictionContainer OPTIONAL,
  ...
```

TABLE 3.2-6-continued

```
   }
-- identical to BasicContainer as used in CAM
   BasicContainer ::= SEQUENCE {
   stationType StationType,
   referencePosition ReferencePosition,
   ...
   }
--Only present for Non-VRU ITS-S Originated VAM
VamExtension ::= SEQUENCE {
totalIndividualVruReported                TotalIndividualVruReported OPTIONAL,
totalVruClusterReported                   TotalVruClusterReported OPTIONAL,
vamParametersNonVruItsStation SEQUENCE (SIZE(0..Max))VamParametersNonVruItsStation
OPTIONAL, -- Max is an integer value such as 64 or 128
vamSegmentInfo VamSegmentInfo OPTIONAL, -- Default no segmentation
-- only VruOccupancyGridMap may be included in Non-VRU ITS-S originated VAM - for scenarios
with -- large number of detected VRUs and/or VRU clusters or overlapping view of VRUs or
occlusion of -- VRUs in the FOV
vruOccupancyGridMap                       VruOccupancyGridMap OPTIONAL,
layeredCostMapVamContainer LayeredCostMapVamContainer OPTIONAL, -- imported from [P903]
...
}
VruOccupancyGridMap ::= SEQUENCE {
      gridCellSizeX                       SemiRangeLength OPTIONAL, -- DEFAULT 1m
      gridCellSizeY                       SemiRangeLength OPTIONAL, -- DEFAULT 1m
      numOfReportedCell                   NumOfReportedCell,
   vruOccupancyGridValue                    SEQUENCE SIZE(1..Max, ...) OF VruOccupancyGridValue,
              -- @details confidenceLevelPerGridCell
              -- List of confidence associated to each of the VRU Occupancy Grid cells.
   confidenceLevelPerGridCell SEQUENCE SIZE(1..Max, ...) OF VruOccupancyConfidence OPTIONAL,
vruOccupancyGridValueConfigType ::= INTEGER (1..Max) OPTIONAL, -- Max can be 4
vruOccupancyConfidenceConfigType ::= INTEGER (1..Max) OPTIONAL, -- Max can be 4
@details GridCellCountingReference
--DEFAULT Can be specified in Spec, e.g., Counting starting cell SouthWest Corner;
--counting direction West to East and then move one row towards North and start from
-- West most cell in that row
gridCellCountingReference                 GridCellCountingReference OPTIONAL,
...
}
-- @brief number of reported VRU Occupancy grid cells in the Reported Cost map Grid Area
-- @unit n/a
NumOfReportedCell ::= INTEGER (1..Max) -- Max can be 1000 or 5000
SemiRangeLength ::= INTEGER {
   zeroPointOneMeter (1),
   oneMeter   (10)
} (0..1000)
GridcellCountingReference ::= SEQUENCE {
gridcellCountingStartPoint                  ,
gridcellCountingDirection,
-- @details originatingITSStationPositionInGridCell
-- It specifies Grid Cell Number in the reported Grid Area. Max can be 1000 or 5000
-- (NumOfReportedCell). DEFAULT is center Grid Cell (reported Grid area has odd number
-- of cells in length and width)
originatingITSStationPositionInGridCell ::= INTEGER (1..Max) -- Max can be equal to or
                                                            -- greater than numOfReportedCell
...
}
VruOccupancyGridValue ::= CHOICE {
vruOccupancyGridValueConfig1 VruOccupancyGridValueConfig1,
vruOccupancyGridValueConfig2 VruOccupancyGridValueConfig2,
...
}
-- @brief VruOccupancyGridValueConfig1
VruOccupancyGridValueConfig1 ::= INTEGER {
   free                                     (0), -- free of VRU and any other objects
   equippedVruProfile1PedestrianPresent             (1),
   equippedVruProfile2BicyclistPresent              (2),
   equippedVruProfile3MotorcyclistPresent           (3),
   equippedVruProfile4AnimalsPresent                (4),
   nonEquippedVruProfile1PedestrianPresent          (5),
   nonEquippedVruProfile2BicyclistPresent           (6),
   nonEquippedVruProfile3MotorcyclistPresent        (7),
   nonEquippedVruProfile4AnimalsPresent             (8),
   moreThanOneVruProfileTypesPresent                (9),
   vruClusterPresent                                (10),
   vehiclePresent                                   (11),
   otherObjectPresent                               (12),
   unknown                                          (14) -- occupancy is not known
   unavailable                                      (15) -- occupancy could not be
                                                       -- computed and does not apply
}(0..15)
```

TABLE 3.2-6-continued

```
-- @brief VruOccupancyGridValueConfig2
VruOccupancyGridValueConfig2 ::= INTEGER {
   free                                   (0), -- free of VRU and any other objects
equippedVruPresent                        (1),
   nonEquippedVruPresent                  (2),
   vruClusterPresent                      (3),
   vehiclePresent                         (4),
   otherObjectPresent                     (5),
   unknown                                (6) -- occupancy is not known
   unavailable                            (7) -- occupancy could not be
                                              -- computed and does not apply
}(0..7)
VruOccupancyConfidence ::= CHOICE {
vruOccupancyConfidenceConfig1VruOccupancyConfidenceConfig1,
vruOccupancyConfidenceConfig2VruOccupancyConfidenceConfig2,
...
}
VruOccupancyConfidenceConfig1 ::= INTEGER {
unknown                          (0), -- Object confidence is unknown
   zeroToTenPercent              (1),
   tenToTwentyPercent            (2),
   twentyToThirtyPercent         (3),
   thirtyToFourtyPercent         (4),
   fortyToFiftyPercent           (5),
   fiftyToSixtyPercent           (6),
   sixtyToSeventyPercent         (7),
   seventyOnePercent             (8),        -- Confidence 71% to 100% is in step of 1
   seventyTwoPercent             (9),
   oneHundredPercent             (37),
   unavailable                               (38) -- Confidence could not be computed and
                                                  --does not apply
} (0..38)
VruOccupancyConfidenceConfig2 ::= INTEGER {
   unknown                       (0), -- Object confidence is unknown
   belowAThreshold               (1), -- Threshold can be specified in Spec
   aboveOrEqualToThreshold       (2),
   unavailable                   (3) -- Confidence could not be computed and does
                                     --not apply
} (0..3)
-- @brief GridcellCountingStartPoint
-- It provides start point of cell for counting (e.g., SouthWest Corner cell as cell # 1)
within the reported Cost Map Grid Area
--DEFAULT Can be specified in Spec, e.g., Counting start cell can be SouthWest Corner;
--counting direction can be West to East and then move one row towards North and start
--from West most cell in that row
GridcellCountingStartPoint ::= INTEGER {
   SouthWest (0),
   NorthWest (1),
   SouthEast (2),
   NorthEast (3)
} (0..3)
-- @brief GridcellCountingDirection
-- It also provides direction of counting. DEFAULT Can be specified in Spec, e.g.,
--counting direction can be West to East and then move one row towards North and start
--from West most cell in that row
GridcellCountingDirection ::= INTEGER {
   westToEastThenSouthToNorth (0), -- West to East, then one row up towards
                                   -- North and start from West most cell in that row
   westToEastThenNorthToSouth (1),
   eastToWestThenSouthToNorth (2),
   easttoWestThenNorthToSouth (3),
         southToNorthThenWestToEast (4),
         southToNorthThenEastToWest          (5),
   northToSouthThenWestToEast (6),
         northToSouthThenEastToWest          (7)
} (0..7)
```

3.2.4. Bandwidth Efficient Mechanisms to Share Collective Perception Information to VRU via Non-VRU ITS-S Originated VAM Moreover, non-VRU ITS-Ss have better perception of the environment through collective perception service (CPS) by exchange of collective perception message (CPM). VRUs are not expected to listen to CPMs. However, Non-VRU ITS-S can share perceived environment information acquired from CPS to VRUs via VAM by adding a DF based on occupancy grid/costmap. A layered costmap or an occupancy grid-based DF is to be included in VAM. It may replace or complement existing DFs/DEs of VAM saving significant communication overhead. The description includes a mechanism to enable non-VRU ITS-S sharing perceived environment information acquired from CPS to VRUs in a bandwidth efficient way via VAM by adding a new DF LayeredCostMapVamContainer based on layered cost map or occupancy grid/costmap. DF LayeredCostMapVamContainer can be defined in similar way as described previously.

3.2.5. VAM Extension Container

The VRU Extension container of type VamExtension should carry VRU low frequency, VRU high frequency, cluster information container, cluster operation container, motion prediction container for each of the VRU and VRU Clusters reported in a non-VRU ITS-S originated VAM. Extension additionally carry totalIndividualVruReported, totalVruClusterReported, VruRoadGridOccupancy containers for in a non-VRU ITS-S originated VAM.

The Road Grid Occupancy DF is of type VruRoadGridOccupancy and should provide an indication of whether the cells are occupied (by another VRU ITS-station or object) or free. The indication should be represented by the VruGridOccupancyStatusIndication DE and the corresponding confidence value of should be given by ConfidenceLevelPerCell DE. Additional DF/DE s are included for carrying the grid and cell sizes, road segment reference ID and reference point of the grid. An example is shown by Table 3.2-7.

TABLE 3.2-7

```
VamParameters ::= SEQUENCE {
    basicContainer          ,
      vruHighFrequencyContainer          VruHighFrequencyContainer OPTIONAL,
      vruLowFrequencyContainer           VruLowFrequencyContainer OPTIONAL,
      vruClusterInformationContainer VruClusterInformationContainer OPTIONAL,
      vruClusterOperationContainer   VruClusterOperationContainer OPTIONAL,
    vruMotionPredictionContainer         VruMotionPredictionContainer OPTIONAL,
    vamExtensionsNonVruItsStation        VamExtensionNonVruItsStationOPTIONAL,
    ...
  }
--Only present for Non-VRU ITS-S Originated VAM
VamExtensionNonVruItsStation ::= SEQUENCE {
    totalIndividualVruReported          TotalIndividualVruReported OPTIONAL,
    totalVruClusterReported             TotalVruClusterReported OPTIONAL,
    vamParametersNonVruItsStation SEQUENCE (SIZE(1..Max))VamParametersNonVruItsStation
OPTIONAL,
    -- Max is an integer value such as 64 or 128
    roadGridOccupancy       VruRoadGridOccupancy OPTIONAL, -- defined below
...
}
-- Total individual VRUs reported in this VAM
totalIndividualVRUReported ::= INTEGER( 1..Max) - Max is maximum VRUs included in single
VAM such as 32 or 64
-- Total VRU Clusters reported in this VAM
totalVRUClusterReported   ::= INTEGER( 1..Max) --- Max is maximum VRU Clusters included in
single VAM such as 32 or 64
VamParametersNonVruItsStation ::= SEQUENCE {
    vruHighFrequencyContainer      VruHighFrequencyContainer,
      vruLowFrequencyContainer           VruLowFrequencyContainer OPTIONAL,
      vruClusterInformationContainer VruClusterInformationContainer OPTIONAL,
      vruClusterOperationContainer   VruClusterOperationContainer OPTIONAL,
    vruMotionPredictionContainer         VruMotionPredictionContainer OPTIONAL,
    ...
  }
-- road grid occupancy related parameters and confidence
VruRoadGridOccupancy                 ::= SEQUENCE{
    roadsegmentID      RoadSegmentReferenceID, OPTIONAL, -- imported from ITS
    gridReferencePoint                 ReferencePosition,          -- imported from ITS
    gridSize                           GridSize   OPTIONAL,
  cellSize                           GridSize   OPTIONAL,
    vruGridOccupancyStatusIndication VruGridOccupancyStatusIndication,
    confidenceLevelPerCell             ConfidenceLevelPerCell                 OPTIONAL,
}
GridSize                               ::= SEQUENCE {
    gridLength                         SemiRangeLength -- imported from ITS
    gridwidth                          SemiRangeLength -- imported from ITS
}
VruGridOccupancyStatusIndication              ::= SEQUENCE (Size(1..256,...)) OF BOOLEAN,
ConfidenceLevelPerCell                     ::= SEQUENCE (Size(1..256,...)) OF ObjectConfidence,
-- imported from ITS
...
```

4. ITS-Station Configurations and Arrangements

Figure 2:
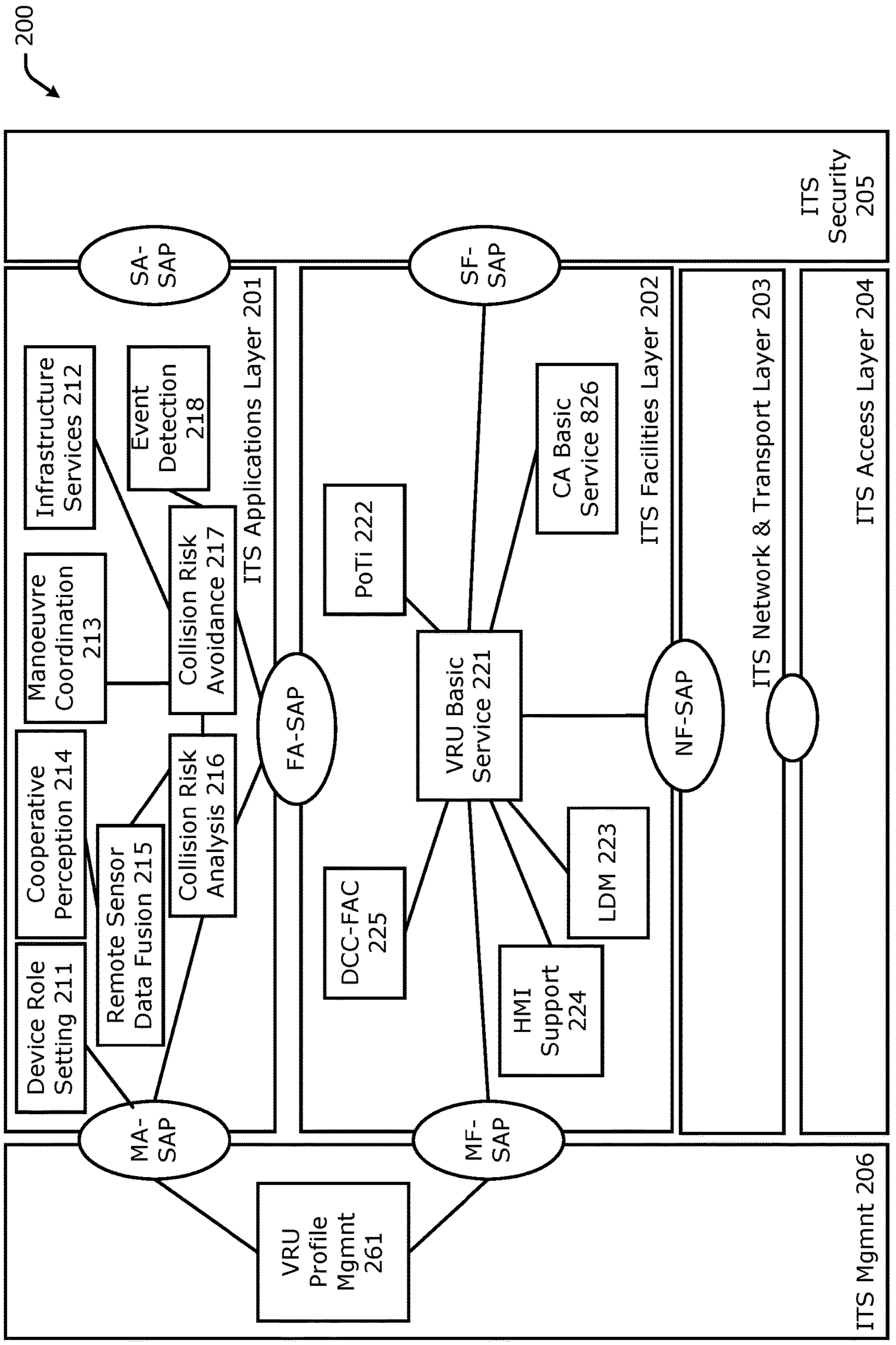
FIG. 2 shows an example ITS-S reference architecture.

FIG. 2 depicts an example ITS-S reference architecture 200. In ITS-based implementations, some or all of the components depicted by FIG. 2 may follow the ITSC protocol, which is based on the principles of the OSI model for layered communication protocols extended for ITS applications. The ITSC includes, inter alia, an access layer which corresponds with the OSI layers 1 and 2, a networking & transport (N&T) layer which corresponds with OSI layers 3 and 4, the facilities layer which corresponds with OSI layers 5, 6, and at least some functionality of OSI layer 7, and an applications layer which corresponds with some or all of OSI layer 7. Each of these layers are interconnected via respective interfaces, SAPs, APIs, and/or other like connectors or interfaces.

The applications layer 201 provides ITS services, and ITS applications are defined within the application layer 201. An ITS application is an application layer entity that implements logic for fulfilling one or more ITS use cases. An ITS application makes use of the underlying facilities and communication capacities provided by the ITS-S. Each application can be assigned to one of the three identified application classes: road safety, traffic efficiency, and other applications (see e.g., [EN302663]), ETSI TR 102 638 V1.1.1 (2009-06) (hereinafter "[TR102638]")). Examples of ITS applications may include driving assistance applications (e.g., for cooperative awareness and road hazard warnings) including AEB, EMA, and FCW applications, speed management applications, mapping and/or navigation applications (e.g., turn-by-turn navigation and cooperative navigation), applications providing location based services, and applications providing networking services (e.g., global Internet services and ITS-S lifecycle management services). A V-ITS-S 110 provides ITS applications to vehicle drivers and/or passengers, and may require an interface for accessing in-vehicle data from the in-vehicle network or in-vehicle system. For deployment and performances needs, specific instances of a V-ITS-S 110 may contain groupings of Applications and/or Facilities.

The facilities layer 202 comprises middleware, software connectors, software glue, or the like, comprising multiple facility layer functions (or simply a "facilities"). In particular, the facilities layer contains functionality from the OSI application layer, the OSI presentation layer (e.g., ASN.1 encoding and decoding, and encryption) and the OSI session layer (e.g., inter-host communication). A facility is a component that provides functions, information, and/or services to the applications in the application layer and exchanges data with lower layers for communicating that data with other ITS-Ss. Example facilities include Cooperative Awareness Services, Collective Perception Services, Device Data Provider (DDP), Position and Time management (POTI), Local Dynamic Map (LDM), collaborative awareness basic service (CABS) and/or cooperative awareness basic service (CABS), signal phase and timing service (SPATS), vulnerable road user basic service (VBS), Decentralized Environmental Notification (DEN) basic service, maneuver coordination services (MCS), and/or the like. For a vehicle ITS-S, the DDP is connected with the in-vehicle network and provides the vehicle state information. The POTI entity provides the position of the ITS-S and time information. A list of the common facilities is given by ETSI TS 102 894-1 V1.1.1 (2013-08) (hereinafter "[TS102894-1]").

Each of the aforementioned interfaces/Service Access Points (SAPs) may provide the full duplex exchange of data with the facilities layer, and may implement suitable APIs to enable communication between the various entities/elements.

For a vehicle ITS-S, the facilities layer 202 is connected to an in-vehicle network via an in-vehicle data gateway as shown and described in [TS102894-1]. The facilities and applications of a vehicle ITS-S receive required in-vehicle data from the data gateway in order to construct messages (e.g., CSMs, VAMs, CAMs, DENMs, MCMs, and/or CPMs) and for application usage. For sending and receiving CAMs, the CA-BS includes the following entities: an encode CAM entity, a decode CAM entity, a CAM transmission management entity, and a CAM reception management entity. For sending and receiving DENMs, the DEN-BS includes the following entities: an encode DENM entity, a decode DENM entity, a DENM transmission management entity, a DENM reception management entity, and a DENM keep-alive forwarding (KAF) entity. The CAM/DENM transmission management entity implements the protocol operation of the originating ITS-S including activation and termination of CAM/DENM transmission operation, determining CAM/DENM generation frequency, and triggering generation of CAMs/DENMs. The CAM/DENM reception management entity implements the protocol operation of the receiving ITS-S including triggering the decode CAM/DENM entity at the reception of CAMs/DENMs, provisioning received CAM/DENM data to the LDM, facilities, or applications of the receiving ITS-S, discarding invalid CAMs/DENMs, and checking the information of received CAMs/DENMs. The DENM KAF entity KAF stores a received DENM during its validity duration and forwards the DENM when applicable; the usage conditions of the DENM KAF may either be defined by ITS application requirements or by a cross-layer functionality of an ITSC management entity 206. The encode CAM/DENM entity constructs (encodes) CAMs/DENMs to include various, the object list may include a list of DEs and/or DFs included in an ITS data dictionary.

The ITS station type/capabilities facility provides information to describe a profile of an ITS-S to be used in the applications and facilities layers. This profile indicates the ITS-S type (e.g., vehicle ITS-S, road side ITS-S, personal ITS-S, or central ITS-S), a role of the ITS-S, and detection capabilities and status (e.g., the ITS-S's positioning capabilities, sensing capabilities, and/or the like). The station type/capabilities facility may store sensor capabilities of various connected/coupled sensors and sensor data obtained from such sensors. FIG. 2 shows the VRU-specific functionality, including interfaces mapped to the ITS-S architecture. The VRU-specific functionality is centered around the VRU Basic Service (VBS) 221 located in the facilities layer, which consumes data from other facility layer services such as the Position and Time management (PoTi) 222, Local Dynamic Map (LDM) 223, HMI Support 224, DCC-FAC 225, CA basic service (CBS) 226, and/or the like. The PoTi entity 222 provides the position of the ITS-S and time information. The LDM 223 is a database in the ITS-S, which in addition to on-board sensor data may be updated with received CAM and CPM data (see e.g., ETSI TR 102 863 v1.1.1 (2011-06)). Message dissemination-specific information related to the current channel utilization are received by interfacing with the DCC-FAC entity 225. The DCC-FAC 225 provides access network congestion information to the VBS 221.

The Position and Time management entity (PoTi) 222 manages the position and time information for use by ITS applications, facility, network, management, and security layers. For this purpose, the PoTi 222 gets information from sub-system entities such as GNSS, sensors and other sub-system of the ITS-S. The PoTi 222 ensures ITS time synchronicity between ITS-Ss in an ITS constellation, maintains the data quality (e.g., by monitoring time deviation), and manages updates of the position (e.g., kinematic and attitude state) and time. An ITS constellation is a group of ITS-S's that are exchanging ITS data among themselves. The PoTi entity 222 may include augmentation services to improve the position and time accuracy, integrity, and reliability. Among these methods, communication technologies may be used to provide positioning assistance from mobile to mobile ITS-Ss and infrastructure to mobile ITS-Ss. Given the ITS application requirements in terms of position and time accuracy, PoTi 222 may use augmentation services to improve the position and time accuracy. Various augmentation methods may be applied. PoTi 222 may support these augmentation services by providing messages services broadcasting augmentation data. For instance, a roadside ITS-S may broadcast correction information for GNSS to oncoming vehicle ITS-S; ITS-Ss may exchange raw GPS data or may exchange terrestrial radio position and time relevant information. PoTi 222 maintains and provides the position and time reference information according to the application and facility and other layer service requirements in the ITS-S. In the context of ITS, the "position" includes attitude and movement parameters including velocity, heading, horizontal speed and optionally others. The kinematic and attitude state of a rigid body contained in the ITS-S included position, velocity, acceleration, orientation, angular velocity, and possible other motion related information. The position information at a specific moment in time is referred to as the kinematic and attitude state including time, of the rigid body. In addition to the kinematic and attitude state, PoTi 222 should also maintain information on the confidence of the kinematic and attitude state variables.

The VBS 221 is also linked with other entities such as application support facilities including, for example, the collaborative/cooperative awareness basic service (CABS), signal phase and timing service (SPATS), Decentralized Environmental Notification (DEN) service, Collective Perception Service (CPS), Maneuver Coordination Service (MCS), Infrastructure service 212, and/or the like. The VBS 221 is responsible for transmitting the VAMs, identifying whether the VRU is part of a cluster, and enabling the assessment of a potential risk of collision. The VBS 221 may also interact with a VRU profile management entity in the management layer to VRU-related purposes.

The VBS 221 interfaces through the Network-Transport/Facilities (NF)-Service Access Point (SAP) with the N&T for exchanging of CPMs with other ITS-Ss. The VBS 221 interfaces through the Security-Facilities (SF)-SAP with the Security entity to access security services for VAM transmission and VAM reception 303. The VBS 221 interfaces through the Management-Facilities (MF)-SAP with the Management entity and through the Facilities-Application (FA)-SAP with the application layer if received VAM data is provided directly to the applications. Each of the aforementioned interfaces/SAPs may provide the full duplex exchange of data with the facilities layer, and may implement suitable APIs to enable communication between the various entities/elements.

The VBS module/entity 221 resides and/or operates in the facilities layer, generates VAMs, checks related services/messages to coordinate transmission of VAMs in conjunction with other ITS service messages generated by other facilities and/or other entities within the ITS-S, which are then passed to the N&T and access layers for transmission to other proximate ITS-Ss. The VAMs are included in ITS packets, which are facilities layer PDUs that may be passed to the access layer via the N&T layer or passed to the application layer for consumption by one or more ITS applications. In this way, VAM format is agnostic to the underlying access layer and is designed to allow VAMs to be shared regardless of the underlying access technology/RAT.

The application layer recommends a possible distribution of functional entities that would be involved in the protection of VRUs 116, based on the analysis of VRU use cases. The application layer also includes device role setting function/application (app) 211, infrastructure services function/app 212, maneuver coordination function/app 213, cooperative perception function/app 214, remote sensor data fusion function/app 215, collision risk analysis (CRA) function/app 216, collision risk avoidance function/app 217, and event detection function/app 218.

The device role setting module 211 takes the configuration parameter settings and user preference settings and enables/disables different VRU profiles depending on the parameter settings, user preference settings, and/or other data (e.g., sensor data and the like). A VRU can be equipped with a portable device which needs to be initially configured and may evolve during its operation following context changes which need to be specified. This is particularly true for the setting-up of the VRU profile and type which can be achieved automatically at power on or via an HMI. The change of the road user vulnerability state needs to be also provided either to activate the VBS 221 when the road user becomes vulnerable or to de-activate it when entering a protected area. The initial configuration can be set-up automatically when the device is powered up. This can be the case for the VRU equipment type which may be: VRU-Tx (a VRU only with the communication capability to broadcast messages complying with the channel congestion control rules); VRU-Rx (a VRU only communication capability to receive messages); and VRU-St (a VRU with full duplex (Tx and Rx) communication capabilities). During operation the VRU profile may also change due to some clustering or de-assembly. Consequently, the VRU device role will be able to evolve according to the VRU profile changes The infrastructure services module 212 is responsible for launching new VRU instantiations, collecting usage data, and/or consuming services from infrastructure stations. Existing infrastructure services 212 such as those described below can be used in the context of the VBS 221:

The broadcast of the SPAT (Signal Phase And Timing) & MAP (SPAT relevance delimited area) is already standardized and used by vehicles at intersection level. In principle they protect VRUs 116 crossing. However, signal violation warnings may exist and can be detected and signaled using DENM. This signal violation indication using DENMs is very relevant to VRU devices as indicating an increase of the collision risk with the vehicle which violates the signal. If it uses local captors or detects and analyses VAMs, the traffic light controller may delay the red phase change to green and allow the VRU to safely terminate its road crossing.

The contextual speed limit using IVI (In Vehicle Information) can be adapted when a large cluster of VRUs 116 is detected (ex: limiting the vehicles' speed to 30 km/hour). At such reduced speed a vehicle may act efficiently when perceiving the VRUs 116 by means of its own local perception system Remote sensor data fusion and actuator applications/functions 215 (including ML/AI) is also included in some implementations. The local perception data obtained by the computation of data collected by local sensors may be augmented by remote data collected by elements of the VRU system (e.g., VRU system 117, V-ITS-Ss 110, R-ITS-Ss 130) via the ITS-S. These remote data are transferred using standard services such as the CPS and/or the like. In such case it may be necessary to fuse these data. In some implementations, the data fusion may provide at least three possible results: (i) After a data consistency check, the received remote data are not coherent with the local data, wherein the system element has to decide which source of data can be trusted and ignore the other; (ii) only one input is available (e.g., the remote data) which means that the other source does not have the possibility to provide information, wherein the system element may trust the only available source; and (iii) after a data consistency check, the two sources are providing coherent data which augment the individual inputs provided. The use of ML/AI may be necessary to recognize and classify the detected objects (e.g., VRU, motorcycle, type of vehicle, and/or the like) and/or the like) but also their associated dynamics. The AI can be located in any element of the VRU system. The same approach is applicable to actuators, but in this case, the actuators are the destination of the data fusion.

Collective perception (CP) involves ITS-Ss sharing information about their current environments with one another. An ITS-S participating in CP broadcasts information about its current (e.g., driving) environment rather than about itself. For this purpose, CP involves different ITS-Ss actively exchanging locally perceived objects (e.g., other road participants and VRUs 116, obstacles, and the like) detected by local perception sensors by means of one or more V2X RATs. In some implementations, CP includes a perception chain that can be the fusion of results of several perception functions at predefined times. These perception functions may include local perception and remote perception functions.

The local perception is provided by the collection of information from the environment of the considered ITS element (e.g., VRU device, vehicle, infrastructure, and/or the like). This information collection is achieved using relevant sensors (optical camera, thermal camera, radar, LIDAR, and/or the like). The remote perception is provided by the provision of perception data via C-ITS (mainly V2X communication). Existing basic services like the Cooperative Awareness (CA) or more recent services such as the Collective Perception Service (CPS) can be used to transfer a remote perception.

Several perception sources may then be used to achieve the cooperative perception function 214. The consistency of these sources may be verified at predefined instants, and if not consistent, the CP function may select the best one according to the confidence level associated with each perception variable. The result of the CP should comply with the required level of accuracy as specified by PoTi. The associated confidence level may be necessary to build the CP resulting from the fusion in case of differences between the local perception and the remote perception. It may also be necessary for the exploitation by other functions (e.g., risk analysis) of the CP result.

The perception functions from the device local sensors processing to the end result at the cooperative perception 214 level may present a significant latency time of several hundred milliseconds. For the characterization of a VRU trajectory and its velocity evolution, there is a need for a certain number of the vehicle position measurements and velocity measurements thus increasing the overall latency time of the perception. Consequently, it is necessary to estimate the overall latency time of this function to take it into account when selecting a collision avoidance strategy.

The CRA function 216 analyses the motion dynamic prediction of the considered moving objects associated to their respective levels of confidence (reliability). An objective is to estimate the likelihood of a collision and then to identify as precisely as possible the Time To Collision (TTC) if the resulting likelihood is high. Other variables may be used to compute this estimation.

The VRU CRA function 216, and dynamic state prediction are able to reliably predict the relevant road users maneuvers with an acceptable level of confidence for the purpose of triggering the appropriate collision avoidance action, assuming that the input data is of sufficient quality. The CRA function 216 analyses the level of collision risk based on a reliable prediction of the respective dynamic state evolution. Consequently, the reliability level aspect may be characterized in terms of confidence level for the chosen collision risk metrics as discussed in clauses 6.5.10.5 and 6.5.10.9 of [TS103300-2]. The confidence of a VRU dynamic state prediction is computed for the purpose of risk analysis. The prediction of the dynamic state of the VRU is complicated especially for some specific VRU profiles (e.g., animal, child, disabled person, and/or the like). Therefore, a confidence level may be associated to this prediction as explained in clauses 6.5.10.5, 6.5.10.6 and 6.5.10.9 of [TS103300-2]. The VRU movement reliable prediction is used to trigger the broadcasting of relevant VAMs when a risk of collision involving a VRU is detected with sufficient confidence to avoid false positive alerts (see e.g., clauses 6.5.10.5, 6.5.10.6 and 6.5.10.9 of [TS103300-2]).

The following two conditions are used to calculate the TTC. First, two or more considered moving objects follow trajectories which intersect somewhere at a position which can be called "potential conflict point". Second, if the moving objects maintain their motion dynamics (e.g., approaches, trajectories, speeds, and/or the like) it is possible to predict that they will collide at a given time which can be estimated through the computation of the time (referred to as Time To Collision (TTC)) necessary for them to arrive simultaneously at the level of the identified potential conflict point. The TTC is a calculated data element enabling the selection of the nature and urgency of a collision avoidance action to be undertaken.

A TTC prediction may only be reliably established when the VRU 116 enters a collision risk area. This is due to the uncertainty nature of the VRU pedestrian motion dynamic (mainly its trajectory) before deciding to cross the road.

At the potential conflict point level, another measurement, the 'time difference for pedestrian and vehicle travelling to the potential conflict point' (TDTC) can be used to estimate the collision risk level. For example, if it is not acted on the motion dynamic of the pedestrian or/and on the motion dynamic of the vehicle, TDTC is equal to 0 and the collision is certain. Increasing the TDTC reduces the risk of collision between the VRU and the vehicle. The potential conflict point is in the middle of the collision risk area which can be defined according to the lane width (e.g., 3.5 m) and vehicle width (maximum 2 m for passenger cars).

The TTC is one of the variables that can be used to define a collision avoidance strategy and the operational collision avoidance actions to be undertaken. Other variables may be considered such as the road state, the weather conditions, the triple of {Longitudinal Distance (LoD), Lateral Distance (LaD), Vertical Distance (VD)} along with the corresponding threshold triple of {MSLaD, MSLoD, MSVD}, Trajectory Interception Indicator (TII), and the mobile objects capabilities to react to a collision risk and avoid a collision (see e.g., clause 6.5.10.9 in [TS103300-2]). The TII is an indicator of the likelihood that the VRU 116 and one or more other VRUs 116, non-VRUs, or even objects on the road are going to collide.

The CRA function 216 compares LaD, LoD and VD, with their respective predefined thresholds, MSLaD, MSLoD, MSVD, respectively, if all the three metrics are simultaneously less than their respective thresholds, that is LaD<MSLaD, LoD<MSLoD, VD<MSVD, then the collision avoidance actions would be initiated. Those thresholds could be set and updated periodically or dynamically depending on the speed, acceleration, type, and loading of the vehicles and VRUs 116, and environment and weather conditions. On the other hand, the TII reflects how likely is the ego-VRU ITS-S 117 trajectory going to be intercepted by the neighboring ITSs (other VRUs 116 and/or non-VRU ITSs such as vehicles 110).

The likelihood of a collision associated with the TTC may also be used as a triggering condition for the broadcast of messages (e.g., an infrastructure element getting a complete perception of the situation may broadcast DENM, IVI (contextual speed limit), CPM or MCM).

The collision risk avoidance function/application 217 includes the collision avoidance strategy to be selected according to the TTC value. In the case of autonomous vehicles 110, the collision risk avoidance function 217 may involve the identification of maneuver coordination 213/vehicle motion control 608 to achieve the collision avoidance as per the likelihood of VRU trajectory interception with other road users captured by TII and Maneuver Identifier (MI) as discussed infra.

The collision avoidance strategy may consider several environmental conditions such as visibility conditions related to the local weather, vehicle stability conditions related to the road state (e.g., slippery), and vehicle braking capabilities. The vehicle collision avoidance strategy then needs to consider the action capabilities of the VRU according to its profile, the remaining TTC, the road and weather conditions as well as the vehicle autonomous action capabilities. The collision avoidance actions may be implemented using maneuver coordination 213 (and related maneuver coordination message (MCM) exchange) as done in the French PAC V2X project or other like systems.

In one example, when in good conditions, it is possible to trigger a collision avoidance action when the TTC is greater than two seconds (one second for the driver reaction time and one second to achieve the collision avoidance action). Below two seconds, the vehicle can be considered to be in a "pre-crash" situation and so it needs to trigger a mitigation action to reduce the severity of the collision impact for the VRU 116/117. The possible collision avoidance actions and impact mitigation actions have been listed in requirement FSYS08 in clause 5 of [TS103300-2].

Road infrastructure elements (e.g., R-ITS-Ss 130) may also include a CRA function 216 as well as a collision risk avoidance function 217. These functions may indicate collision avoidance actions to the neighboring VRUs 116/117 and vehicles 110.

The collision avoidance actions (e.g., using MCM as done in the French PAC V2X project) for VRUs, V-ITS-Ss 110, and/or R-ITS-Ss 130 may depend on the vehicle level of automation. The collision avoidance action or impact mitigation action are triggered as a warning/alert to the driver or as a direct action on the vehicle 110 itself. Examples of collision avoidance include any combination of: extending or changing the phase of a traffic light; acting on the trajectory and/or velocity of the vehicles 110 (e.g., slow down, change lane, and/or the like) if the vehicle 110 has a sufficient level of automation; alert the ITS device user through the HMI; disseminate a C-ITS message to other road users, including the VRU 116/117 if relevant. Examples of impact mitigation actions may include any combination of triggering a protective mean at the vehicle level (e.g., extended external airbag); triggering a portable VRU protection airbag.

The road infrastructure may offer services to support the road crossing by VRU such as traffic lights. When a VRU starts crossing a road at a traffic light level authorizing him, the traffic light should not change of phase as long as the VRU has not completed its crossing. Accordingly, the VAM should contain data elements enabling the traffic light to determine the end of the road crossing by the VRU 116/117.

The maneuver coordination function 213 executes the collision avoidance actions which are associated with the collision avoidance strategy that has been decided (and selected). The collision avoidance actions are triggered at the level of the VRU 116/117, the vehicle 110, or both, depending on the VRU capabilities to act (e.g., VRU profile and type), the vehicle type and capabilities and the actual risk of collision. VRUs 116/117 do not always have the capability to act to avoid a collision (e.g., animal, children, aging person, disabled, and/or the like), especially if the TTC is short (a few seconds) (see e.g., clauses 6.5.10.5 and 6.5.10.6 of [TS103300-2]. This function should be present at the vehicle 110 level, depending also on the vehicle 110 level of automation (e.g., not present in non-automated vehicles), and may be present at the VRU device 117 level according to the VRU profile. At the vehicle 110 level, this function interfaces the vehicle electronics controlling the vehicle dynamic state in terms of heading and velocity. At the VRU device 117 level, this function may interface the HMI support function, according to the VRU profile, to be able to issue a warning or alert to the VRU 116/117 according to the TTC.

Maneuver coordination 213 can be proposed to vehicles from an infrastructure element, which may be able to obtain a better perception of the motion dynamics of the involved moving objects, by means of its own sensors or by the fusion of their data with the remote perception obtained from standard messages such as CAMs.

The maneuver coordination 213 at the VRU 116 may be enabled by sharing among the ego-VRU and the neighboring ITSs, first the TII reflecting how likely is the ego VRU ITS-Ss 117 trajectory going to be intercepted by the neighboring ITSs (other VRU or non-VRU ITSs such as vehicles), and second a Maneuver Identifier (MI) to indicate the type of VRU maneuvering needed. An MI is an identifier of a maneuver (to be) used in a maneuver coordination service (MCS) 213. The choice of maneuver may be generated locally based on the available sensor data at the VRU ITS-S 117 and may be shared with neighboring ITS-S (e.g., other VRUs 116 and/or non-VRUs) in the vicinity of the ego VRU ITS-S 117 to initiate a joint maneuver coordination among VRUs 116 (see e.g., clause 6.5.10.9 of [TS103300-3]).

Depending upon the analysis of the scene in terms of the sensory as well as shared inputs, simple TII ranges can be defined to indicate the likelihood of the ego-VRU's 116 path to be intercepted by another entity. Such indication helps to trigger timely maneuvering. For instance, TII could be defined in terms of TII index that may simply indicate the chances of potential trajectory interception (low, medium, high or very high) for CRA 216. If there are multiple other entities, the TII may be indicated for the specific entity differentiable via a simple ID which depends upon the simultaneous number of entities in the vicinity at that time. The vicinity could even be just one cluster that the current VRU is located in. For example, the minimum number of entities or users in a cluster is 50 per cluster (worst case). However, the set of users that may have the potential to collide with the VRU could be much less than 50 thus possible to indicate via few bits in say, VAM.

On the other hand, the MI parameter can be helpful in collision risk avoidance 217 by triggering/suggesting the type of maneuver action needed at the VRUs 116/117. The number of such possible maneuver actions may be only a few. For simplicity, it could also define as the possible actions to choose from as {longitudinal trajectory change maneuvering, lateral trajectory change maneuvering, heading change maneuvering or emergency braking/deceleration} in order to avoid potential collision indicated by the TII. The TII and MI parameters can also be exchanged via inclusion in part of a VAM DF structure.

The event detection function 218 assists the VBS 221 during its operation when transitioning from one state to another. Examples of the events to be considered include: change of a VRU role when a road user becomes vulnerable (activation) or when a road user is not any more vulnerable (de-activation); change of a VRU profile when a VRU enters a cluster with other VRU(s) or with a new mechanical element (e.g., bicycle, scooter, moto, and/or the like) and/or the like), or when a VRU cluster is disassembling; risk of collision between one or several VRU(s) and at least one other VRU (using a VRU vehicle) or a vehicle (such event is detected via the perception capabilities of the VRU system); change of the VRU motion dynamic (trajectory or velocity) which will impact the TTC and the reliability of the previous prediction; and change of the status of a road infrastructure piece of equipment (e.g., a traffic light phase) impacting the VRU movements.

Additionally or alternatively, existing infrastructure services 212 such as those described herein can be used in the context of the VBS 221. For example, the broadcast of the Signal Phase And Timing (SPAT) and SPAT relevance delimited area (MAP) is already standardized and used by vehicles at intersection level. In principle they protect VRUs 116/117 crossing. However, signal violation warnings may exist and can be detected and signaled using DENM. This signal violation indication using DENMs is very relevant to VRU devices 117 as indicating an increase of the collision risk with the vehicle which violates the signal. If it uses local captors or detects and analyses VAMs, the traffic light controller may delay the red phase change to green and allow the VRU 116/117 to safely terminate its road crossing. The contextual speed limit using In-Vehicle Information (IVI) can be adapted when a large cluster of VRUs 116/117 is detected (e.g., limiting the vehicles' speed to 30 km/hour). At such reduced speed a vehicle 110 may act efficiently when perceiving the VRUs by means of its own local perception system.

The ITS management (mgmnt) layer includes a VRU profile mgmnt entity. The VRU profile management function is an important support element for the VBS 221 as managing the VRU profile during a VRU active session. The profile management is part of the ITS-S configuration management and is then initialized with necessary typical parameters' values to be able to fulfil its operation. The ITS-S configuration management is also responsible for updates (for example: new standard versions) which are necessary during the whole life cycle of the system.

When the VBS 221 is activated (vulnerability configured), the VRU profile management needs to characterize a VRU personalized profile based on its experience and on provided initial configuration (generic VRU type). The VRU profile management may then continue to learn about the VRU habits and behaviors with the objective to increase the level of confidence (reliability) being associated to its motion dynamic (trajectories and velocities) and to its evolution predictions.

The VRU profile management 261 is able to adapt the VRU profile according to detected events which can be signaled by the VBS management and the VRU cluster management 302 (cluster building/formation or cluster disassembly/disbandment).

According to its profile, a VRU may or may not be impacted by some road infrastructure event (e.g., evolution of a traffic light phase), so enabling a better estimation of the confidence level to be associated to its movements. For example, an adult pedestrian will likely wait at a green traffic light and then cross the road when the traffic light turns to red. An animal will not take care of the traffic light color and a child can wait or not according to its age and level of education.

Figure 3:
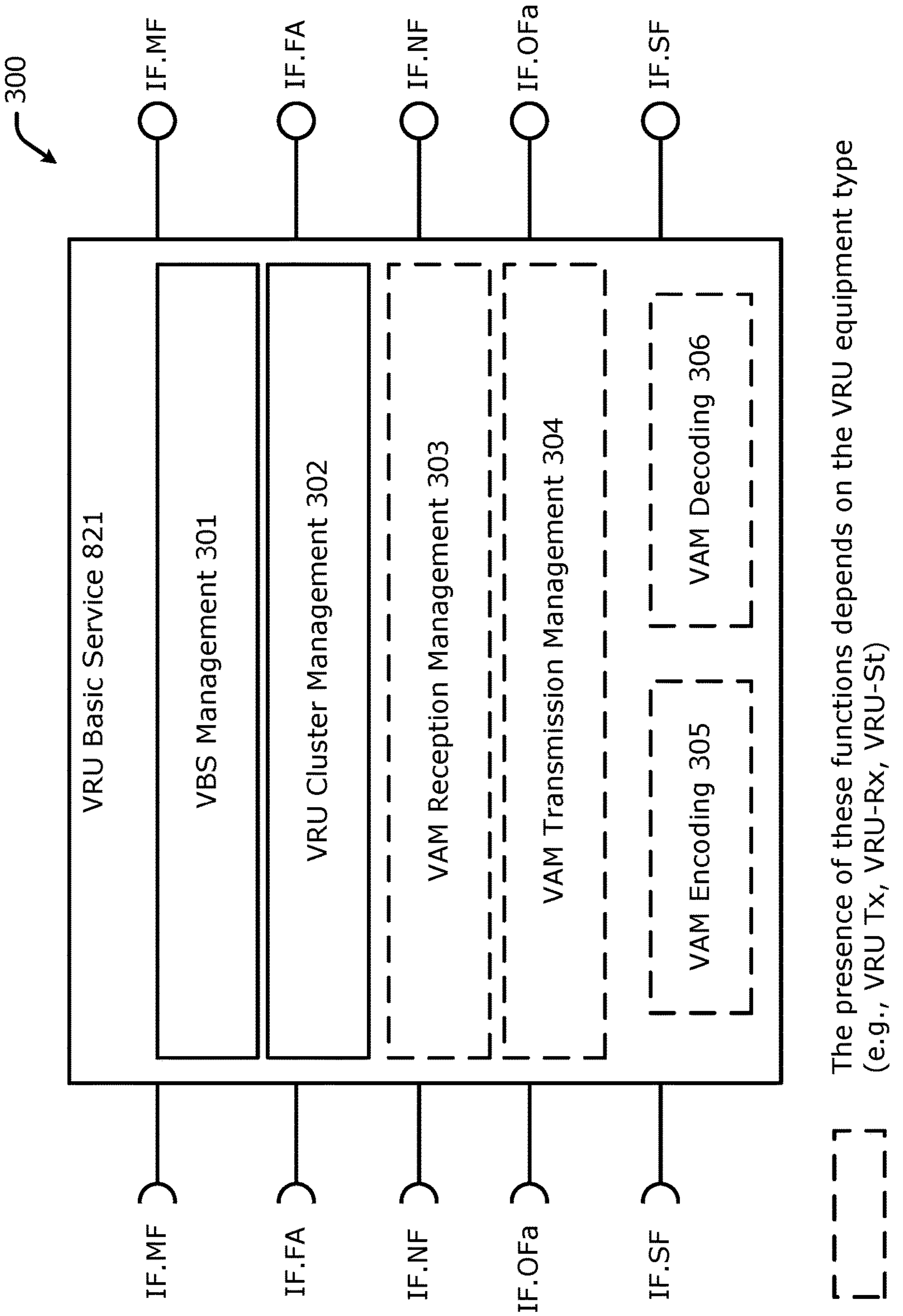
FIG. 3 depicts an example VRU basic service (VBS) functional model.

FIG. 3 shows an example VBS functional model 300. The VBS 221 is a facilities layer entity that operates the VAM protocol. It provides three main services: handling the VRU role, sending and receiving of VAMs. The VBS uses the services provided by the protocol entities of the ITS networking & transport layer to disseminate the VAM. In some implementations, the presence/absence of the dotted/dashed blocks depend on whether the VRU equipment type is VRU-Tx, VRU-Rx or VRU-St (see e.g., [TS103300-2]).

Among other functions, within the scope of this disclosure are briefly summarized as follows: VBS (Service) Management 301 is responsible for activating or deactivating the VAM transmission according to the device role parameters as well as managing the triggering conditions for VAM transmission; VRU Cluster Management 302 manages combined and clustered VRU creation and breaking down; VAM reception management 303, after VAM message decoding, checks the relevance, consistency, plausibility, integrity, and/or the like of the Rx message and stores or deletes the Rx message data elements in the local dynamic map (LDM); VAM transmission management 304 assembles VAM DEs and sending to the encoding function; VAM encoding 305 encodes the VAM DEs coming from the VAM Tx management function and triggers VAM transmission to Networking and Transport layer (e.g., the function is present only if the VRU-ITS-S VRU-Rx capable); and VRU decoding 306 extracts the relevant DEs in the received VAM (the function is present only if the VRU-ITS-S VRU-Rx capable) and sending them to the reception management function.

Handling VRU role: The VBS 221 receives unsolicited indications from the VRU profile management entity (see e.g., clause 6.4 in [TS103300-2]) on whether the device user is in a context where it is considered as a VRU (e.g., pedestrian crossing a road) or not (e.g., passenger in a bus). The VBS 221 remains operational in both states, as defined by Table 4-1.

TABLE 4-1

Possible roles of the VRU during VRU basic service operation

| VRU role | Specification | Valid VRU profiles | Valid VRU types | Additional explanation |
|---|---|---|---|---|
| VRU_ROLE_ON | The device user is considered as a VRU. Based on information received from VRU profile management entity, the VBS shall check the type of VRU and the profile of VRU. It shall also handle the VBS clustering state and provide services to other entities, as defined in clause 5. | ALL | ALL | The VBS state should be changed according to the condition of VRU device user as notified by the VRU profile Management entity. The VRU device can send VAMs, receive VAMs, or both while checking the position of VRU device user through the PoTi entity. Except for VRUs of profile 3, it may execute the VRU clustering functions (see clause 5). |
| VRU_ROLE_OFF | The device user is not considered as a VRU. The VRU device shall neither send nor receive VAMs | ALL | ALL | The VRU is located in a "zero-risk" geographical area, for example in a bus, in a passenger car, and/or the like The VBS remains operational in this state to monitor any notification that the role has changed to VRU_ROLE_ON. |

There may be cases where the VRU profile management entity provides invalid information, e.g., the VRU device user is considered as a VRU, while its role should be VRU_ROLE_OFF. This is implementation dependent, as the receiving ITS-S should have very strong plausibility check and take into account the VRU context during their risk analysis. The precision of the positioning system (both at transmitting and receiving side) would also have a strong impact on the detection of such cases.

Sending VAMs includes two activities: generation of VAMs and transmission of VAMs. In VAM generation, the originating ITS-S 117 composes the VAM, which is then delivered to the ITS networking and transport layer for dissemination. In VAM transmission, the VAM is transmitted over one or more communications media using one or more transport and networking protocols. A natural model is for VAMs to be sent by the originating ITS-S to all ITS-Ss within the direct communication range. VAMs are generated at a frequency determined by the controlling VBS 221 in the originating ITS-S. If a VRU ITS-S is not in a cluster, or is the leader of a cluster, it transmits the VAM periodically. VRU ITS-S 117 that are in a cluster, but not the leader of a cluster, do not transmit the VAM. The generation frequency is determined based on the change of kinematic state, location of the VRU ITS-S 117, and congestion in the radio channel. Security measures such as authentication are applied to the VAM during the transmission process in coordination with the security entity.

Upon receiving a VAM, the VBS 221 makes the content of the VAM available to the ITS applications and/or to other facilities within the receiving ITS-S 117/130/110, such as a Local Dynamic Map (LDM). It applies all necessary security measures such as relevance or message integrity check in coordination with the security entity.

The VBS 221 includes a VBS management function 301, a VRU cluster management function 302, a VAM reception management function 303, a VAM transmission management function 304, VAM encoding function 305, and VAM decoding function 306. The presence of some or all of these functions depends on the VRU equipment type (e.g., VRU-Tx, VRU-Rx, or VRU-St), and may vary depending on use case and/or design choices.

The VBS management function 301 executes the following operations: store the assigned ITS AID and the assigned Network Port to use for the VBS 221; store the VRU configuration received at initialization time or updated later for the coding of VAM data elements; receive information from and transmit information to the HMI; activate/deactivate the VAM transmission service 304 according to the device role parameter (for example, the service is deactivated when a pedestrian enters a bus); and manage the triggering conditions of VAM transmission 304 in relation to the network congestion control. For example, after activation of a new cluster, it may be decided to stop the transmission of element(s) of the cluster.

The VRU cluster management function 302 performs the following operations: detect if the associated VRU can be the leader of a cluster; compute and store the cluster parameters at activation time for the coding of VAM data elements specific to the cluster; manage the state machine associated to the VRU according to detected cluster events (see e.g., state machines examples provided in section 6.2.4 of [TS103300-2]); and activate or de-activate the broadcasting of the VAMs or other standard messages (e.g., DENMs) according to the state and types of associated VRU.

The clustering operation as part of the VBS 221 is intended to optimize the resource usage in the ITS system. These resources are mainly spectrum resources and processing resources.

A huge number of VRUs in a certain area (pedestrian crossing in urban environment, large squares in urban environment, special events like large pedestrian gatherings) would lead to a significant number of individual messages sent out by the VRU ITS-S and thus a significant need for spectrum resources. Additionally, all these messages would need to be processed by the receiving ITS-S, potentially including overhead for security operations.

In order to reduce this resource usage, the present document specifies clustering functionality. A VRU cluster is a group of VRUs with a homogeneous behavior (see e.g., [TS103300-2]), where VAMs related to the VRU cluster provide information about the entire cluster. Within a VRU cluster, VRU devices take the role of either leader (one per cluster) or member. A leader device sends VAMs containing cluster information and/or cluster operations. Member devices send VAMs containing cluster operation container to join/leave the VRU cluster. Member devices do not send VAMs containing cluster information container at any time.

A cluster may contain VRU devices of multiple profiles. A cluster is referred to as "homogeneous" if it contains devices of only one profile, and "heterogeneous" if it contains VRU devices of more than one profile (e.g., a mixed group of pedestrians and bicyclists). The VAM ClusterinformationContainer contains a field allowing the cluster container to indicate which VRU profiles are present in the cluster. Indicating heterogeneous clusters is important since it provides useful information about trajectory and behaviors prediction when the cluster is broken up.

The support of the clustering function is optional in the VBS 221 for all VRU profiles. The decision to support the clustering or not is implementation dependent for all the VRU profiles. When the conditions are satisfied (see clause 5.4.2.4 of [TS103300-3], the support of clustering is recommended for VRU profile 1. An implementation that supports clustering may also allow the device owner to activate it or not by configuration. This configuration is also implementation dependent. If the clustering function is supported and activated in the VRU device, and only in this case, the VRU ITS-S shall comply with the requirements specified in clause 5.4.2 and clause 7 of [TS103300-3], and define the parameters specified in clause 5.4.3 of [TS103300-3]. As a consequence, cluster parameters are grouped in two specific and conditional mandatory containers in the present document.

The basic operations to be performed as part of the VRU cluster management 302 in the VBS 221 are: Cluster identification: intra-cluster identification by cluster participants in Ad-Hoc mode; Cluster creation: creation of a cluster of VRUs including VRU devices located nearby and with similar intended directions and speeds. The details of the cluster creation operation are given in clause 5.4.2.2 of [TS103300-3]; Cluster breaking up: disbanding of the cluster when it no longer participates in the safety related traffic or the cardinality drops below a given threshold; Cluster joining and leaving: intro-cluster operation, adding or deleting an individual member to an existing cluster; Cluster extension or shrinking: operation to increase or decrease the size (area or cardinality).

Any VRU device shall lead a maximum of one cluster. Accordingly, a cluster leader shall break up its cluster before starting to join another cluster. This requirement also applies to combined VRUs as defined in [TS103300-2] joining a different cluster (e.g., while passing a pedestrian crossing). The combined VRU may then be re-created after leaving the heterogeneous cluster as needed. For example, if a bicyclist with a VRU device, currently in a combined cluster with his bicycle which also has a VRU device, detects it could join a larger cluster, then the leader of the combined VRU breaks up the cluster and both devices each join the larger cluster separately. The possibility to include or merge VRU clusters or combined VRUs inside a VRU cluster is left for further study. In some implementations, a simple in-band VAM signaling may be used for the operation of VRU clustering. Further methods may be defined to establish, maintain and tear up the association between devices (e.g., Bluetooth®, UWB, and/or the like).

The interactions between the VRU basic service and other facilities layer entities in the ITS-S architecture are used to obtain information for the generation of the VAM. The interfaces for these interactions are described in Table 4-2. The IF.OFa (interfaces to other facilities) are implementation dependent

TABLE 4-2

VRU Basic Service interfaces (IF.OFa)

| Interfaced functionality | Parameters |
|---|---|
| PoTi | Information of the positioning and timing are sent to the VRU basic service, e.g., the position of the ITS-S and time information specified in ETSI EN 302 890-2. Further details are described in clause 6.5.10.3 of [TS103300-2]. |
| CA Basic service | In case of a motorcycle, the VRU basic service needs to inform the Cooperative Awareness basic service that the vehicle is a VRU from VRU profile 3 and trigger the dedicated container when transmitting CAMs. It also needs to provide associated DEs to put in the VRU special container, e.g., type of profile, roll angle, path prediction, and/or the like. |
| Congestion Control | Information to optimize the use of the available channel are sent to the VRU basic service, e.g., T_GenVam_Dcc in the case of the ITS-G5 access layer. Further details are described in clause 6.5.10.5 of [TS103300-2]. |
| HMI support | The interactions between the VRU basic service and the HMI support function of the facilities layer are necessary for the exchange of information (parameters, data elements) to be used for the management of the VRU awareness service and the provisioning of data elements in VAMs. The HMI support function can be implemented to select any proper data in the candidate list such as VRU profile. The HMI support function can forward input data from the touchscreen or button in the device of VRU to VRU basic service. Awareness advices and alert may be provided to VRU via its HMI according to its personalized characteristics. Further details are described in clause 6.5.7 of [TS103300-2]. |
| LDM | LDM/VAM data are exchanged via the interface between LDM and the VRU Basic Service. Further details are described in clause 6.5.10.2 of [TS103300-2]. |
| Device Data Provider (DDP) | The DDP provides the device status information obtained from its local perception entities (see e.g., [TS103300-2]) to the VRU Basic Service. |
| Other Application Support Facilities | Information to trigger the transmission of messages are sent to the VRU Basic Service. The VRU Basic Service forwards received messages to the relevant applications. Further details are described in clause 6.5.10.4 [TS103300-2]. |

For VRU Cluster operation, depending on its context, the VBS 221 is in one of the cluster states specified in Table 4-3. In addition to the normal VAM triggering conditions defined in clause 6 of [TS103300-3], the events discussed previously can trigger a VBS state transition related to cluster operation. Parameters that control these events are summarized in clause 8, tables 14 and 15, of [TS103300-3] and/or Table 2.4-1 and Table 2.4-2 supra.

TABLE 4-3

Possible states of the VRU basic service related to cluster operation

| VBS State | Specification | Valid VRU profiles | Valid VRU types | Additional explanation |
|---|---|---|---|---|
| VRU-IDLE | The device user is not considered as a VRU | ALL | ALL | The VRU role as defined in clause 4.2 is VRU_ROLE_OFF. |
| VRU-ACTIVE-STANDALONE | VAMs or CAMs (in case of VRU Profile 2) are transmitted with information related to only that VRU. | ALL | VRU-St, VRU-Tx | In this state a VRU ITS-S may indicate an intention to join a cluster, or indicate that it has just left a cluster. |
| VRU-ACTIVE-CLUSTER-LEADER | VAMs are transmitted and include a container with specific data elements related to the cluster | VRU profile 1, VRU profile 2 | VRU-St | |
| VRU-PASSIVE | The VRU device does not transmit VAMs | ALL except VRU profile 3 | VRU-St, VRU-Tx | The VRU is member of a cluster or located in a low-risk geographical area defined in clause 3.1 (see FCOM03 in [TS103300-2]). In the case the area rules authorize the traffic of motor vehicles, the VBS can also remain in VRU-ACTIVE-STANDALONE VBS state and increase the periodicity of the VAMs. |

In all VBS states, the VRU basic service in a VRU device shall remain operational.

The VAM reception management function 303 performs the following operations after VAM messages decoding: check the relevance of the received message according to its current mobility characteristics and state; check the consistency, plausibility and integrity (see the liaison with security protocols) of the received message semantic; and destroy or store the received message data elements in the LDM according to previous operations results.

The VAM Transmission management function 304 is only available at the VRU device level, not at the level of other ITS elements such as V-ITS-Ss 110 or R-ITS-Ss 130. Even at the VRU device level, this function may not be present depending on its initial configuration (see device role setting function 211). The VAM transmission management function 304 performs the following operations upon request of the VBS management function 301: assemble the message data elements in conformity to the message standard specification; and send the constructed VAM to the VAM encoding function 305. The VAM encoding function 305 encodes the Data Elements provided by the VAM transmission management function 304 in conformity with the VAM specification. The VAM encoding function 305 is available only if the VAM transmission management function 304 is available.

The VAM decoding function 306 extracts the relevant Data Elements contained in the received message. These data elements are then communicated to the VAM reception management function 303. The VAM decoding function 306 is available only if the VAM reception management function 303 is available.

A VRU may be configured with a VRU profile. VRU profiles are the basis for the further definition of the VRU functional architecture. The profiles are derived from the various use cases discussed herein. VRUs 116 usually refers to living beings. A living being is considered to be a VRU only when it is in the context of a safety related traffic environment. For example, a living being in a house is not a VRU until it is in the vicinity of a street (e.g., 2 m or 3 m), at which point, it is part of the safety related context. This allows the amount of communications to be limited, for example, a C-ITS communications device need only start to act as a VRU-ITS-S when the living being associated with it starts acting in the role of a VRU.

A VRU can be equipped with a portable device. The term "VRU" may be used to refer to both a VRU and its VRU device unless the context dictates otherwise. The VRU device may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VBS when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

The following profile classification parameters may be used to classify different VRUs 116: maximum and average (e.g., typical) speed values (e.g., may be with its standard deviation); minimum and average (e.g., typical) communication range, The communication range may be calculated based on the assumption that an awareness time of 5 seconds is needed to warn/act on the traffic participants; environment or type of area (e.g., urban, sub-urban, rural, highway, and/or the like); Average Weight and standard deviation; directivity/trajectory ambiguity (e.g., give the level of confidence in the predictability of the behavior of the VRU in its movements); cluster size (e.g., number of VRUs 116 in the cluster. A VRU may be leading a cluster and then indicate its size. In such case, the leading VRU can be positioned as serving as the reference position of the cluster).

These profile parameters are not dynamic parameters maintained in internal tables, but indications of typical values to be used to classify the VRUs 116 and evaluate the behavior of a VRU 116 belonging to a specific profile. Example VRU profiles may be as shown by Table 4-4.

TABLE 4-4

| VRU Profile | Name/type | Description |
|---|---|---|
| VRU Profile 1 | Pedestrian | VRUs 116 in this profile includes any road users not using a mechanical device, and includes, for example, pedestrians on a pavement, children, prams, disabled persons, blind persons guided by a dog, elderly persons, riders off their bikes, and the like |
| VRU Profile 2 | Bicyclist | VRUs 116 in this profile includes bicyclists and similar light vehicle riders, possibly with an electric engine. This VRU profile includes bicyclists, and also unicycles, wheelchair users, horses carrying a rider, skaters, e-scooters, Segway's, and/or the like It should be noted that the light vehicle itself does not represent a VRU, but only in combination with a person creates the VRU. |
| VRU Profile 3 | Motorcyclist | VRUs 116 in this profile includes motorcyclists, which are equipped with engines that allow them to move on the road. This profile includes users (e.g., driver and passengers, e.g., children and animals) of Powered Two Wheelers (PTW) such as mopeds (motorized scooters), motorcycles or side-cars, and may also include four-wheeled all-terrain vehicles (ATVs), snowmobiles (or snow machines), jet skis for marine environments, and/or other like powered vehicles. |
| VRU Profile 4 | Animals | VRUs 116 in this profile include animals presenting a safety risk to other road users. Examples include dogs, wild animals, horses, cows, sheep, and/or the like. Some of these VRUs 116 might have their own ITS-S (e.g., dog in a city or a horse) or some other type of device (e.g., GPS module in dog collar, implanted RFID tags, and/or the like)and/or the like), but most of the VRUs 116 in this profile will only be indirectly detected (e.g., wild animals in rural areas and highway situations). Clusters of animal VRUs 116 might be herds of animals, like a herd of sheep, cows, or wild boars. This profile has a lower priority when decisions have to be taken to protect a VRU. |

Point-to-multipoint communication as discussed in ETSI EN 302 636-4-1 v 1.3.1 (2017-08) (hereinafter "[EN302634-4-1]"), ETSI EN 302 636-3 v1.1.2 (2014-03) ("[EN302636-3]") may be used for transmitting VAMs, as specified in ETSI TS 103 300-3 V0.1.11 (2020-05) ("[TS103300-3]").

Frequency/Periodicity range of VAMs. A VAM generation event results in the generation of one VAM. The minimum time elapsed between the start of consecutive VAM generation events are equal to or larger than T_GenVam. T_GenVam is limited to T_GenVamMin≤T_GenVam≤T_GenVamMax, where T_GenVamMin and T_GenVamMax are specified in Table 11 (Section 8). When a cluster VAM is transmitted, the T_GenVam could be smaller than that of individual VAM.

In case of ITS-G5, T_GenVam is managed according to the channel usage requirements of Decentralized Congestion Control (DCC) as specified in ETSI TS 103 175. The parameter T_GenVam is provided by the VBS management entity in the unit of milliseconds. If the management entity provides this parameter with a value above T_GenVamMax, T_GenVam is set to T_GenVamMax and if the value is below T_GenVamMin or if this parameter is not provided, the T_GenVam is set to T_GenVamMin. The parameter T_GenVam represents the currently valid lower limit for the time elapsed between consecutive VAM generation events.

In case of C-V2X PC5, T_GenVam is managed in accordance to the congestion control mechanism defined by the access layer in ETSI TS 103 574.

Triggering conditions. Individual VAM Transmission Management by VBS at VRU-ITS-S. First time individual VAM is generated immediately or at earliest time for transmission if any of the following conditions is satisfied and the individual VAM transmission does not subject to redundancy mitigation techniques: a VRU 116 is in VRU-IDLE VBS State and has entered VRU-ACTIVE-STANDALONE; a VRU 116/117 is in VRU-PASSIVE VBS State; has decided to leave the cluster and enter VRU-ACTIVE-STANDALONE VBS State; a VRU 116/117 is in VRU-PASSIVE VBS State; VRU has determined that one or more new vehicles or other VRUs 116/117 (e.g., VRU Profile 3—Motorcyclist) have come closer than minimum safe lateral distance (MSLaD) laterally, closer than minimum safe longitudinal distance (MSLoD) longitudinally and closer than minimum safe vertical distance (MSVD) vertically; and has determined to leave cluster and enter VRU-ACTIVE-STANDALONE VBS State in order to transmit immediate VAM; VRU 116/117 is in VRU-PASSIVE VBS State; has determined that VRU Cluster leader is lost and has decided to enter VRU-ACTIVE-STANDALONE VBS State; and/or a VRU 116/117 is in VRU-ACTIVE-CLUSTERLEADER VBS State; has determined breaking up the cluster and has transmitted VRU Cluster VAM with disband indication; and has decided to enter VRU-ACTIVE-STANDALONE VBS State.

Consecutive VAM Transmission is contingent to conditions as described here. Consecutive individual VAM generation events occurs at an interval equal to or larger than T_GenVam. An individual VAM is generated for transmission as part of a generation event if the originating VRU-ITS-S 117 is still in VBS VRU-ACTIVE-STANDALONE VBS State, any of the following conditions is satisfied and individual VAM transmission does not subject to redundancy mitigation techniques: the time elapsed since the last time the individual VAM was transmitted exceeds T_GenVamMax; the Euclidian absolute distance between the current estimated position of the reference point of the VRU and the estimated position of the reference point lastly included in an individual VAM exceeds a predefined threshold minReferencePointPositionChangeThreshold; the difference between the current estimated ground speed of the reference point of the VRU 116 and the estimated absolute speed of the reference point of the VRU lastly included in an individual VAM exceeds a predefined threshold minGroundSpeedChangeThreshold; difference between the orientation of the vector of the current estimated ground velocity of the reference point of the VRU 116 and the estimated orientation of the vector of the ground velocity of the reference point of the VRU 116 lastly included in an individual VAM exceeds a predefined threshold minGroundVelocityOrientanonChangeThreshold; difference between the current estimated collision probability with vehicle(s) or other VRU(s) 116 (e.g., as measured by Trajectory Interception Probability) and the estimated collision probability with vehicle(s) or other VRU(s) 116 lastly reported in an individual VAM exceeds a predefined threshold minCollisionProbabdityChangeThreshold; originating ITS-S is a VRU in VRU-ACTIVE-STANDALONE VBS State and has decided to join a Cluster after its previous individual VAM transmission; and/or a VRU 116/117 has determined that one or more new vehicles or other VRUs 116/117 have satisfied the following conditions simultaneously after the lastly transmitted VAM. The conditions are: coming closer than minimum safe lateral distance (MSLaD) laterally, coming closer than minimum safe longitudinal distance (MSLoD) longitudinally and coming closer than minimum safe vertical distance (MSVD) vertically.

VRU cluster VAM transmission management by VBS at VRU-ITS-S. First time VRU cluster VAM is generated immediately or at earliest time for transmission if any of the following conditions is satisfied and the VRU cluster VAM transmission does not subject to redundancy mitigation techniques: A VRU 116 in VRU-ACTIVE-STANDALONE VBS State determines to form a VRU cluster.

Consecutive VRU cluster VAM Transmission is contingent to conditions as described here. Consecutive VRU cluster VAM generation events occurs at cluster leader at an interval equal to or larger than T_GenVam. A VRU cluster VAM is generated for transmission by the cluster leader as part of a generation event if any of the following conditions is satisfied and VRU cluster VAM transmission does not subject to redundancy mitigation techniques: The time elapsed since the last time the VRU cluster VAM was transmitted exceeds T_GenVamMax; the Euclidian absolute distance between the current estimated position of the reference point of the VRU cluster and the estimated position of the reference point lastly included in a VRU cluster VAM exceeds a predefined threshold minReferencePointPositionChangeThreshold; the Euclidian absolute distance between the current estimated position of the reference point of the VRU cluster and the estimated position of the reference point lastly included in a VRU cluster VAM exceeds a predefined threshold minReferencePointPositionChangeThreshold; the difference between the current estimated Width of the cluster and the estimated Width included in the lastly transmitted VAM exceeds a predefined threshold minClusterWidthChangeThreshold; the difference between the current estimated Length of the cluster and the estimated Length included in the lastly transmitted VAM exceeds a predefined threshold minClusterLengthChangeThreshold; the difference between the current estimated ground speed of the reference point of the VRU cluster and the estimated absolute speed of the reference point lastly included a VRU cluster VAM exceeds a predefined threshold minGroundSpeedChangeThreshold; the difference between the orientation of the vector of the current estimated ground velocity of the reference point of the VRU cluster and the estimated orientation of the vector of the ground velocity of the reference point lastly included in a VRU cluster VAM exceeds a predefined threshold minGroundVelocityOrientationChangeThreshold; the difference between the current estimated probability of collision of the VRU cluster with vehicle(s) or other VRU(s) (e.g., as measured by Trajectory Interception Probability of other vehicles/VRUs 116/117 with cluster Bounding Area) and the estimated collision probability with vehicle(s) or other VRU(s) lastly reported in a VAM exceeds minCollisionProbabilityChangeThreshold; the VRU cluster type has been changed (e.g., from homogeneous to heterogeneous cluster or vice versa) after previous VAM generation event; the cluster leader has determined to break up the cluster after transmission of previous VRU cluster VAM; more than a pre-defined number of new VRUs 116/117 have joined the VRU cluster after transmission of previous VRU cluster VAM; more than a pre-defined number of members has left the VRU cluster after transmission of previous VRU cluster VAM; and/or the VRU in VRU-ACTIVE-CLUSTERLEADER VBS State has determined that one or more new vehicles or non-member VRUs 116/117 (e.g., VRU Profile 3—Motorcyclist) have satisfied the following conditions simultaneously after the lastly transmitted VAM. The conditions are: coming closer than minimum safe lateral distance (MSLaD) laterally, coming closer than minimum safe longitudinal distance (MSLoD) longitudinally and coming closer than minimum safe vertical distance (MSVD) vertically to the cluster bounding box.

VAM Redundancy Mitigation. A balance between Frequency of VAM generation at facilities layer and communication overhead at access layer is considered without impacting VRU safety and VRU awareness in the proximity. VAM transmission at a VAM generation event may subject to the following redundancy mitigation techniques: An originating VRU-ITS-S 117 skips current individual VAM if all the following conditions are satisfied simultaneously. The time elapsed since the last time VAM was transmitted by originating VRU-ITS-S 117 does not exceed N (e.g., 4) times T_GenVamMax; The Euclidian absolute distance between the current estimated position of the reference point and the estimated position of the reference point in the received VAM is less than minReferencePointPositionChangeThreshold; the difference between the current estimated speed of the reference point and the estimated absolute speed of the reference point in received VAM is less than minGroundSpeedChangeThreshold; and The difference between the orientation of the vector of the current estimated ground velocity and the estimated orientation of the vector of the ground velocity of the reference point in the received VAM is less than minGroundVelocityOrientationChangeThreshold. Or one of the following conditions are satisfied: VRU 116 consults appropriate maps to verify if the VRU 116 is in protected or non-drivable areas such as buildings, and/or the like; VRU 116 is in a geographical area designated as a pedestrian only zone. Only VRU profiles 1 and 4 allowed in the area; VRU 116 considers itself as a member of a VRU cluster and cluster break up message has not been received from the cluster leader; the information about the ego-VRU 116 has been reported by another ITS-S within T_GenVam.

VAM generation time. Besides the VAM generation frequency, the time required for the VAM generation and the timeliness of the data taken for the message construction are decisive for the applicability of data in the receiving ITS-Ss. In order to ensure proper interpretation of received VAMs, each VAM is timestamped. An acceptable time synchronization between the different ITS-Ss is expected and it is out of scope for this specification. The time required for a VAM generation is less than T_AssembleVAM. The time required for a VAM generation refers to the time difference between time at which a VAM generation is triggered and the time at which the VAM is delivered to the N&T layer.

VAM timestamp. The reference timestamp provided in a VAM disseminated by an ITS-S corresponds to the time at which the reference position provided in BasicContainer DF is determined by the originating ITS-S. The format and range of the timestamp is defined in clause B.3 of ETSI EN 302 637-2 V1.4.1 (2019-04) (hereinafter "[EN302637-2]"). The difference between VAM generation time and reference timestamp is less than 32 767 ms as in [EN302637-2]. This may help avoid timestamp wrap-around complications.

Transmitting VAMs. VRU-ITS-S 117 in VRU-ACTIVE-STANDALONE state sends 'individual VAMs', while VRU-ITS-S in VRU-ACTIVE-CLUSTERLEADER VBS state transmits 'Cluster VAMs' on behalf of the VRU cluster. Cluster member VRU-ITS-S 117 in VRU-PASSIVE VBS State sends individual VAMs containing VruClusterOperationContainer while leaving the VRU cluster. VRU-ITS-S 117 in VRU-ACTIVE-STANDALONE sends VAM as 'individual VAM' containing VruClusterOperationContainer while joining the VRU cluster.

VRUs 116/117 present a diversity of profiles which lead to random behaviors when moving in shared areas. Moreover, their inertia is much lower than vehicles (for example a pedestrian can do a U turn in less than one second) and as such their motion dynamic is more difficult to predict.

The VBS 221 enables the dissemination of VRU Awareness Messages (VAM), whose purpose is to create awareness at the level of other VRUs 116/117 or vehicles 110, with the objective to solve conflicting situations leading to collisions. The vehicle possible action to solve a conflict situation is directly related to the time left before the conflict, the vehicle velocity, vehicle deceleration or lane change capability, weather and vehicle condition (for example state of the road and of the vehicle tires). In the best case, a vehicle needs 1 to 2 seconds to be able to avoid a collision, but in worst cases, it can take more than 4 to 5 seconds to be able to avoid a collision. If a vehicle is very close to a VRU and with constant velocity (for example time-to-collision between 1 to 2 seconds), it is not possible any more to talk about awareness as this becomes really an alert for both the VRU and the vehicle.

VRUs 116/117 and vehicles which are in a conflict situation need to detect it at least 5 to 6 seconds before reaching the conflict point to be sure to have the capability to act on time to avoid a collision. Generally, collision risk indicators (for example TTC, TDTC, PET, and/or the like, see e.g., [TS103300-2]) are used to predict the instant of the conflict. These indicators need a prediction of: the trajectory (path) followed by the subject VRU and the subject vehicle; and/or the time required by the subject VRU and the subject vehicle to reach together the conflict point.

These predictions should be derived from data elements which are exchanged between the subject VRU and the subject vehicle. For vehicles, the trajectory and time predictions can be better predicted than for VRUs, because vehicles' trajectories are constrained to the road topography, traffic, traffic rules, and/or the like, while VRUs 116/117 have much more freedom to move. For vehicles, their dynamics is also constrained by their size, their mass and their heading variation capabilities, which is not the case for most of the VRUs.

Accordingly, it is not possible, in many situations, to predict the VRUs 116/117 exact trajectory or their velocity only based on their recent path history and on their current position. If this is performed, a lot of false positive and false negative results can be expected, leading to decisions of wrong collision avoidance action.

A possible way to avoid false positive and false negative results is to base respectively the vehicle and VRU path predictions on deterministic information provided by the vehicle and by the VRU (motion dynamic change indications) and by a better knowledge of the statistical VRU behavior in repetitive contextual situations. A prediction can always be verified a-posteriori when building the path history. Detected errors can then be used to correct future predictions.

VRU Motion Dynamic Change Indications (MDCI) are built from deterministic indicators which are directly provided by the VRU device itself or which result from a mobility modality state change (e.g., transiting from pedestrian to bicyclist, transiting from pedestrian riding his bicycle to pedestrian pushing his bicycle, transiting from motorcyclist riding his motorcycle to motorcyclist ejected from his motorcycle, transitioning from a dangerous area to a protected area, for example entering a tramway, a train, and/or the like) and/or the like).

Figure 5:
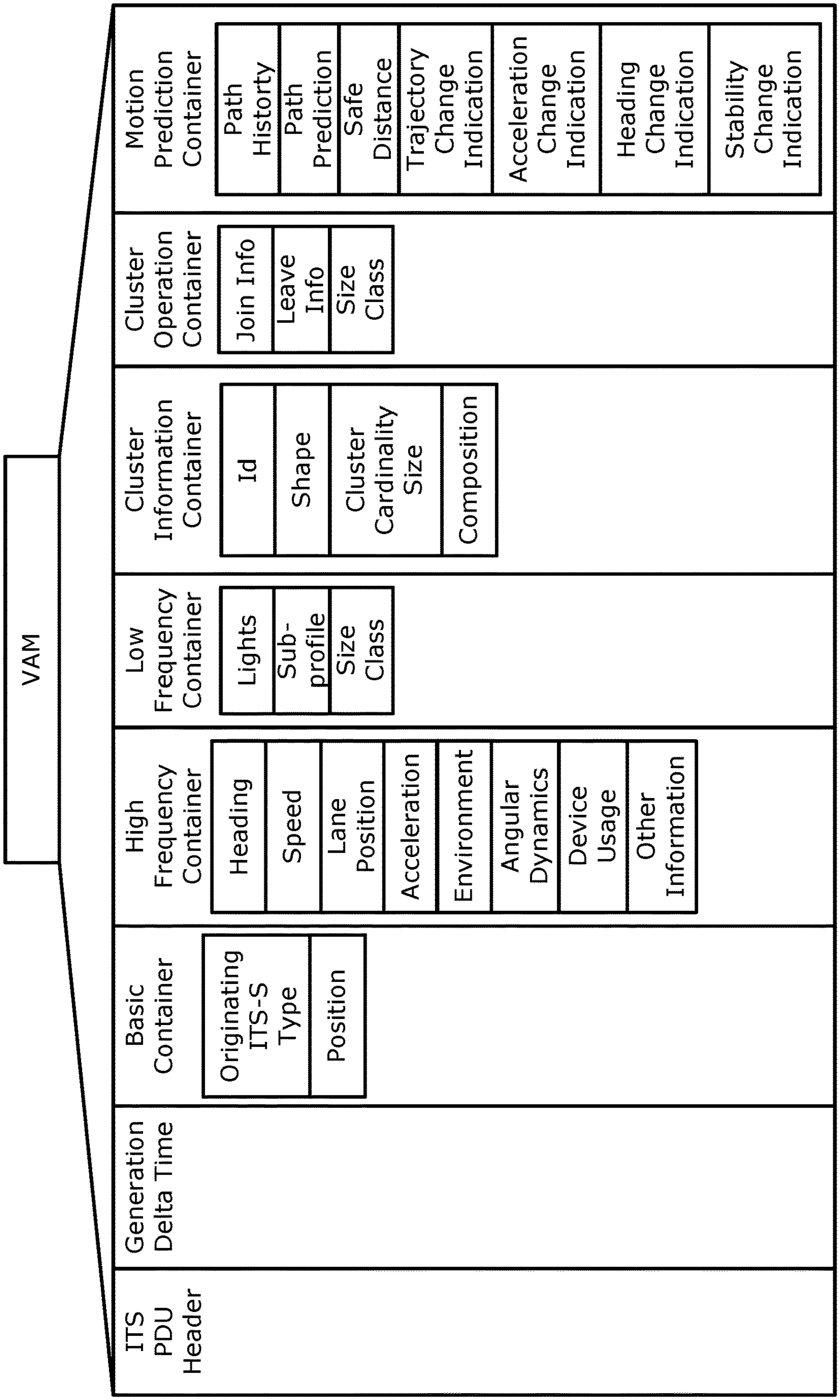
FIG. 5 shows a VAM format structure.

FIG. 5 shows and example VAM format structure. As shown by FIG. 5, a VAM is comprises a common ITS PDU header, a generation (delta) time container, a basic container, a VRU high frequency container with dynamic properties of the VRU (e.g., motion, acceleration, and/or the like), a VRU low frequency container with physical properties of the VRU (conditional mandatory, e.g., with higher periodicity, see clause 7.3.2 of [TS103300-3]), a cluster information container, a cluster operation container, and a motion prediction container. In some implementations, the VAM is extensible, but no extensions are defined in the present document.

The ITS PDU header shall be as specified in ETSI TS 102 894-2 V1.3.1 (2018-08) ("[TS102894-2]"). Detailed data presentation rules of the ITS PDU header in the context of VAM shall be as specified in annex B of [TS103300-3]. The StationId field in the ITS PDU Header shall change when the signing pseudonym certificate changes, or when the VRU starts to transmit individual VAMs after being a member of a cluster (e.g., either when, as leader, it breaks up the cluster, or when, as any cluster member, it leaves the cluster). An exception may be if the VRU device experiences a "failed join" of a cluster as defined in clause 5.4.2.2 of [TS103300-3], it should continue to use the StationId and other identifiers that it used before the failed join. The generation time in the VAM is a GenerationDeltaTime as used in CAM. This is a measure of the number of milliseconds elapsed since the ITS epoch, modulo 216 (e.g., 65 536).

The basic container provides basic information of the originating ITS-S including, for example, the type of the originating ITS-S and the latest geographic position of the originating ITS-S. For the type of the originating ITS-S, this DE somehow overlaps with the VRU profile, even though they do not fully match (e.g., moped(3) and motorcycle(4) both correspond to a VRU profile 3). To enable a future possibility to have the VAM transmitted by non VRU ITS-S (see clause 4.1 and annex I), both data elements are kept independent. For the latest geographic position of the originating ITS-S as obtained by the VBS at the VAM generation. This DF is already defined in [TS102894-2] and includes a positionConfidenceEllipse which provides the accuracy of the measured position with the 95% confidence level. The basic container shall be present for VAM generated by all ITS-Ss implementing the VBS.

Although the basic container has the same structure as the BasicContainer in other ETSI ITS messages, the type DE contains VRU-specific type values that are not used by the BasicContainer for vehicular messages. It is intended that at some point in the future the type field in the ITS Common Data Dictionary (CDD) in [TS102894-2] will be extended to include the VRU types. At this point the VRU BasicContainer and the vehicular BasicContainer will be identical.

All VAMs generated by a VRU ITS-S include at least a VRU high frequency (VRU HF) container. The VRU HF container contains potentially fast-changing status information of the VRU ITS-S such as heading or speed. As the VAM is not used by VRUs from profile 3 (motorcyclist), none of these containers apply to VRUs profile 3. Instead, VRUs profile 3 only transmit the motorcycle special container with the CAM (see e.g., clause 4.1, clause 7.4 and clause 4.4 in [TS103300-2]). In addition, VAMs generated by a VRU ITS-S may include one or more of the containers, as specified in table 7, if relevant conditions are met.

3 (motorcyclist). When present, it shall be as defined in clause B.3.17 of [TS103300-3]. The VruOrientationAngle is different from the vehicle heading, which is related to the VRU movement while the orientation is related to the VRU position.

The RollAngle DF provides an indication of a cornering two-wheeler. It is defined as the angle between the ground plane and the current orientation of a vehicle's y-axis with respect to the ground plane about the x-axis as specified in [ISO8855]. The DF also includes the angle accuracy. Both values are coded in the same manner as DF Heading, see A.101 in [TS102894-2], with the following conventions: positive values mean rolling to the right side (0 . . . "500"), where 500 corresponds to a roll angle value to the right of 50 degrees; negative values mean rolling to the left side (3 600 . . . "3 100"), where 3 100 corresponds to a roll angle value to the left of 50 degrees; and values between 500 and 3 100 are not to be used.

TABLE 4-5

VAM conditional mandatory and optional containers

| Container name | Description | Condition for presence in the VAM |
|---|---|---|
| VRU low frequency (VRU LF) container | The VRU LF container contains static or slow-changing vehicle data like the profile or the status of the exterior lights. | Mandatory with higher periodicity (see e.g., clause 6.2 of [TS103300-3]) or when VRU cluster operation container is present |
| VRU cluster information container | This container provides the information/parameters relevant to a VRU cluster. | Conditional mandatory (see e.g., clause 5.4.1 of [TS103300-3]) |
| VRU cluster operation container | This container provides information relevant to change of cluster state in the VBS. It may be included by a cluster VAM transmitter or by a cluster member (respectively leader or ordinary member). | Conditional mandatory (see e.g., clause 5.4.1 of [TS103300-3]) |
| VRU motion prediction container | When the information is available in the VRU ITS-S, this container provides dynamic VRU motion prediction information as well as explicit path prediction. | Optional |

The VRU HF container of the VAM contains potentially fast-changing status information of the VRU ITS-S. It shall include the parameters listed in clause B.3.1 of [TS 103300-3].

Part of the information in this container do not make sense for some VRU profiles. Accordingly, they are indicated as optional, but recommended to specific VRU profiles.

NOTE: The VRU profile is included in the VRU LF container and so is not transmitted as often as the VRU HF container (see clause 6.2). However, the receiver may deduce the VRU profile from the vruStationType field: pedestrian indicates profile 1, bicyclist or lightVRUvehicle indicates profile 2, moped or motorcycle indicates profile 3, and animals indicates profile 4.

The DF used to describe the lane position in CAM is not sufficient when considering VRUs, as it does not include bicycle paths and sidewalks. Accordingly, it has been extended to cover all positions where a VRU could be located. When present, the vruLanePosition DF shall either describe a lane on the road (same as for a vehicle), a lane off the road or an island between two lanes of the previous types. Further details are provided in the DF definition, in clause B.3.10 of [TS103300-3].

The VruOrientation DF complements the dimensions of the VRU vehicle by defining the angle between the VRU vehicle longitudinal axis with regards to the WGS84 north. It is restricted to VRUs from profile 2 (bicyclist) and profile The DE vruDeviceUsage provides indications to the VAM receiver about a parallel activity of the VRU. This DE is similar to the DE_PersonalDeviceUsageState specified in SAE International, "Vulnerable Road User Safety Message Minimum Performance Requirements", V2X Vehicular Applications Technical Committee, SAE Ground Vehicle Standard J2945/9 (1 Mar. 2017) ("[SAE-J2945/9]"). It is restricted to VRUs from profile 1, e.g., pedestrians. When present, it shall be as defined in clause B.3.19 of [TS103300-3] and will provide the possible values given in Table 4-6. To respect the user's choice for privacy, the device configuration application should include a consent form for transmitting this information. How this consent form is implemented is out of scope of the present document. In the case the option is opted-out (default), the device shall systematically send the value "unavailable(0)".

TABLE 4-6 vruDeviceUsage possible values

| Activity definition | Value | Description |
|---|---|---|
| unavailable | 0 | Not determined or VRU did not consent to transmission of this personal data in this DE |
| other | 1 | Used for states other than defined below |
| idle | 2 | Human is not interacting with device |

TABLE 4-6-continued

| vruDeviceUsage possible values | | |
|---|---|---|
| Activity definition | Value | Description |
| listening ToAudio | 3 | Any audio source other than calling |
| typing | 4 | Including texting, entering addresses and other manual input activity |
| calling | 5 | |
| playingGames | 6 | |
| reading | 7 | |
| viewing | 8 | Watching dynamic content, including following navigation prompts, viewing videos or other visual contents that are not static |

The DE VruMovementControl indicates the mechanism used by the VRU to control the longitudinal movement of the VRU vehicle. It is mostly aimed at VRUs from profile 2, e.g., bicyclists. When present, it shall be presented as defined in clause B.3.16 of [TS103300-3] and will provide the possible values given in Table 4-7. The usage of the different values provided in the table may depend on the country where they apply. For example, a pedal movement could be necessary for braking, depending on the bicycle in some countries. This DE could also serve as information for the surrounding vehicles' on-board systems to identify the bicyclist (among others) and hence improve/speed up the "matching" process of the messages already received from the VRU vehicle (before it entered the car's field of view) and the object which is detected by the other vehicle's camera (once the VRU vehicle enters the field of view).

TABLE 4-7

| VruMovementControl possible values | | |
|---|---|---|
| Movement control applied | Value | Description |
| unavailable | 0 | Not determined or VRU did not consent to transmission of this personal data in this DE |
| braking | 1 | Action applied on VRU vehicle brakes |
| hardBraking | 2 | Action applied on VRU vehicle brakes |
| stopPedaling | 3 | Action applied on VRU vehicle pedals |
| brakingAndStopPedaling | 4 | Action applied on both VRU vehicle pedals and brakes |
| hardBrakingAndStopPedaling | 5 | Action applied on both VRU vehicle pedals and brakes |
| noReaction | 6 | No action applied on VRU vehicle |

The VRU LF container of the VAM contains potential slow-changing information of the VRU ITS-S. It shall include the parameters listed in clause B.4.1 of [TS103300-3]. Some elements are mandatory, others are optional or conditional mandatory.

The VRU LF container shall be included into the VAM with a parametrizable frequency as specified in clause 6.2 of [TS103300-3]. The VAM VRU LF container has the following content.

The DE VruProfileAndSubProfile shall contain the identification of the profile and the sub-profile of the originating VRU ITS-S if defined. Table 4-8 shows the list of profiles and sub-profiles specified in the present document.

TABLE 4-8

| VruProfileAndSubProfile description based on profiles | | | |
|---|---|---|---|
| Profile | Profile Index | SubProfile Index | VruSubProfile description |
| Pedestrian | 1 | 0 | Unavailable |
| | | 1 | Ordinary Pedestrian |
| | | 2 | Road workers |
| | | 3 | First responder |
| Bicyclist | 2 | 0 | Unavailable |
| | | 1 | Bicyclist |
| | | 2 | Wheelchair User |
| | | 3 | Horse and rider |
| | | 4 | Rollerskater |
| | | 5 | Standing E-Scooter |
| | | 6 | Personal Transporter |
| | | 7 | E-Bicyclist (Pedelec), up to 25 km/h in Europe |
| | | 8 | E-Bicyclist (Speed-Pedelec), up to 45 km/h but with a motion dynamic similar to a bicycle |
| Motorcyclist | 3 | 0 | Unavailable |
| | | 1 | Moped |
| | | 2 | Motorcycle |
| | | 3 | Motorcycle + Sidecar right |
| | | 4 | Motorcycle + Sidecar left |
| | | 5 | Seated E-scooter |
| Animals (see note) | 4 | 0 | Unavailable |
| | | 1 | Wild animal |
| | | 2 | Farm animal |
| | | 3 | Service animal |

NOTE:
In the context of safety related traffic communication animals are regarded having a higher priority than non-living objects. Thus, a specific profile has been defined in order to treat them correctly in any kind of decision-making process.

The DE VruProfileAndSubProfile is OPTIONAL if the VRU LF container is present. If it is absent, this means that the profile is unavailable. The sub-profiles for VRU profile 3 are used only in the CAM special container. The DE VRUSizeClass contains information of the size of the VRU. The DE VruSizeClass shall depend on the VRU profile. This dependency is depicted in Table 4-9.

TABLE 4-9

| VruSizeClass description based on profiles | | | |
|---|---|---|---|
| Profile | Profile Value | VruSizeClass Value | VruSizeClass description |
| Unavailable | 0 | 0 | N/A |
| Pedestrian | 1 | 0 | Unavailable |
| | | 1 | Low → 1 m or less in height |
| | | 2 | medium → larger than 1 m and 1.5 m or less in height |
| | | 3 | high → larger than 1.5 m |
| Bicyclist | 2 | 0 | Unavailable |
| | | 1 | Low → 1.5 m or less height |
| | | 2 | medium → more than 1.5 m in height, 1 m or less front-to-back |
| | | 3 | high → more than 1.5 m in height, more than 1 m front-to-back |
| Motorcyclist | 3 | 0 | Unavailable |
| | | 1 | Low → 1.5 m or less height |
| | | 2 | medium → more than 1.5 m in height, 1 m or less front-to-back |
| | | 3 | high → more than 1.5 m in height, more than 1 m front-to-back |

TABLE 4-9-continued

VruSizeClass description based on profiles

| Profile | Profile Value | VruSizeClass Value | VruSizeClass description |
|---|---|---|---|
| Animals | 4 | 0 | Unavailable |
| | | 1 | Low → 60 Kg or less and 1.5 m or less height |
| | | 2 | medium → more than 60 kg and 100 kg or less and 1.5 m or less in height |
| | | 3 | high → more than 100 kg or more than 1.5 m in height |

NOTE:
1.5 m height of a VRU as a limit makes the difference between being obscured by a parked car and not being obscured by a parked car.

The DE VruExteriorLight shall give the status of the most important exterior lights switches of the VRU ITS-S that originates the VAM. The DE VruExteriorLight shall be mandatory for the profile 2 and profile 3 if the low VRU LF container is present. For all other profiles it shall be optional.

The VRU cluster containers of the VAM contain the cluster information and/or operations related to the VRU clusters of the VRU ITS-S. The VRU cluster containers are made of two types of cluster containers according to the characteristics of the included data/parameters.

A VRU cluster information container shall be added to a VAM originated from the VRU cluster leader. This container shall provide the information/parameters relevant to the VRU cluster. VRU cluster information container shall be of type VruClusterInformationContainer.

VRU cluster information container shall comprise information about the cluster ID, shape of the cluster bounding box, cardinality size of cluster and profiles of VRUs in the cluster. Cluster ID is of type ClusterID. ClusterID is selected by the cluster leader to be non-zero and locally unique as specified in clause 5.4.2.2 of [TS103300-3]. The shape of the VRU cluster bounding box shall be specified by DF ClusterBoundingBoxShape. The shape of the cluster bounding box can be rectangular, circular or polygon.

VRU cluster operation container shall contain information relevant to change of cluster state and composition. This container may be included by a cluster VAM transmitter or by a cluster member (leader or ordinary member). A cluster leader shall include VRU cluster operation container for performing cluster operations of disbanding (breaking up) cluster. A cluster member shall include VRU cluster operation container in its individual VAM to perform cluster operations of joining a VRU cluster and leaving a VRU cluster.

VRU cluster operation container shall be of type VruClusterOperationContainer. VruClusterOperationContainer provides: DF clusterJoinInfo for cluster operation of joining a VRU cluster by a new member; DF clusterLeaveInfo for an existing cluster member to leave a VRU cluster; DF clusterBreakupInfo to perform cluster operations of disbanding (breaking up) cluster respectively by the cluster leader; and/or DE clusterIdChangeTimeInfo to indicate that the cluster leader is planning to change the cluster ID at the time indicated in the DE. The new Id is not provided with the indication for privacy reasons (see e.g., clause 5.4.2.3 and clause 6.5.4 of [TS103300-3]).

A VRU device joining or leaving a cluster announced in a message other than a VAM shall indicate this using the ClusterId value 0.

A VRU device leaving a cluster shall indicate the reason why it leaves the cluster using the DE ClusterLeaveReason. The available reasons are depicted in Table 4-10. A VRU leader device breaking up a cluster shall indicate the reason why it breaks up the cluster using the ClusterBreakupReason. The available reasons are depicted in Table 4-11. In the case the reason for leaving the cluster or breaking up the cluster is not exactly matched to one of the available reasons, the device shall systematically send the value "notProvided(0)".

In particular, a VRU in a cluster, may determine that one or more new vehicles or other VRUs (e.g., VRU Profile 3—Motorcyclist) have come closer than minimum safe lateral distance (MSLaD) laterally, and closer than minimum safe longitudinal distance (MSLoD) longitudinally and closer than minimum safe vertical distance (MSVD) vertically (e.g., the minimum safe distance condition is satisfied as in clause 6.5.10.5 of [TS103300-2]); it shall leave the cluster and enter VRU-ACTIVE-STANDALONE VBS state in order to transmit immediate VAM with ClusterLeaveReason "SafetyCondition(8)". The same applies if any other safety issue is detected by the VRU device.

Device suppliers should declare the conditions on which the VRU device will join/leave a cluster.

TABLE 4-10

ClusterLeaveReason description

| Name | Value | Description |
|---|---|---|
| ClusterLeaveReason | 0 | not Provided |
| | 1 | clusterLeaderLost |
| | 2 | clusterDisbandedByLeader |
| | 3 | outOfClusterBounding Box |
| | 4 | outOfClusterSpeedRange |
| | 5 | joiningAnotherCluster |
| | 6 | CancelledJoin |
| | 7 | FailedJoin |
| | 8 | SafetyCondition |

TABLE 4-11

ClusterBreakupReason description

| Name | Value | Description |
|---|---|---|
| ClusterBreakupReason | 0 | notProvided |
| | 1 | clusteringPurposeCompleted |
| | 2 | leaderMovedOutOfClusterBounding Box |
| | 3 | joiningAnotherCluster |
| | 4 | enteringLowriskareaBasedonMAPs |
| | 5 | receptionOfCPMcontainingCluster |

The VruClusterOperationContainer does not include the creation of VRU cluster by the cluster leader. When the cluster leader starts to send a cluster VAM, it indicates that it has created a VRU cluster. While the cluster leader is sending a cluster VAM, any individual VRUs can join the cluster if the joining conditions are met.

The VRU Motion Prediction Container carries the past and future motion state information of the VRU. The VRU Motion Prediction Container of type VruMotionPredictionContainer shall contain information about the past locations of the VRU of type PathHistory, predicted future locations of the VRU (formatted as SequenceOfVruPathPoint), safe distance indication between VRU and other road users/objects of type SequenceOfVruSafeDistanceIndication, VRU's possible trajectory interception with another VRU/object shall be of type SequenceOfTrajectoryInterceptionIndication, the change in the acceleration of the VRU shall be of type AccelerationChangeIndication, the heading changes of the VRU shall be of HeadingChangeIndication, and changes in the stability of the VRU shall be of type StabilityChangeIndication.

The Path History DF is of PathHistory type. The PathHistory DF shall comprise the VRU's recent movement over past time and/or distance. It consists of up to 40 past path points (see e.g., [TS102894-2]). When a VRU leaves a cluster and wants to transmit its past locations in the VAM, the VRU may use the PathHistory DF.

The Path Prediction DF is of SequenceOfVruPathPoint type and shall define up to 40 future path points, confidence values and corresponding time instances of the VRU ITS-S. It contains future path information for up to 10 seconds or up to 40 path points, whichever is smaller.

The Safe Distance Indication is of type SequenceOfVruSafeDistanceIndication and provides an indication of whether the VRU is at a recommended safe distance laterally, longitudinally and vertically from up to 8 other stations in its vicinity. The simultaneous comparisons between Lateral Distance (LaD), Longitudinal Distance (LoD) and Vertical Distance (VD) and their respective thresholds, Minimum Safe Lateral Distance (MSLaD), Minimum Safe Longitudinal Distance (MSLoD), and Minimum Safe Vertical Distance (MSVD) as defined in clause 6.5.10.5 of [TS103300-2], shall be used for setting the VruSafeDistanceIndication DF. Other ITS-S involved are indicated as StationID DE within the VruSafeDistanceIndication DE. The timetocollision (TTC) DE within the container shall reflect the estimated time taken for collision based on the latest onboard sensor measurements and VAMs.

The SequenceOfTrajectoryInterceptionIndication DF shall contain ego-VRU's possible trajectory interception with up to 8 other stations in the vicinity of the ego-VRU. The trajectory interception of a VRU is indicated by VruTrajectoryInterceptionIndication DF. The other ITS-S involved are designated by StationID DE. The trajectory interception probability and its confidence level metrics are indicated by TrajectoryInterceptionProbability and TrajectoryInterceptionConfidence DEs.

The Trajectory Interception Indication (TII) DF corresponds to the TII definition in [TS103300-2].

The AccelerationChangeIndication DF shall contain ego-VRU's change of acceleration in the future (acceleration or deceleration) for a time period. The DE AccelOrDecel shall give the choice between acceleration and deceleration. The DE ActionDeltaTime shall indicate the time duration.

The HeadingChangeIndication DF shall contain ego-VRU's change of heading in the future (left or right) for a time period. The DE LeftOrRight shall give the choice between heading change in left and right directions. The DE ActionDeltaTime shall indicate the time duration.

The StabilityChangeIndication DF shall contain ego-VRU's change in stability for a time period. The DE StabilityLossProbability shall give the probability indication of the stability loss of the ego-VRU. The DE ActionDeltaTime shall indicate the time duration.

The description of the container is provided in clause B.7 of [TS103300-3] and the corresponding DFs and DEs to be added to [TS102894-2] are provided in clause F.7 of [TS 103300-3].

ITS stations in VRUs profile 3 devices (motorcyclist) already transmit the CAM. Accordingly, as specified in [TS103300-2] and in clause 5, they shall not transmit the full VAM but may transmit a VRU special vehicle container in the CAM that they already transmit. When relevant, this requirement also applies in case of a combined VRU (see clause 5.4.2.6 of [TS103300-3]) made of one VRU profile 3 (motorcycle) and one or more VRU profile 1 (pedestrian(s)).

The objective of this special vehicle container is to notify to surrounding vehicles that the V-ITS-S is hosted by a VRU Profile 3 device and to provide additional indications about the VRU profile 3. The Motorcyclist special container shall include the parameters listed in clause D.2 of [TS103300-3].

Referring back to FIG. 3, the VRUs 116/117 can be classified into four profiles which are defined in clause 4.1 of [TS103300-3]. SAE International, "Taxonomy and Classification of Powered Micromobility Vehicles", Powered Micromobility Vehicles Committee, SAE Ground Vehicle Standard J3194 (20 Nov. 2019) ("[SAE-J3194]") also proposes a taxonomy and classification of powered micromobility vehicles: powered bicycle (e.g., electric bikes); powered standing scooter (e.g., Segway®); powered seated scooter; powered self-balancing board sometimes referred to as "self-balancing scooter" (e.g., Hoverboard® self-balancing board, and Onewheel® self-balancing single wheel electric board); powered skates; and/or the like. Their main characteristics are their kerb weight, vehicle width, top speed, power source (electrical or combustion). Human powered micro-mobility vehicles (bicycle, standing scooter) should be also considered. Transitions between engine powered vehicles and human powered vehicles may occur, changing the motion dynamic of the vehicle. Both, human powered and engine powered may also occur in parallel, also impacting the motion dynamic of the vehicle.

In [TS103300-2] and in clause 5.4.2.6 of [TS103300-3], a combined VRU 116/117 is defined as the assembly of a VRU profile 1, potentially with one or several additional VRU(s) 116/117, with one VRU vehicle or animal. Several VRU vehicle types are possible. Even if most of them can carry VRUs, their propulsion mode can be different, leading to specific threats and vulnerabilities: they can be propelled by a human (human riding on the vehicle or mounted on an animal); they can be propelled by a thermal engine. In this case, the thermal engine is only activated when the ignition system is operational; and/or they can be propelled by an electrical engine. In this case, the electrical engine is immediately activated when the power supply is on (no ignition).

A combined VRU 116/117 can be the assembly of one human and one animal (e.g., human with a horse or human with a camel). A human riding a horse may decide to get off the horse and then pull it. In this case, the VRU 116/117 performs a transition from profile 2 to profile 1 with an impact on its velocity.

This diversity of VRUs 116/117 and cluster association leads to several VBS state machines conditioning standard messages dissemination and their respective motion dynamics. These state machines and their transitions can be summarized as in FIG. 4.

Figure 4:
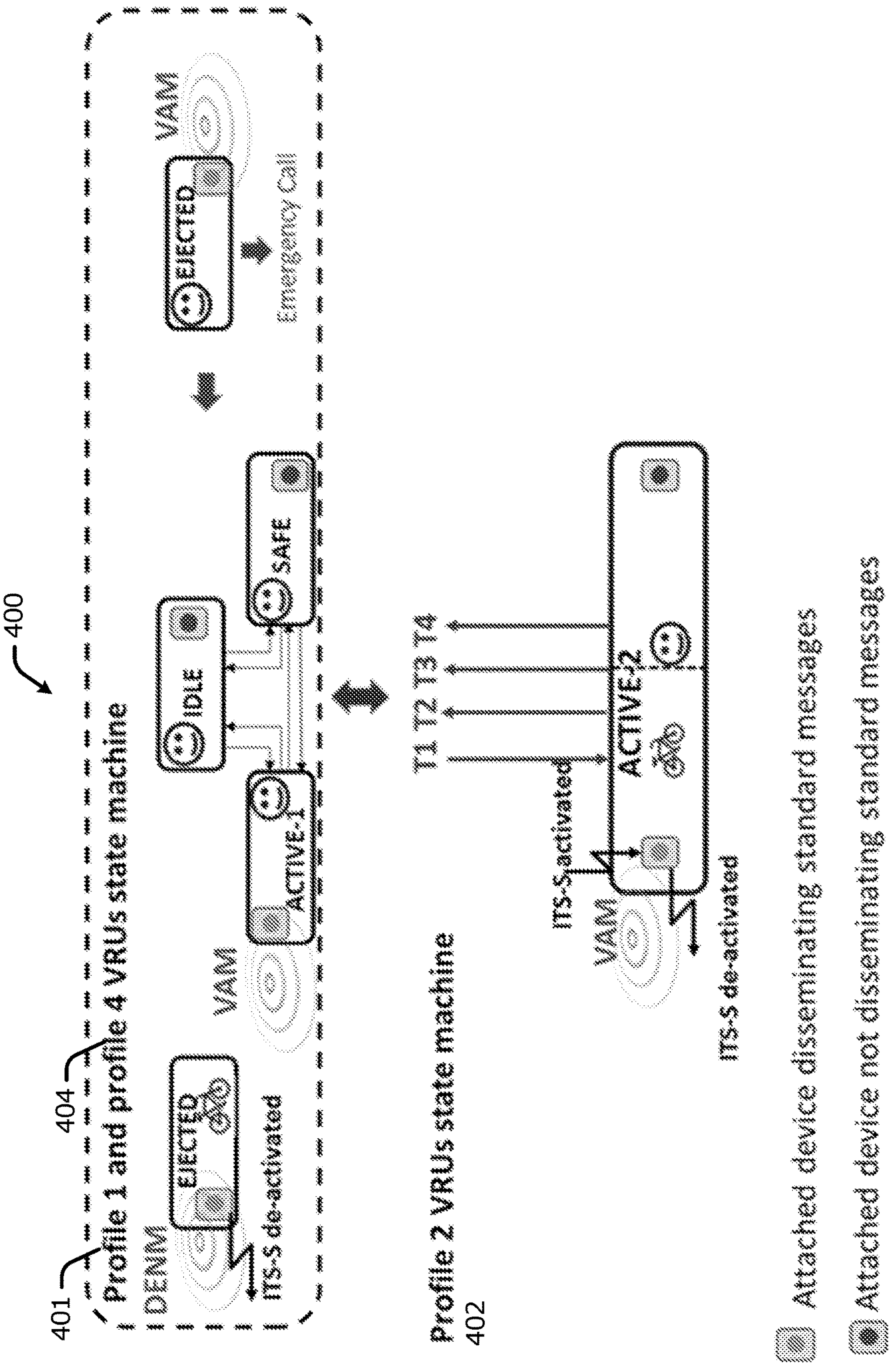
FIG. 4 shows aVBS state machines.

FIG. 4 shows example state machines and transitions 400. In FIG. 4, when a VRU is set as a profile 2 VRU 402, with multiple attached devices, it is necessary to select an active one. This can be achieved for each attached device at the initialization time (configuration parameter) when the device is activated. In FIG. 4, the device attached to the bicycle has been configured to be active during its combination with the VRU. But when the VRU returns to a profile 1 state 401, the device attached to the VRU vehicle needs to be deactivated, while the VBS 221 in the device attached to the VRU transmits again VAMs if not in a protected location.

In the future, profile 2 402, profile 1 401, and profile 4 404 VRUs may become members of a cluster, thus adding to their own state the state machine associated to clustering operation. This means that they need to respect the cluster management requirements while continuing to manage their own states. When transitioning from one state to another, the combined VRU may leave a cluster if it does not comply anymore with its requirements.

The machine states' transitions which are identified in FIG. 4 (e.g., T1 to T4) impact the motion dynamic of the VRU. These transitions are deterministically detected consecutively to VRU decisions or mechanical causes (for example VRU ejection from its VRU vehicle). The identified transitions have the following VRU motion dynamic impacts.

T1 is a transition from a VRU profile 1 401 to profile 2 402. This transition is manually or automatically triggered when the VRU takes the decision to use actively a VRU vehicle (riding). The motion dynamic velocity parameter value of the VRU changes from a low speed (pushing/pulling his VRU vehicle) to a higher speed related to the class of the selected VRU vehicle.

T2 is a transition from a VRU profile 2 402 to profile 1 401. This transition is manually or automatically triggered when the VRU gets off his VRU vehicle and leaves it to become a pedestrian. The motion dynamic velocity parameter value of the VRU changes from a given speed to a lower speed related to the class of the selected VRU vehicle.

T3 is a transition from a VRU profile 2 402 to profile 1 401. This transition is manually or automatically triggered when the VRU gets off his VRU vehicle and pushes/pulls it for example to enter a protected environment (for example tramway, bus, train). The motion dynamic velocity parameter value of the VRU changes from a given speed to a lower speed related to the class of the selected VRU vehicle.

T4 is a transition from a VRU profile 2 402 to profile 1 401. This transition is automatically triggered when a VRU is detected to be ejected from his VRU vehicle. The motion dynamic velocity parameter value of the VRU changes from a given speed to a lower speed related to the VRU state resulting from his ejection. In this case, the VRU vehicle is considered as an obstacle on the road and accordingly should disseminate DENMs until it is removed from the road (its ITS-S is deactivated).

The ejection case can be detected by stability indicators including inertia sensors and the rider competence level derived from its behavior. The stability can then be expressed in terms of the risk level of a complete stability lost. When the risk level is 100% this can be determined as a factual ejection of the VRU.

From the variation of the motion change dynamic velocity parameter value, a new path prediction can be provided from registered "contextual" past path histories (average VRU traces). The contextual aspects consider several parameters which are related to a context similar to the context in which the VRU is evolving.

Adding to the state transitions identified above, which may drastically impact the VRU velocity, the following VRU indications also impact the VRU velocity and/or the VRU trajectory (in addition to the parameters already defined in the VAM).

Stopping indicator. The VRU or an external source (a traffic light being red for the VRU) may indicate that the VRU is stopping for a moment. When this indicator is set, it could also be useful to know the duration of the VRU stop. This duration can be estimated either when provided by an external source (for example the SPATEM information received from a traffic light) or when learned through an analysis of the VRU behavior in similar circumstances.

Visibility indicators. Weather conditions may impact the VRU visibility and accordingly change its motion dynamic. Even if the local vehicles may detect these weather conditions, in some cases, the impact on the VRU could be difficult to estimate by vehicles. A typical example is the following: according to its orientation, a VRU can be disturbed by a severe glare of the sun (for example, in the morning when the sun rises, or in the evening when sun goes down), limiting its speed Referring back to FIG. 2, the N&T layer 203 provides functionality of the OSI network layer and the OSI transport layer and includes one or more networking protocols, one or more transport protocols, and network and transport layer management. Additionally, aspects of sensor interfaces and communication interfaces may be part of the N&T layer 203 and access layer 204. The networking protocols may include, inter alia, IPv4, IPv6, IPv6 networking with mobility support, IPv6 over GeoNetworking, the CALM FAST protocol, and/or the like. The transport protocols may include, inter alia, BOSH, BTP, GRE, GeoNetworking protocol, MPTCP, MPUDP, QUIC, RSVP, SCTP, TCP, UDP, VPN, one or more dedicated ITSC transport protocols, or some other suitable transport protocol. Each of the networking protocols may be connected to a corresponding transport protocol.

The access layer includes a physical layer (PHY) 204 connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY 204 and DLL, and a security adaptation entity (SAE) to provide security services for the access layer. The access layer may also include external communication interfaces (CIs) and internal CIs. The CIs are instantiations of a specific access layer technology or RAT and protocol such as 3GPP LTE, 3GPP 5G/NR, C-V2X (e.g., based on 3GPP LTE and/or 5G/NR), WiFi, W-V2X (e.g., including ITS-G5 and/or DSRC), DSL, Ethernet, Bluetooth, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include ITS-G5/DSRC and 3GPP C-V2X. Additionally or alternatively, other access layer technologies (V2X RATs) may be used.

Figure 8:
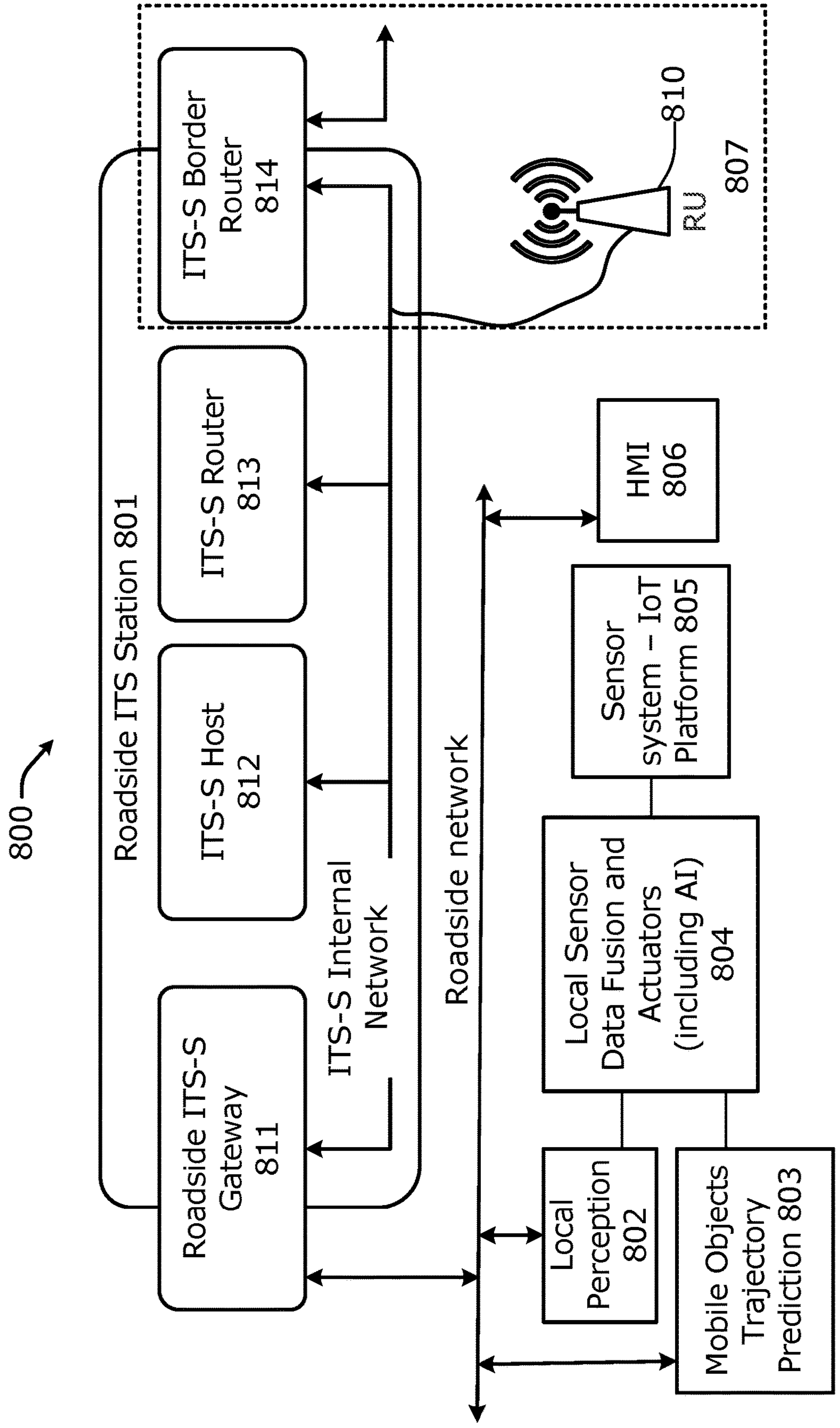
FIG. 8 depicts a roadside ITS-S in a roadside infrastructure node.

The ITS-S reference architecture 200 may be applicable to the elements of FIGS. 6 and 8. The ITS-S gateway 611, 811 (see e.g., FIGS. 6 and 8) interconnects, at the facilities layer, an OSI protocol stack at OSI layers 5 to 7. The OSI protocol stack is typically is connected to the system (e.g., vehicle system or roadside system) network, and the ITSC protocol stack is connected to the ITS station-internal network. The ITS-S gateway 611, 811 (see e.g., FIGS. 6 and 8) is capable of converting protocols. This allows an ITS-S to communicate with external elements of the system in which it is implemented. The ITS-S router 611, 811 provides the functionality the ITS-S reference architecture 200 excluding the Applications and Facilities layers. The ITS-S router 611, 811 interconnects two different ITS protocol stacks at layer 3. The ITS-S router 611, 811 may be capable to convert protocols. One of these protocol stacks typically is connected to the ITS station-internal network. The ITS-S border router 814 (see e.g., FIG. 8) provides the same functionality as the ITS-S router 611, 811, but includes a protocol stack related to an external network that may not follow the management and security principles of ITS (e.g., the ITS Mgmnt and ITS Security layers in FIG. 2).

Additionally, other entities that operate at the same level but are not included in the ITS-S include the relevant users at that level, the relevant HMI (e.g., audio devices, display/touchscreen devices, and/or the like); when the ITS-S is a vehicle, vehicle motion control for computer-assisted and/or automated vehicles (both HMI and vehicle motion control entities may be triggered by the ITS-S applications); a local device sensor system and IoT Platform that collects and shares IoT data; local device sensor fusion and actuator application(s), which may contain ML/AI and aggregates the data flow issued by the sensor system; local perception and trajectory prediction applications that consume the output of the fusion application and feed the ITS-S applications; and the relevant ITS-S. The sensor system can include one or more cameras, radars, LIDARs, and/or the like, in a V-ITS-S 110 or R-ITS-S 130. In the central station, the sensor system includes sensors that may be located on the side of the road, but directly report their data to the central station, without the involvement of a V-ITS-S 110 or R-ITS-S 130. In some cases, the sensor system may additionally include gyroscope(s), accelerometer(s), and the like (see e.g., sensor circuitry 1272 of FIG. 12). Aspects of these elements are discussed infra with respect to FIGS. 6, 7, and 8

FIG. 6 depicts an example vehicle computing system 600. In this example, the vehicle computing system 600 includes a V-ITS-S 601 and Electronic Control Units (ECUs) 605. The V-ITS-S 601 includes a V-ITS-S gateway 611, an ITS-S host 612, and an ITS-S router 613. The vehicle ITS-S gateway 611 provides functionality to connect the components at the in-vehicle network (e.g., ECUs 605) to the ITS station-internal network. The interface to the in-vehicle components (e.g., ECUs 605) may be the same or similar as those discussed herein (see e.g., IX 1256 of FIG. 12) and/or may be a proprietary interface/interconnect. Access to components (e.g., ECUs 605) may be implementation specific. The ECUs 605 may be the same or similar to the driving control units (DCUs) 174 discussed previously with respect to FIG. 1. The ITS station connects to ITS ad hoc networks via the ITS-S router 613.

Figure 7:
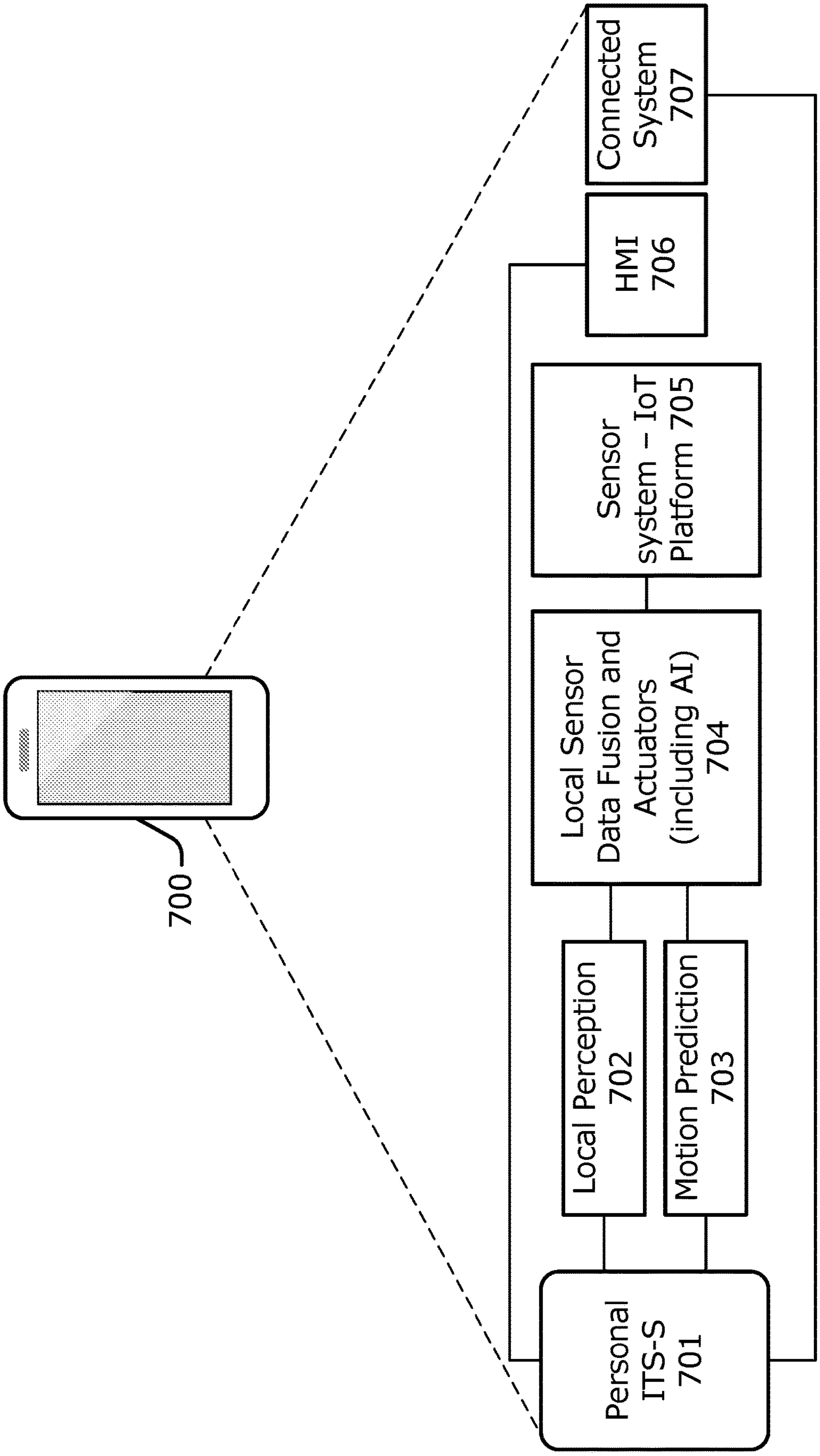
FIG. 7 depicts a personal ITS station (P-ITS-S), which may be used as a VRU ITS-S.

FIG. 7 depicts an example personal computing system 700. The personal ITS sub-system 700 provides the application and communication functionality of ITSC in mobile devices, such as smartphones, tablet computers, wearable devices, PDAs, portable media players, laptops, and/or other mobile devices. The personal ITS sub-system 700 contains a personal ITS station (P-ITS-S) 701 and various other entities not included in the P-ITS-S 701, which are discussed in more detail infra. The device used as a personal ITS station may also perform HMI functionality as part of another ITS sub-system, connecting to the other ITS sub-system via the ITS station-internal network (not shown). For purposes of the present disclosure, the personal ITS sub-system 700 may be used as a VRU ITS-S 117.

FIG. 8 depicts an example roadside infrastructure system 800. In this example, the roadside infrastructure system 800 includes an R-ITS-S 801, output device(s) 805, sensor(s) 808, and one or more radio units (RUs) 810. The R-ITS-S 801 includes a R-ITS-S gateway 811, an ITS-S host 812, an ITS-S router 813, and an ITS-S border router 814. The ITS station connects to ITS ad hoc networks and/or ITS access networks via the ITS-S router 813. The R-ITS-S gateway 611 provides functionality to connect the components of the roadside system (e.g., output devices 805 and sensors 808) at the roadside network to the ITS station-internal network.

The interface to the in-vehicle components (e.g., ECUs 605) may be the same or similar as those discussed herein (see e.g., IX 1256 of FIG. 12) and/or may be a proprietary interface/interconnect. Access to components (e.g., ECUs 605) may be implementation specific. The sensor(s) 808 may be inductive loops and/or sensors that are the same or similar to the sensors 172 discussed infra with respect to FIG. 1 and/or sensor circuitry 1272 discussed infra with respect to FIG. 12.

The actuators 813 are devices that are responsible for moving and controlling a mechanism or system. The actuators 813 are used to change the operational state (e.g., on/off, zoom or focus, and/or the like), position, and/or orientation of the sensors 808. The actuators 813 are used to change the operational state of some other roadside equipment, such as gates, traffic lights, digital signage or variable message signs (VMS), and/or the like. The actuators 813 are configured to receive control signals from the R-ITS-S 801 via the roadside network, and convert the signal energy (or some other energy) into an electrical and/or mechanical motion. The control signals may be relatively low energy electric voltage or current. The actuators 813 comprise electromechanical relays and/or solid state relays, which are configured to switch electronic devices on/off and/or control motors, and/or may be that same or similar or actuators 1274 discussed infra with respect to FIG. 12.

Each of FIGS. 6, 7, and 8 also show entities which operate at the same level but are not included in the ITS-S including the relevant HMI 606, 706, and 806; vehicle motion control 608 (only at the vehicle level); local device sensor system and IoT Platform 605, 705, and 805; local device sensor fusion and actuator application 804, 704, and 804; local perception and trajectory prediction applications 602, 702, and 802; motion prediction 603 and 703, or mobile objects trajectory prediction 803 (at the RSU level); and connected system 607, 707, and 807.

The local device sensor system and IoT Platform 605, 705, and 805 collects and shares IoT data. The VRU sensor system and IoT Platform 705 is at least composed of the PoTi management function present in each ITS-S of the system (see e.g. ETSI EN 302 890-2 ("[EN302890-2]")). The PoTi entity provides the global time common to all system elements and the real time position of the mobile elements. Local sensors may also be embedded in other mobile elements as well as in the road infrastructure (e.g., camera in a smart traffic light, electronic signage, and/or the like). An IoT platform, which can be distributed over the system elements, may contribute to provide additional information related to the environment surrounding the VRU system 700. The sensor system can include one or more cameras, radars, LiDARs, and/or other sensors (see e.g., 1222 of FIG. 12), in a V-ITS-S 110 or R-ITS-S 130. In the VRU device 117/700, the sensor system may include gyroscope(s), accelerometer(s), and the like (see e.g., 1222 of FIG. 12). In a central station (not shown), the sensor system includes sensors that may be located on the side of the road, but directly report their data to the central station, without the involvement of a V-ITS-S 110 or an R-ITS-S 130.

The (local) sensor data fusion function and/or actuator applications 604, 704, and 804 provides the fusion of local perception data obtained from the VRU sensor system and/or different local sensors. This may include aggregating data flows issued by the sensor system and/or different local sensors. The local sensor fusion and actuator application(s) may contain machine learning (ML)/Artificial Intelligence (AI) algorithms and/or models. Sensor data fusion usually relies on the consistency of its inputs and then to their timestamping, which correspond to a common given time. The sensor data fusion and/or ML/AL techniques may be used to determine occupancy values for the DCROM as discussed herein.

Various ML/AI techniques can be used to carry out the sensor data fusion and/or may be used for other purposes, such as the DCROM discussed herein. Where the apps 604, 704, and 804 are (or include) AI/ML functions, the apps 604, 704, and 804 may include AI/ML models that have the ability to learn useful information from input data (e.g., context information, and/or the like) according to supervised learning, unsupervised learning, reinforcement learning (RL), and/or neural network(s) (NN). Separately trained AI/ML models can also be chained together in a AI/ML pipeline during inference or prediction generation.

The input data may include AI/ML training information and/or AI/ML model inference information. The training information includes the data of the ML model including the input (training) data plus labels for supervised training, hyperparameters, parameters, probability distribution data, and other information needed to train a particular AI/ML model. The model inference information is any information or data needed as input for the AI/ML model for inference generation (or making predictions). The data used by an AI/ML model for training and inference may largely overlap, however, these types of information refer to different concepts. The input data is called training data and has a known label or result.

Supervised learning is an ML task that aims to learn a mapping function from the input to the output, given a labeled data set. Examples of supervised learning include regression algorithms (e.g., Linear Regression, Logistic Regression), and the like), instance-based algorithms (e.g., k-nearest neighbor, and the like), Decision Tree Algorithms (e.g., Classification And Regression Tree (CART), Iterative Dichotomiser 3 (ID3), C4.5, chi-square automatic interaction detection (CHAID), and/or the like), Fuzzy Decision Tree (FDT), and the like), Support Vector Machines (SVM), Bayesian Algorithms (e.g., Bayesian network (BN), a dynamic BN (DBN), Naive Bayes, and the like), and Ensemble Algorithms (e.g., Extreme Gradient Boosting, voting ensemble, bootstrap aggregating ("bagging"), Random Forest and the like). Supervised learning can be further grouped into Regression and Classification problems. Classification is about predicting a label whereas Regression is about predicting a quantity. For unsupervised learning, Input data is not labeled and does not have a known result. Unsupervised learning is an ML task that aims to learn a function to describe a hidden structure from unlabeled data. Some examples of unsupervised learning are K-means clustering and principal component analysis (PCA). Neural networks (NNs) are usually used for supervised learning, but can be used for unsupervised learning as well. Examples of NNs include deep NN (DNN), feed forward NN (FFN), a deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), and/or the like), deep stacking network (DSN), Reinforcement learning (RL) is a goal-oriented learning based on interaction with environment. In RL, an agent aims to optimize a long-term objective by interacting with the environment based on a trial and error process. Examples of RL algorithms include Markov decision process, Markov chain, Q-learning, multi-armed bandit learning, and deep RL.

In one example, the ML/AI techniques are used for object tracking. The object tracking and/or computer vision techniques may include, for example, edge detection, corner detection, blob detection, a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), and/or the like), a deep learning object detection technique (e.g., fully convolutional neural network (FCNN), region proposal convolution neural network (R-CNN), single shot multibox detector, 'you only look once' (YOLO) algorithm, and/or the like), and/or the like.

In another example, the ML/AI techniques are used for motion detection based on the y sensor data obtained from the one or more sensors. Additionally or alternatively, the ML/AI techniques are used for object detection and/or classification. The object detection or recognition models may include an enrollment phase and an evaluation phase. During the enrollment phase, one or more features are extracted from the sensor data (e.g., image or video data). A feature is an individual measurable property or characteristic. In the context of object detection, an object feature may include an object size, color, shape, relationship to other objects, and/or any region or portion of an image, such as edges, ridges, corners, blobs, and/or some defined regions of interest (ROI), and/or the like. The features used may be implementation specific, and may be based on, for example, the objects to be detected and the model(s) to be developed and/or used. The evaluation phase involves identifying or classifying objects by comparing obtained image data with existing object models created during the enrollment phase. During the evaluation phase, features extracted from the image data are compared to the object identification models using a suitable pattern recognition technique. The object models may be qualitative or functional descriptions, geometric surface information, and/or abstract feature vectors, and may be stored in a suitable database that is organized using some type of indexing scheme to facilitate elimination of unlikely object candidates from consideration.

Any suitable data fusion or data integration technique(s) may be used to generate the composite information. For example, the data fusion technique may be a direct fusion technique or an indirect fusion technique. Direct fusion combines data acquired directly from multiple vUEs or sensors, which may be the same or similar (e.g., all vUEs or sensors perform the same type of measurement) or different (e.g., different vUE or sensor types, historical data, and/or the like). Indirect fusion utilizes historical data and/or known properties of the environment and/or human inputs to produce a refined data set. Additionally, the data fusion technique may include one or more fusion algorithms, such as a smoothing algorithm (e.g., estimating a value using multiple measurements in real-time or not in real-time), a filtering algorithm (e.g., estimating an entity's state with current and past measurements in real-time), and/or a prediction state estimation algorithm (e.g., analyzing historical data (e.g., geolocation, speed, direction, and signal measurements) in real-time to predict a state (e.g., a future signal strength/quality at a particular geolocation coordinate)). As examples, the data fusion algorithm may be or include a structured-based algorithm (e.g., tree-based (e.g., Minimum Spanning Tree (MST)), cluster-based, grid and/or centralized-based), a structure-free data fusion algorithm, a Kalman filter algorithm and/or Extended Kalman Filtering, a fuzzy-based data fusion algorithm, an Ant Colony Optimization (ACO) algorithm, a fault detection algorithm, a Dempster- Shafer (D-S) argumentation-based algorithm, a Gaussian Mixture Model algorithm, a triangulation based fusion algorithm, and/or any other like data fusion algorithm A local perception function (which may or may not include trajectory prediction application(s)) 602, 702, and 802 is provided by the local processing of information collected by local sensor(s) associated to the system element. The local perception (and trajectory prediction) function 602, 702, and 802 consumes the output of the sensor data fusion application/function 604, 704, and 804 and feeds ITS-S applications with the perception data (and/or trajectory predictions). The local perception (and trajectory prediction) function 602, 702, and 802 detects and characterize objects (static and mobile) which are likely to cross the trajectory of the considered moving objects. The infrastructure, and particularly the road infrastructure 800, may offer services relevant to the VRU support service. The infrastructure may have its own sensors detecting VRUs 116/117 evolutions and then computing a risk of collision if also detecting local vehicles' evolutions, either directly via its own sensors or remotely via a cooperative perception supporting services such as the CPS (see e.g., ETSI TR 103 562). Additionally, road marking (e.g., zebra areas or crosswalks) and vertical signs may be considered to increase the confidence level associated with the VRU detection and mobility since VRUs 116/117 usually have to respect these marking/signs.

The motion dynamic prediction function 603 and 703, and the mobile objects trajectory prediction 803 (at the RSU level), are related to the behavior prediction of the considered moving objects. The motion dynamic prediction function 603 and 703 predict the trajectory of the vehicle 110 and the VRU 116, respectively. The motion dynamic prediction function 603 may be part of the VRU Trajectory and Behavioral Modeling module and trajectory interception module of the V-ITS-S 110. The motion dynamic prediction function 703 may be part of the dead reckoning module and/or the movement detection module of the VRU ITS-S 117. Alternatively, the motion dynamic prediction functions 603 and 703 may provide motion/movement predictions to the aforementioned modules. Additionally or alternatively, the mobile objects trajectory prediction 803 predict respective trajectories of corresponding vehicles 110 and VRUs 116, which may be used to assist the VRU ITS-S 117 in performing dead reckoning and/or assist the V-ITS-S 110 with VRU Trajectory and Behavioral Modeling entity.

Motion dynamic prediction includes a moving object trajectory resulting from evolution of the successive mobile positions. A change of the moving object trajectory or of the moving object velocity (acceleration/deceleration) impacts the motion dynamic prediction. In most cases, when VRUs 116/117 are moving, they still have a large amount of possible motion dynamics in terms of possible trajectories and velocities. This means that motion dynamic prediction 603, 703, 803 is used to identify which motion dynamic will be selected by the VRU 116 as quickly as possible, and if this selected motion dynamic is subject to a risk of collision with another VRU or a vehicle.

The motion dynamic prediction functions 603, 703, 803 analyze the evolution of mobile objects and the potential trajectories that may meet at a given time to determine a risk of collision between them. The motion dynamic prediction works on the output of cooperative perception considering the current trajectories of considered device (e.g., VRU device 117) for the computation of the path prediction; the current velocities and their past evolutions for the considered mobiles for the computation of the velocity evolution prediction; and the reliability level which can be associated to these variables. The output of this function is provided to the risk analysis function (see e.g., FIG. 2).

In many cases, working only on the output of the cooperative perception is not sufficient to make a reliable prediction because of the uncertainty which exists in terms of VRU trajectory selection and its velocity. However, complementary functions may assist in increasing consistently the reliability of the prediction. For example, the use of the device (e.g., VRU device 117) navigation system, which provides assistance to the user (e.g., VRU 116) to select the best trajectory for reaching its planned destination. With the development of Mobility as a Service (MaaS), multimodal itinerary computation may also indicate to the VRU 116 dangerous areas and then assist to the motion dynamic prediction at the level of the multimodal itinerary provided by the system. In another example, the knowledge of the user (e.g., VRU 116) habits and behaviors may be additionally or alternatively used to improve the consistency and the reliability of the motion predictions. Some users (e.g., VRUs 116/117) follow the same itineraries, using similar motion dynamics, for example when going to the main Point of Interest (POI), which is related to their main activities (e.g., going to school, going to work, doing some shopping, going to the nearest public transport station from their home, going to sport center, and/or the like). The device (e.g., VRU device 117) or a remote service center may learn and memorize these habits. In another example, the indication by the user (e.g., VRU 116) itself of its selected trajectory in particular when changing it (e.g., using a right turn or left turn signal similar to vehicles when indicating a change of direction).

The vehicle motion control 608 may be included for computer-assisted and/or automated vehicles 110. Both the HMI entity 606 and vehicle motion control entity 608 may be triggered by one or more ITS-S applications. The vehicle motion control entity 608 may be a function under the responsibility of a human driver or of the vehicle if it is able to drive in automated mode.

The Human Machine Interface (HMI) 606, 706, and 806, when present, enables the configuration of initial data (parameters) in the management entities (e.g., VRU profile management) and in other functions (e.g., VBS management). The HMI 606, 706, and 806 enables communication of external events related to the VBS to the device owner (user), including the alerting about an immediate risk of collision (TTC<2 s) detected by at least one element of the system and signaling a risk of collision (e.g., TTC>2 seconds) being detected by at least one element of the system. For a VRU system 117 (e.g., personal computing system 700), similar to a vehicle driver, the HMI provides the information to the VRU 116, considering its profile (e.g., for a blind person, the information is presented with a clear sound level using accessibility capabilities of the particular platform of the personal computing system 700). In various implementations, the HMI 606, 706, and 806 may be part of the alerting system.

The connected systems 607, 707, and 807 refer to components/devices used to connect a system with one or more other systems. As examples, the connected systems 607, 707, and 807 may include communication circuitry and/or radio units. The VRU system 700 may be a connected system made of up to 4 different levels of equipment. The VRU system 700 may also be an information system which collects, in real time, information resulting from events, processes the collected information and stores them together with processed results. At each level of the VRU system 700, the information collection, processing and storage is related to the functional and data distribution scenario which is implemented.

5. Computer-Assisted and Autonomous Driving Platforms and Technologies

Except for the UVCS technology of the present disclosure, in-vehicle system 101 and CA/AD vehicle 110 otherwise may be any one of a number of in-vehicle systems and CA/AD vehicles, from computer-assisted to partially or fully autonomous vehicles. Additionally, the in-vehicle system 101 and CA/AD vehicle 110 may include other components/subsystems not shown by FIG. 1 such as the elements shown and described elsewhere herein (see e.g., FIG. 12). These and other aspects of the underlying UVCS technology used to implement in-vehicle system 101 will be further described with references to remaining FIGS. 9-11.

Figure 9:
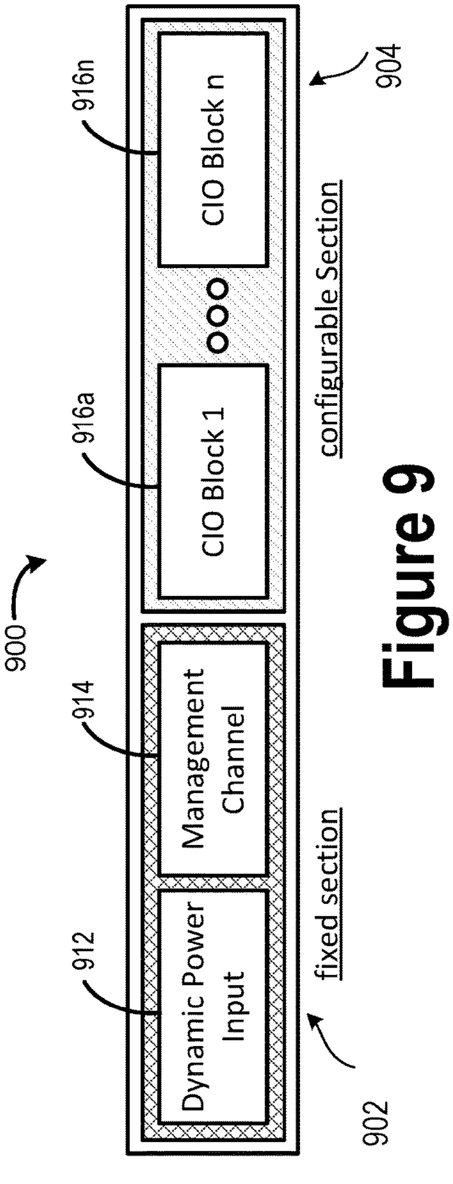
FIG. 9 illustrates an Upgradeable Vehicular Compute Systems (UVCS) interface.

FIG. 9 illustrates a UVCS interface 900. UVCS interface 900 is a modular system interface designed to couple a pluggable compute module (having compute elements such as CPU, memory, storage, radios, and/or the like) to an in-vehicle compute hub or subsystem (having peripheral components, such as power supplies, management, I/O devices, automotive interfaces, thermal solution, and/or the like) pre-disposed in a vehicle to form an instance of a UVCS for the vehicle. Different pluggable compute modules having different compute elements, or compute elements of different functionalities or capabilities, may be employed to mate with an in-vehicle compute hub/subsystem pre-disposed in the vehicle, forming different instances of UVCS. Accordingly, the computing capability of a vehicle having a pre-disposed in-vehicle compute hub/subsystem may be upgraded by having a newer, more function or more capable pluggable compute module be mated with the pre-disposed in-vehicle compute hub/subsystem, replacing a prior older, less function or less capable pluggable compute module.

In the example of FIG. 9, UVCS 900 includes a fixed section 902 and a configurable section 904. Fixed section 902 includes a dynamic power input interface 912 (also referred to as dynamic power delivery interface), and a management channel interface 914. Configuration section 904 includes a number of configurable I/O (CIO) blocks 916*a*-916*n*.

Dynamic power input interface 912 is arranged to deliver power from the in-vehicle compute hub/subsystem to the compute elements of a pluggable compute module plugged into UVCS interface 900 to mate with the in-vehicle compute hub to form an instance of an UVCS. Management channel interface 914 is arranged to facilitate the in-vehicle compute hub in managing/coordinating the operations of itself and the pluggable compute module plugged into UVCS interface 900 to form the instance of an UVCS. CIO blocks 916*a*-916*n* are arranged to facilitate various I/O between various compute elements of the pluggable compute module and the peripheral components of the in-vehicle compute hub/subsystem mated to each other through UVCS interface 900 to form the instance of an UVCS. The I/O between the compute elements of the pluggable compute module and the peripheral components of the mated in-vehicle compute hub/subsystem vary from instance to instance, depending on the compute elements of the pluggable compute module used to mate with the in-vehicle compute hub to form a particular instance of the UVCS. At least some of CIO blocks 916*a*-916*a* are arranged to facilitate high-speed interfaces.

The CIO blocks 916*a*-916*n* represent a set of electrically similar high speed, differential serial interfaces, allowing a configuration of the actually used interface type and standard on a case-by-case basis. This way, different UVCS compute hubs can connect different peripherals to the same UVCS interface 900, and allow the different peripherals to perform I/O operations in different I/O protocols with compute elements of a UVCS module.

The number of CIO blocks 916*a*-916*n* may vary depending on the particular use case and/or for different market segments. For example, there may be few CIO blocks 916*a*-916*n* (e.g., 2 to 4) for implementations designed for the lower end markets. On the other hand, there may be many more CIO blocks 916-916*n* (e.g., 8 to 16) for implementations designed for the higher end markets. However, to achieve the highest possible interoperability and upgradeability, for a given UVCS generation, the number and functionality/configurability of the number of CIO blocks may be kept the same.

Figure 10:
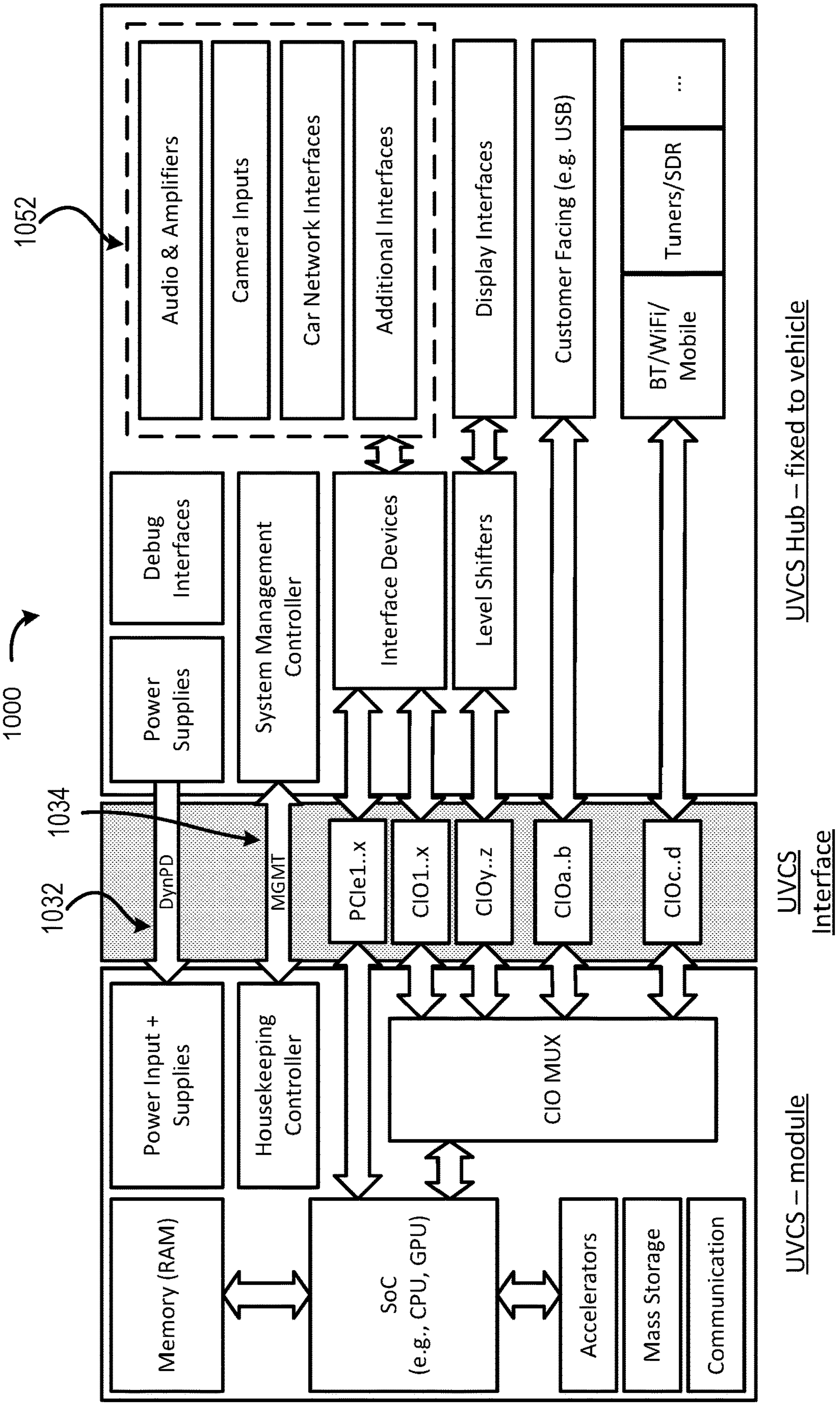
FIG. 10 illustrates a UVCS formed using a UVCS interface.

FIG. 10 illustrates an example UVCS 1000 formed using a UVCS interface. As shown, UVCS interface, which may be UVCS interface 900, is used to facilitate mating of pluggable UVCS module with UVCS hub pre-disposed in a vehicle, to form UVCS 1000 for the vehicle, which may be one of the one or more UVCS of in-vehicle system PT100 of FIG. PT1. UVCS interface, as UVCS interface 900, includes a fixed section and a configurable section. The fixed section includes a dynamic power delivery interface (DynPD) 1032 and a management channel (MGMT) interface 1034. The configurable section includes a number of configurable I/O interfaces (CIOs), PCIe1 . . . x, CIO1 . . . x, CIOy . . . z, CIOa . . . b, CIOc . . . d.

Pre-disposed UVCS hub includes power supplies and system management controller. Further, UVCS hub includes debug interfaces 1044, interface devices, level shifters, and a number of peripheral components 1052, such as audio and amplifiers, camera interface, car network interfaces, other interfaces, display interfaces, customer facing interfaces (e.g., a USB interface), and communication interfaces (e.g., Bluetooth®\BLE, WiFi, other mobile interfaces, tuners, software define radio (SDR)), coupled to power supplies, system management controller, and each other as shown. Additionally or alternatively, UVCS hub may include more or less, or different peripheral elements.

Pluggable UVCS module 1006 includes an SoC (e.g., CPU, GPU, FPGA, or other circuitry), memory, power input+supplies circuitry, housekeeping controller and CIO multiplexer(s) (MUX). Further, UVCS module includes hardware accelerators, persistent mass storage, and communication modules (e.g., BT, WiFi, 5G/NR, LTE, and/or other like interfaces), coupled to the earlier enumerated elements and each other as shown. Additionally or alternatively, UVCS module may include more or less, or different compute elements.

Power Supplies of UVCS hub delivers power to compute elements of UVCS module, via DynPD 1032 of UVCS interface and Power Input+Supplies circuitry of UVCS module. System management controller of UVCS hub manages and coordinates its operations and the operations of the compute elements of UVCS module via the management channel 1034 of UVCS interface and housekeeping controller of UVCS module. CIO MUX is configurable or operable to provide a plurality of I/O channels of different I/O protocols between the compute elements of UVCS module and the peripheral components of UVCS hub, via the configurable I/O blocks of UVCS interface, interface devices and level shifters of UVCS hub. For example, one of the I/O channels may provide for I/O between the compute elements of UVCS module and the peripheral components of UVCS hub in accordance with PCIe I/O protocol. Another I/O channel may provide for I/O between the compute elements of UVCS module and the peripheral components of UVCS hub in accordance with USB I/O protocol. Still other I/O channels provide for I/O between the compute elements of UVCS module and the peripheral components of UVCS hub in accordance with other high speed serial or parallel I/O protocols.

Housekeeping controller is configurable or operable to control power supply in its delivery of power to static and dynamic loads, as well as the consumption of power by static and dynamic loads, based on the operating context of the vehicle (e.g., whether the vehicle is in a "cold crank" or "cold start" scenario). Housekeeping controller is configurable or operable to control power consumption of static and dynamic loads by selectively initiating sleep states, lowering clock frequencies, or powering off the static and dynamic loads.

Management channel 1034 may be a small low pin count serial interface, a Universal Asynchronous Receiver-Transmitter (UART) interface, a Universal Synchronous and Asynchronous Receiver-Transmitter (USART) interface, a USB interface, or some other suitable interface (including any of the other IX technologies discussed herein). Additionally or alternatively, management channel may be a parallel interface such as an IEEE 1284 interface.

CIO blocks of UVCS interface represent a set of electrically similar high speed interfaces (e.g., high speed differential serial interfaces) allowing a configuration of the actually used interface type and standard on a case-by-case basis. In particular, housekeeping controller is arranged to configure CIO MUX to provide a plurality of I/O channels through the various CIO blocks to facilitate I/O operations in different I/O protocols. Additionally or alternatively, the plurality of I/O channels include a USB I/O channel, a PCIe I/O channel, a HDMI and DP (DDI) I/O channel, and a Thunderbolt (TBT) I/O channel. The plurality of I/O channels may also include other I/O channel types (xyz [1 . . . r]) beside the enumerated I/O channel types.

Additionally or alternatively, CIO multiplexer comprises sufficient circuit paths to be configurable to multiplex any given combination of I/O interfaces exposed by the SoC to any of the connected CIO blocks. Additionally or alternatively, CIO MUX may support a limited multiplexing scheme, such as when the CIO blocks support a limited number of I/O protocols (e.g., supporting display interfaces and Thunderbolt, while not offering PCIe support). In some implementations, the CIO MUX may be integrated as part of the SoC.

System management controller of UVCS hub and housekeeping controller of UVCS module are configurable or operable to negotiate, during an initial pairing of the UVCS hub and UVCS module a power budget or contract. Additionally or alternatively, the power budget/contract may provide for minimum and maximum voltages, current/power needs of UVCS module and the current power delivery limitation of UVCS interface, if any. This allows for the assessments of the compatibility of a given pair of UCS hub and module, as well as for operational benefits.

Figure 11:
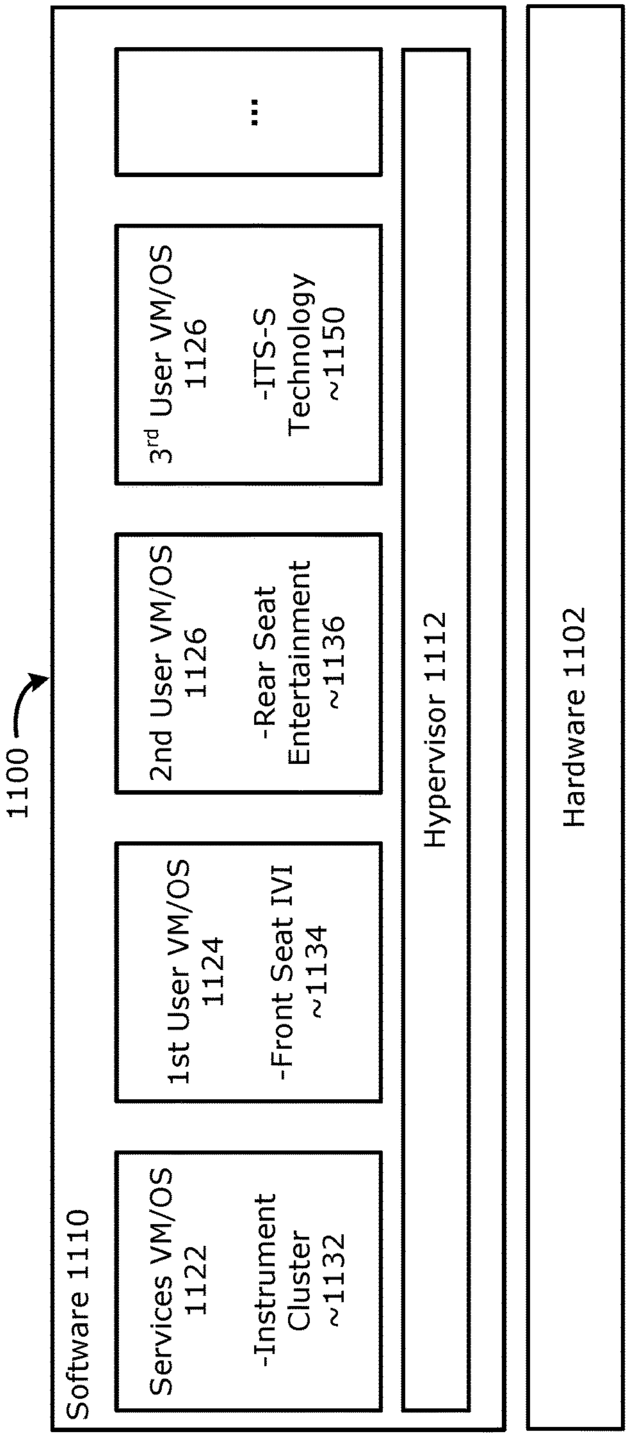
FIG. 11 shows a software component view of an in-vehicle system formed with a UVCS.

FIG. 11 shows a software component view of an example in-vehicle system formed with a UVCS. As shown, in-vehicle system 1100, which could be formed with UVCS 1000, includes hardware 1102 and software 1110. Software 1110 includes hypervisor 1112 hosting a number of virtual machines (VMs) 1122-1128. Hypervisor 1112 is configurable or operable to host execution of VMs 1122-1128. Hypervisor 1112 may also implement some or all of the functions described earlier for a system management controller of a UVCS module. As examples, hypervisor 1112 may be a KVM hypervisor, Xen provided by Citrix Inc., VMware provided by VMware Inc., and/or any other suitable hypervisor or VM manager (VMM) technologies such as those discussed herein. The VMs 1122-1128 include a service VM 1122 and a number of user VMs 1124-1128. Service machine 1122 includes a service OS hosting execution of a number of instrument cluster applications 1132. As examples, service OS of service VM 1122 and user OS of user VMs 1124-1128 may be Linux, available e.g., from Red Hat Enterprise of Raleigh, NC, Android, available from Google of Mountain View, CA, and/or any other suitable OS such as those discussed herein.

User VMs 1124-1128 may include a first user VM 1124 having a first user OS hosting execution of front seat infotainment applications 1134, a second user VM 1126 having a second user OS hosting execution of rear seat infotainment applications 1136, a third user VM 1128 having a third user OS hosting execution of ITS-S subsystem 1150, and/or any other suitable OS/applications such as those discussed herein. In some implementations, the VMs 1122-1126 may be, or may include isolated user-space instances such as containers, partitions, virtual environments (VEs), and/or the like, which may be implemented using a suitable OS-level virtualization technology.

6. Computing System and Hardware Configurations

Figure 12:
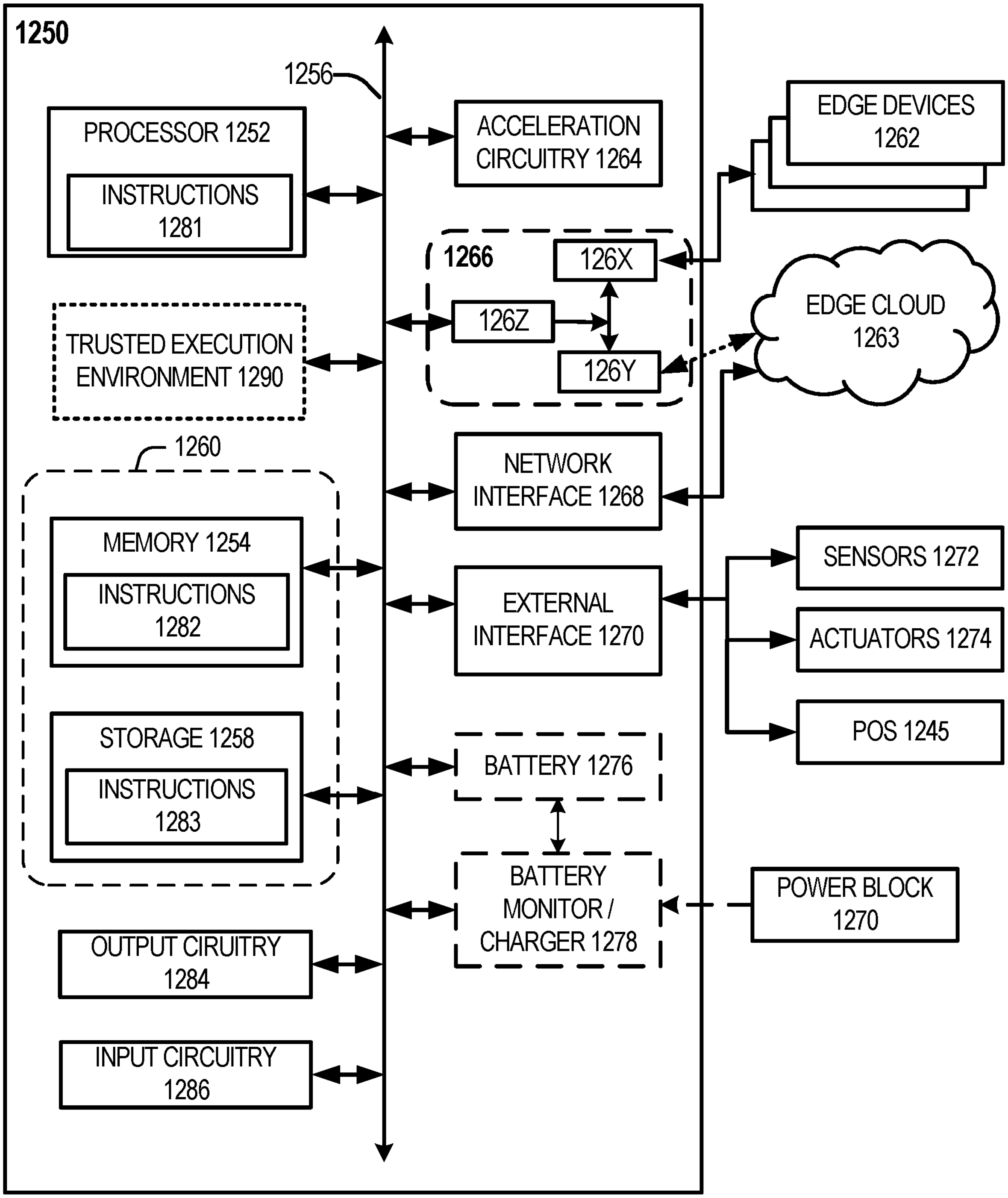
FIG. 12 depict components of various compute nodes in edge computing system(s).

FIG. 12 depicts an example edge computing systems and environments that may fulfill any of the compute nodes or devices discussed herein. The edge compute node 1250 may be embodied as a type of device, appliance, computer, or other "thing" capable of communicating with other edge, networking, or endpoint components. For example, an edge compute device 1250 may be embodied as a smartphone, a mobile compute device, a smart appliance, an in-vehicle compute system (e.g., a navigation system), or other device or system capable of performing the described functions.

FIG. 12 illustrates an example of components that may be present in an edge computing node 1250 for implementing the techniques (e.g., operations, processes, methods, and methodologies) described herein. This edge computing node 1250 provides a closer view of the respective components of node 1250 when implemented as or as part of a computing device (e.g., as a mobile device, a base station, server, gateway, infrastructure equipment, road side unit (RSU) or R-ITS-S 130, radio head, relay station, server, and/or any other element/device discussed herein). The edge computing node 1250 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 1250, or as components otherwise incorporated within a chassis of a larger system.

The edge computing node 1250 includes processing circuitry in the form of one or more processors 1252. The processor circuitry 1252 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1252 may include one or more hardware accelerators (e.g., same or similar to acceleration circuitry 1264), which may be microprocessors, programmable processing devices (e.g., FPGA, ASIC, and/or the like), or the like. The one or more accelerators may include, for example, computer vision and/or deep learning accelerators. In some implementations, the processor circuitry 1252 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1252 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 1252 may be coupled with or may include memory/storage and may be configured to execute instructions stored in the memory/storage to enable various applications or operating systems to run on the node 1250. The processors (or cores) 1252 is configured to operate application software to provide a specific service to a user of the node 1250. Additionally or alternatively, the processor(s) 1252 may be a special-purpose processor(s)/controller(s) configured (or configurable) to operate according to the discussion in sections 1-4 supra.

The processor(s) 1252 may communicate with system memory 1254 over an interconnect (IX) 1256. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1258 may also couple to the processor 1252 via the IX 1256. In an example, the storage 1258 may be implemented via a solid-state disk drive (SSDD) and/or high-speed electrically erasable memory (commonly referred to as "flash memory"). Other devices that may be used for the storage 1258 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1254 and/or storage circuitry 1258 may also incorporate three-dimensional (3D) cross-point (XPOINT) memories from Intel® and Micron®.

In low power implementations, the storage 1258 may be on-die memory or registers associated with the processor 1252. However, in some examples, the storage 1258 may be implemented using a micro hard disk drive (HDD). Further, any number of new technologies may be used for the storage 1258 in addition to, or instead of, the technologies described, such resistance change memories, phase change memories, holographic memories, or chemical memories, among others.

The storage circuitry 1258 store computational logic 1282 (or "modules 1282") in the form of software, firmware, or hardware commands to implement the techniques described herein. The computational logic 1282 may be employed to store working copies and/or permanent copies of computer programs, or data to create the computer programs, for the operation of various components of node 1250 (e.g., drivers, and/or the like), an OS of node 1250 and/or one or more applications for carrying out the functionality discussed herein. The computational logic 1282 may be stored or loaded into memory circuitry 1254 as instructions 1282, or data to create the instructions 1288, for execution by the processor circuitry 1252 to provide the functions described herein. The various elements may be implemented by assembler instructions supported by processor circuitry 1252 or high-level languages that may be compiled into such instructions (e.g., instructions 1288, or data to create the instructions 1288). The permanent copy of the programming instructions may be placed into persistent storage devices of storage circuitry 1258 in the factory or in the field through, for example, a distribution medium (not shown), through a communication interface (e.g., from a distribution server (not shown)), or over-the-air (OTA).

In an example, the instructions 1283, 1282 provided via the memory circuitry 1254 and/or the storage circuitry 1258 of FIG. 12 are embodied as one or more non-transitory computer readable storage media (see e.g., NTCRSM 1260) including program code, a computer program product or data to create the computer program, with the computer program or data, to direct the processor circuitry 1252 of node 1250 to perform electronic operations in the node 1250, and/or to perform a specific sequence or flow of actions, for example, as described with respect to the flowchart(s) and block diagram(s) of operations and functionality depicted previously. The processor circuitry 1252 accesses the one or more non-transitory computer readable storage media over the interconnect 1256.

Additionally or alternatively, programming instructions (or data to create the instructions) may be disposed on multiple NTCRSM 1260. Additionally or alternatively, the programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1260 may be embodied by devices described for the storage circuitry 1258 and/or memory circuitry 1254. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, and/or the like), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, and/or the like.

The program code (or data to create the program code) described herein may be stored in one or more of a compressed format, an encrypted format, a fragmented format, a packaged format, and/or the like. Program code (or data to create the program code) as described herein may require one or more of installation, modification, adaptation, updating, combining, supplementing, configuring, decryption, decompression, unpacking, distribution, reassignment, and/or the like in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), and/or the like in order to execute the instructions on a particular computing device or other device. In another example, the program code (or data to create the program code) may need to be configured (e.g., settings stored, data input, network addresses recorded, and/or the like) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1283, instructions 1282, instructions 1281 discussed previously) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1250, partly on the system 1250, as a stand-alone software package, partly on the system 1250 and partly on a remote computer or entirely on the remote computer or server. In the latter scenario, the remote computer may be connected to the system 1250 through any type of network, including a LAN or WAN, or the connection may be made to an external computer (e.g., through the Internet using an Internet Service Provider).

In an example, the instructions 1281 on the processor circuitry 1252 (separately, or in combination with the instructions 1282 and/or logic/modules 1283 stored in computer-readable storage media) may configure execution or operation of a trusted execution environment (TEE) 1290. The TEE 1290 operates as a protected area accessible to the processor circuitry 1252 to enable secure access to data and secure execution of instructions. The TEE 1290 may be a physical hardware device that is separate from other components of the system 1250 such as a secure-embedded controller, a dedicated SoC, or a tamper-resistant chipset or microcontroller with embedded processing devices and memory devices.

The TEE 1290 may be implemented as secure enclaves, which are isolated regions of code and/or data within the processor and/or memory/storage circuitry of the system 1250. Only code executed within a secure enclave may access data within the same secure enclave, and the secure enclave may only be accessible using the secure application (which may be implemented by an application processor or a tamper-resistant microcontroller). Various implementations of the TEE 1250, and an accompanying secure area in the processor circuitry 1252 or the memory circuitry 1254 and/or storage circuitry 1258 may be provided Other aspects of security hardening, hardware roots-of-trust, and trusted or protected operations may be implemented in the device 1250 through the TEE 1290 and the processor circuitry 1252.

Additionally or alternatively, the memory circuitry 1254 and/or storage circuitry 1258 may be divided into isolated user-space instances such as containers, partitions, virtual environments (VEs), and/or the like. The isolated user-space instances may be implemented using a suitable OS-level virtualization technology such as containers, zones, virtual private servers, virtual kernels and/or jails, chroot jails, and/or the like. Virtual machines could also be used in some implementations. Additionally or alternatively, the memory circuitry 1254 and/or storage circuitry 1258 may be divided into one or more trusted memory regions for storing applications or software modules of the TEE 1290.

Although the instructions 1282 are shown as code blocks included in the memory circuitry 1254 and the computational logic 1283 is shown as code blocks in the storage circuitry 1258, it should be understood that any of the code blocks may be replaced with hardwired circuits, for example, built into an FPGA, ASIC, or some other suitable circuitry. For example, where processor circuitry 1252 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1254 and/or storage circuitry 1258 may store program code of an operating system (OS), which may be a general purpose OS or an OS specifically written for and tailored to the computing node 1250. For example, the OS may be desktop OS, a netbook OS, a vehicle OS, a mobile OS, a real-time OS (RTOS), and/or some other suitable OS, such as those discussed herein.

The OS may include one or more drivers that operate to control particular devices that are embedded in the node 1250, attached to the node 1250, or otherwise communicatively coupled with the node 1250. The drivers may include individual drivers allowing other components of the node 1250 to interact or control various I/O devices that may be present within, or connected to, the node 1250. For example, the drivers may include a display driver to control and allow access to a display device, a touchscreen driver to control and allow access to a touchscreen interface of the node 1250, sensor drivers to obtain sensor readings of sensor circuitry 1272 and control and allow access to sensor circuitry 1272, actuator drivers to obtain actuator positions of the actuators 1274 and/or control and allow access to the actuators 1274, a camera driver to control and allow access to an embedded image capture device, audio drivers to control and allow access to one or more audio devices. The OSs may also include one or more libraries, drivers, APIs, firmware, middleware, software glue, and/or the like, which provide program code and/or software components for one or more applications to obtain and use the data from a secure execution environment, trusted execution environment, and/or management engine of the node 1250 (not shown).

The components of edge computing device 1250 may communicate over the IX 1256. The IX 1256 may include any number of bus and/or interconnect (IX) technologies such as industry standard architecture (ISA), extended ISA (EISA), inter-integrated circuit (I2C), an serial peripheral interface (SPI), point-to-point interfaces, power management bus (PMBus), peripheral component interconnect (PCI), PCI express (PCIe), Ultra Path Interface (UPI), Accelerator Link (IAL), Common Application Programming Interface (CAPI), QuickPath interconnect (QPI), Ultra Path Interconnect (UPI), Omni-Path Architecture (OPA) IX, RapidIO system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

The IX 1256 couples the processor 1252 to communication circuitry 1266 for communications with other devices, such as a remote server (not shown) and/or the connected edge devices 1262. The communication circuitry 1266 is a hardware element, or collection of hardware elements, used to communicate over one or more networks (e.g., cloud 1263) and/or with other devices (e.g., edge devices 1262). The modem circuitry 126Z may convert data for transmission over-the-air using one or more radios 126X and 126Y, and may convert receive signals from the radios 126X and 126Y into digital signals/data for consumption by other elements of the system 1250.

The transceiver 1266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios 126X and 126Y (or "RAT circuitries 126X and 126Y"), configured for a particular wireless communication protocol, may be used for the connections to the connected edge devices 1262. For example, wireless local area network (WLAN) circuitry 126X may be used to implement WiFi® communications in accordance with the Institute of Electrical and Electronics Engineers (IEEE) 802.11 standard. In addition, wireless wide area communications (e.g., according to a cellular or other wireless wide area protocol) may occur via wireless wide area network (WWAN) circuitry 126Y.

The wireless network transceiver 1266 (or multiple transceivers) may communicate using multiple standards or radios for communications at a different range. For example, the edge computing node 1250 may communicate with close devices, e.g., within about 10 meters, using a local transceiver based on BLE, or another low power radio, to save power. More distant connected edge devices 1262, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1266 (e.g., a radio transceiver) may be included to communicate with devices or services in the edge cloud 1263 via local or wide area network protocols. The wireless network transceiver 1266 may be an LPWA transceiver that follows the IEEE 802.15.4, or IEEE 802.15.4g standards, among others. The edge computing node 1263 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1266, as described herein. For example, the transceiver 1266 may include a cellular transceiver that uses spread spectrum (SPA/SAS) communications for implementing high-speed communications. Further, any number of other protocols may be used, such as WiFi® networks for medium speed communications and provision of network communications. The transceiver 1266 may include radios 126X and 126Y that are compatible with any number of 3GPP specifications, such as LTE and 5G/NR communication systems, discussed in further detail at the end of the present disclosure. A network interface controller (NIC) 1268 may be included to provide a wired communication to nodes of the edge cloud 1263 or to other devices, such as the connected edge devices 1262 (e.g., operating in a mesh). The wired communication may provide an Ethernet connection or may be based on other types of networks, such as Controller Area Network (CAN), Local Interconnect Network (LIN), DeviceNet, ControlNet, Data Highway Plus (DH+), PROFIBUS, or PROFINET, among many others. An additional NIC 1268 may be included to enable connecting to a second network, for example, a first NIC 1268 providing communications to the cloud over Ethernet, and a second NIC 1268 providing communications to other devices over another type of network.

Given the variety of types of applicable communications from the device to another component or network, applicable communications circuitry used by the device may include or be embodied by any one or more of components 1264, 1266, 1268, or 1270. Accordingly, in various examples, applicable means for communicating (e.g., receiving, transmitting, and/or the like) may be embodied by such communications circuitry.

The edge computing node 1250 may include or be coupled to acceleration circuitry 1264, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1264 may comprise logic blocks or logic fabric and other interconnected resources that may be programmed (configured) to perform various functions, such as the procedures, methods, functions, and/or the like as discussed in section 1-4 supra. In such implementations, the acceleration circuitry 1264 may also include memory cells (e.g., EPROM, EEPROM, flash memory, static memory (e.g., SRAM, antifuses, and/or the like) used to store logic blocks, logic fabric, data, and/or the like in LUTs and the like.

The IX 1256 also couples the processor 1252 to a sensor hub or external interface 1270 that is used to connect additional devices or subsystems. The additional/external devices may include sensors 1272, actuators 1274, and positioning circuitry 1245.

The sensor circuitry 1272 includes devices, modules, or subsystems whose purpose is to detect events or changes in its environment and send the information (sensor data) about the detected events to some other a device, module, subsystem, and/or the like. Examples of such sensors 1272 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temp sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

Additionally or alternatively, some of the sensors 172 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data (e.g., tire pressure data); catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; drive train sensors to collect drive train sensor data (e.g., transmission fluid level), vehicle body sensors to collect vehicle body data (e.g., data associated with buckling of the front grill/fenders, side doors, rear fenders, rear trunk, and so forth); and so forth. The sensors 172 may include other sensors such as an accelerator pedal position sensor (APP), accelerometers, magnetometers, level sensors, flow/fluid sensors, barometric pressure sensors, and/or any other sensor(s) such as those discussed herein. Sensor data from sensors 172 of the host vehicle may include engine sensor data collected by various engine sensors (e.g., engine temperature, oil pressure, and so forth).

The actuators 1274, allow node 1250 to change its state, position, and/or orientation, or move or control a mechanism or system. The actuators 1274 comprise electrical and/or mechanical devices for moving or controlling a mechanism or system, and converts energy (e.g., electric current or moving air and/or liquid) into some kind of motion. The actuators 1274 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1274 may include one or more electro-mechanical devices such as pneumatic actuators, hydraulic actuators, electromechanical switches including electromechanical relays (EMRs), motors (e.g., DC motors, stepper motors, servomechanisms, and/or the like), power switches, valve actuators, wheels, thrusters, propellers, claws, clamps, hooks, audible sound generators, visual warning devices, and/or other like electromechanical components. The node 1250 may be configured to operate one or more actuators 1274 based on one or more captured events and/or instructions or control signals received from a service provider and/or various client systems Additionally or alternatively, the actuators 1274 may be driving control units (e.g., DCUs 174 of FIG. 1), Examples of DCUs 1274 include a Drivetrain Control Unit, an Engine Control Unit (ECU), an Engine Control Module (ECM), EEMS, a Powertrain Control Module (PCM), a Transmission Control Module (TCM), a Brake Control Module (BCM) including an anti-lock brake system (ABS) module and/or an electronic stability control (ESC) system, a Central Control Module (CCM), a Central Timing Module (CTM), a General Electronic Module (GEM), a Body Control Module (BCM), a Suspension Control Module (SCM), a Door Control Unit (DCU), a Speed Control Unit (SCU), a Human-Machine Interface (HMI) unit, a Telematic Control Unit (TTU), a Battery Management System, a Portable Emissions Measurement Systems (PEMS), an evasive maneuver assist (EMA) module/system, and/or any other entity or node in a vehicle system. Examples of the CSD that may be generated by the DCUs 174 may include, but are not limited to, real-time calculated engine load values from an engine control module (ECM), such as engine revolutions per minute (RPM) of an engine of the vehicle; fuel injector activation timing data of one or more cylinders and/or one or more injectors of the engine, ignition spark timing data of the one or more cylinders (e.g., an indication of spark events relative to crank angle of the one or more cylinders), transmission gear ratio data and/or transmission state data (which may be supplied to the ECM by a transmission control unit (TCU)); and/or the like.

In vehicular implementations, the actuators/DCUs 1274 may be provisioned with control system configurations (CSCs), which are collections of software modules, software components, logic blocks, parameters, calibrations, variants, and/or the like used to control and/or monitor various systems implemented by node 1250 (e.g., when node 1250 is a CA/AD vehicle 110). The CSCs define how the DCUs 1274 are to interpret sensor data of sensors 1272 and/or CSD of other DCUs 1274 using multidimensional performance maps or lookup tables, and define how actuators/components are to be adjust/modified based on the sensor data. The CSCs and/or the software components to be executed by individual DCUs 1274 may be developed using any suitable object-oriented programming language (e.g., C, C++, Java, and/or the like), schema language (e.g., XML schema, AUTomotive Open System Architecture (AUTOSAR) XML schema, and/or the like), scripting language (VBScript, JavaScript, and/or the like), or the like. the CSCs and software components may be defined using a hardware description language (HDL), such as register-transfer logic (RTL), very high speed integrated circuit (VHSIC) HDL (VHDL), Verilog, and/or the like for DCUs 1274 that are implemented as field-programmable devices (FPDs). The CSCs and software components may be generated using a modeling environment or model-based development tools. Additionally or alternatively, the CSCs may be generated or updated by one or more autonomous software agents and/or AI agents based on learnt experiences, ODDs, and/or other like parameters.

The IVS 101 and/or the DCUs 1274 is configurable or operable to operate one or more actuators based on one or more captured events (as indicated by sensor data captured by sensors 1272) and/or instructions or control signals received from user inputs, signals received over-the-air from a service provider, or the like. Additionally, one or more DCUs 1274 may be configurable or operable to operate one or more actuators by transmitting/sending instructions or control signals to the actuators based on detected events (as indicated by sensor data captured by sensors 1272). One or more DCUs 1274 may be capable of reading or otherwise obtaining sensor data from one or more sensors 1272, processing the sensor data to generate control system data (or CSCs), and providing the control system data to one or more actuators to control various systems of the vehicle 110. An embedded device/system acting as a central controller or hub may also access the control system data for processing using a suitable driver, API, ABI, library, middleware, firmware, and/or the like; and/or the DCUs 1274 may be configurable or operable to provide the control system data to a central hub and/or other devices/components on a periodic or aperiodic basis, and/or when triggered.

The various subsystems, including sensors 1272 and/or DCUs 1274, may be operated and/or controlled by one or more AI agents. The AI agents is/are autonomous entities configurable or operable to observe environmental conditions and determine actions to be taken in furtherance of a particular goal. The particular environmental conditions to be observed and the actions to take may be based on an operational design domain (ODD). An ODD includes the operating conditions under which a given AI agent or feature thereof is specifically designed to function. An ODD may include operational restrictions, such as environmental, geographical, and time-of-day restrictions, and/or the requisite presence or absence of certain traffic or roadway characteristics.

Individual AI agents are configurable or operable to control respective control systems of the host vehicle, some of which may involve the use of one or more DCUs 1274 and/or one or more sensors 1272. The actions to be taken and the particular goals to be achieved may be specific or individualized based on the control system itself. Additionally, some of the actions or goals may be dynamic driving tasks (DDT), object and event detection and response (OEDR) tasks, or other non-vehicle operation related tasks depending on the particular context in which an AI agent is implemented. DDTs include all real-time operational and tactical functions required to operate a vehicle 110 in on-road traffic, excluding the strategic functions (e.g., trip scheduling and selection of destinations and waypoints.

DDTs include tactical and operational tasks such as lateral vehicle motion control via steering (operational); longitudinal vehicle motion control via acceleration and deceleration (operational); monitoring the driving environment via object and event detection, recognition, classification, and response preparation (operational and tactical); object and event response execution (operational and tactical); maneuver planning (tactical); and enhancing conspicuity via lighting, signaling and gesturing, and/or the like (tactical). OEDR tasks may be subtasks of DDTs that include monitoring the driving environment (e.g., detecting, recognizing, and classifying objects and events and preparing to respond as needed) and executing an appropriate response to such objects and events, for example, as needed to complete the DDT or fallback task.

To observe environmental conditions, the AI agents is/are configurable or operable to receive, or monitor for, sensor data from one or more sensors 1272 and receive control system data (CSD) from one or more DCUs 1274 of the host vehicle 110. The act of monitoring may include capturing CSD and/or sensor data from individual sensors 172 and DCUs 1274. Monitoring may include polling (e.g., periodic polling, sequential (roll call) polling, and/or the like) one or more sensors 1272 for sensor data and/or one or more DCUs 1274 for CSD for a specified/selected period of time. Additionally or alternatively, monitoring may include sending a request or command for sensor data/CSD in response to an external request for sensor data/CSD. Additionally or alternatively, monitoring may include waiting for sensor data/CSD from various sensors/modules based on triggers or events, such as when the host vehicle reaches predetermined speeds and/or distances in a predetermined amount of time (with or without intermitted stops). The events/triggers may be AI agent specific, and may vary depending of a particular application, use case, implementation, and/or the like. Additionally or alternatively, the monitoring may be triggered or activated by an application or subsystem of the IVS 101 or by a remote device, such as compute node 140 and/or server(s) 160.

One or more of the AI agents may be configurable or operable to process the sensor data and CSD to identify internal and/or external environmental conditions upon which to act. Examples of the sensor data may include, but are not limited to, image data from one or more cameras of the vehicle providing frontal, rearward, and/or side views looking out of the vehicle; sensor data from accelerometers, inertia measurement units (IMU), and/or gyroscopes of the vehicle providing speed, acceleration, and tilt data of the host vehicle; audio data provided by microphones; and control system sensor data provided by one or more control system sensors. In an example, one or more of the AI agents may be configurable or operable to process images captured by sensors 1272 (image capture devices) and/or assess conditions identified by some other subsystem (e.g., an EMA subsystem, CAS and/or CPS entities, and/or the like) to determine a state or condition of the surrounding area (e.g., existence of potholes, fallen trees/utility poles, damages to road side barriers, vehicle debris, and so forth). In another example, one or more of the AI agents may be configurable or operable to process CSD provided by one or more DCUs 1274 to determine a current amount of emissions or fuel economy of the host vehicle. The AI agents may also be configurable or operable to compare the sensor data and/or CSDs with training set data to determine or contribute to determining environmental conditions for controlling corresponding control systems of the vehicle.

To determine actions to be taken in furtherance of a particular goal, each of the AI agents are configurable or operable to identify a current state of the IVS 101, the host vehicles 110, and/or the AI agent itself, identify or obtain one or more models (e.g., ML models), identify or obtain goal information, and predict a result of taking one or more actions based on the current state/context, the one or more models, and the goal information. The one or more models may be any algorithms or objects created after an AI agent is trained with one or more training datasets, and the one or more models may indicate the possible actions that may be taken based on the current state. The one or more models may be based on the ODD defined for a particular AI agent. The current state is a configuration or set of information in the IVS 101 and/or one or more other systems of the host vehicle 110, or a measure of various conditions in the IVS 101 and/or one or more other systems of the host vehicle 110. The current state is stored inside an AI agent and is maintained in a suitable data structure. The AI agents are configurable or operable to predict possible outcomes as a result of taking certain actions defined by the models. The goal information describes desired outcomes (or goal states) that are desirable given the current state. Each of the AI agents may select an outcome from among the predict possible outcomes that reaches a particular goal state, and provide signals or commands to various other subsystems of the vehicle 110 to perform one or more actions determined to lead to the selected outcome. The AI agents may also include a learning module configurable or operable to learn from an experience with respect to the selected outcome and some performance measure(s). The experience may include sensor data and/or new state data collected after performance of the one or more actions of the selected outcome. The learnt experience may be used to produce new or updated models for determining future actions to take.

The positioning circuitry 1245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and/or the like), or the like. The positioning circuitry 1245 comprises various hardware elements (e.g., including hardware devices such as switches, filters, amplifiers, antenna elements, and the like to facilitate OTA communications) to communicate with components of a positioning network, such as navigation satellite constellation nodes. The positioning circuitry 1245 may include a Micro-Technology for Positioning, Navigation, and Timing (Micro-PNT) IC that uses a master timing clock to perform position tracking/estimation without GNSS assistance. The positioning circuitry 1245 may also be part of, or interact with, the communication circuitry 1266 to communicate with the nodes and components of the positioning network. The positioning circuitry 1245 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1245 is, or includes an INS, which is a system or device that uses sensor circuitry 1272 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the node 1250 without the need for external references.

In some optional examples, various input/output (I/O) devices may be present within or connected to, the edge computing node 1250, which are referred to as input circuitry 1286 and output circuitry 1284 in FIG. 12. The input circuitry 1286 and output circuitry 1284 include one or more user interfaces designed to enable user interaction with the node 1250 and/or peripheral component interfaces designed to enable peripheral component interaction with the node 1250. Input circuitry 1286 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1284 may be included to show information or otherwise convey information, such as sensor readings, actuator position(s), or other like information. Data and/or graphics may be displayed on one or more user interface components of the output circuitry 1284. Output circuitry 1284 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, and/or the like), with the output of characters, graphics, multimedia objects, and the like being generated or produced from the operation of the node 1250. The output circuitry 1284 may also include speakers or other audio emitting devices, printer(s), and/or the like. The sensor circuitry 1272 may be used as the input circuitry 1284 (e.g., an image capture device, motion capture device, or the like) and one or more actuators 1274 may be used as the output device circuitry 1284 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and/or the like. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1276 may power the edge computing node 1250, although, in examples in which the edge computing node 1250 is mounted in a fixed location, it may have a power supply coupled to an electrical grid, or the battery may be used as a backup or for temporary capabilities. The battery 1276 may be a lithium ion battery, or a metal-air battery, such as a zinc-air battery, an aluminum-air battery, a lithium-air battery, and the like.

A battery monitor/charger 1278 may be included in the edge computing node 1250 to track the state of charge (SoCh) of the battery 1276, if included. The battery monitor/charger 1278 may be used to monitor other parameters of the battery 1276 to provide failure predictions, such as the state of health (SoH) and the state of function (SoF) of the battery 1276. The battery monitor/charger 1278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1278 may communicate the information on the battery 1276 to the processor 1252 over the IX 1256. The battery monitor/charger 1278 may also include an analog-to-digital (ADC) converter that enables the processor 1252 to directly monitor the voltage of the battery 1276 or the current flow from the battery 1276. The battery parameters may be used to determine actions that the edge computing node 1250 may perform, such as transmission frequency, mesh network operation, sensing frequency, and the like.

A power block 1280, or other power supply coupled to a grid, may be coupled with the battery monitor/charger 1278 to charge the battery 1276. In some examples, the power block 1280 may be replaced with a wireless power receiver to obtain the power wirelessly, for example, through a loop antenna in the edge computing node 1250. A wireless battery charging circuit, such as an LTC4020 chip from Linear Technologies of Milpitas, California, among others, may be included in the battery monitor/charger 1278. The specific charging circuits may be selected based on the size of the battery 1276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1258 may include instructions 1283 in the form of software, firmware, or hardware commands to implement the techniques described herein. Although such instructions 1283 are shown as code blocks included in the memory 1254 and the storage 1258, it may be understood that any of the code blocks may be replaced with hardwired circuits, for example, built into an application specific integrated circuit (ASIC).

In an example, the instructions 1281, 1282, 1283 provided via the memory 1254, the storage 1258, or the processor 1252 may be embodied as a non-transitory, machine-readable medium 1260 including code to direct the processor 1252 to perform electronic operations in the edge computing node 1250. The processor 1252 may access the non-transitory, machine-readable medium 1260 over the IX 1256. For instance, the non-transitory, machine-readable medium 1260 may be embodied by devices described for the storage 1258 or may include specific storage units such as optical disks, flash drives, or any number of other hardware devices. The non-transitory, machine-readable medium 1260 may include instructions to direct the processor 1252 to perform a specific sequence or flow of actions, for example, as described with respect to the flowchart(s) and block diagram (s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, and/or the like), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, and/or the like) on one or several remote servers. The source code packages may be encrypted when in transit over a network and decrypted, uncompressed, assembled (e.g., linked) if necessary, and compiled or interpreted (e.g., into a library, stand-alone executable, and/or the like) at a local machine, and executed by the local machine.

The illustrations of FIGS. 9-12 is intended to depict a high-level view of components of a varying device, subsystem, or arrangement of an edge computing node. However, some of the components shown may be omitted, additional components may be present, and a different arrangement of the components may occur in other implementations. Further, these arrangements are usable in a variety of use cases and environments, including those discussed herein (e.g., a mobile UE in industrial compute for smart city or smart factory, among many other examples). The compute platform of FIG. 12 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

At least one of the systems or components set forth in one or more of the preceding figures may be configurable or operable to perform one or more operations, techniques, processes, and/or methods as set forth in the example section below.

7. Implementation Examples

Example 1 includes a method of operating a Vulnerable Road User (VRU) Basic Service (VBS) facility of an originating Intelligent Transportation System Station (ITS-S), the method comprising: detecting a VRU Awareness Message (VAM) generation event; generating a VAM in response to detecting the VAM generation event; and sending the generated VAM.

Example 2 includes the method of example 1, wherein a minimum time elapsed between a start of consecutive VAM generation events is equal to or larger than a time for generating a VAM (T_GenVam) parameter, wherein T_GenVam is between a minimum time for generating a VAM (T_GenVamMin) parameter and a maximum time for generating a VAM (T_GenVamMax) parameter.

Example 3 includes the method of example 1, wherein the VBS comprises a VBS management entity, and the method further comprises: operating the VBS management entity to determine a value of the T_GenVam parameter in milliseconds.

Example 4 includes the method of example 3, further comprising: setting the T_GenVam parameter to a value of the T_GenVamMax parameter when the VBS management entity provides a value for the T_GenVam parameter that is greater than the value of the T_GenVamMax parameter; setting the T_GenVam parameter to a value of the T_GenVamMin parameter when the VBS management entity provides a value for the T_GenVam parameter that is lower than the value of the T_GenVamMin parameter; and setting the T_GenVam parameter to the value of the T_GenVamMin parameter when the VBS management entity does not provide a value for the T_GenVam parameter.

Example 5 includes the method of any one of examples 1-4, wherein the VAM generation event includes activation of the VBS.

Example 6 includes the method of any one of examples 1-5, wherein the VAM generation event includes: entering a VRU-ACTIVE-STANDALONE state from a VRU-IDLE VBS state; entering in VRU-ACTIVE-STANDALONE VBS state from a VRU-PASSIVE VBS state in response to determining to leave a VRU cluster; entering the VRU-ACTIVE-STANDALONE VBS state from the VRU-PAS- SIVE VBS state in response to determining that a VRU cluster leader of the VRU cluster is lost; or entering the VRU-ACTIVE-STANDALONE VBS state from a VRU-ACTIVE-CLUSTER-LEADER VBS state in response to determining to break up the VRU cluster and transmitting a VRU cluster VAM with a disband indication.

Example 7 includes the method of any one of examples 1-6, further comprising: generating a consecutive VAM as part of the detected VAM generation event; and causing transmission of the generated VAM.

Example 8 includes the method of example 7, wherein generating the consecutive VAM comprises: generating the consecutive VAM when at least one condition of a plurality of conditions is met, wherein the plurality of conditions include: when a time elapsed since a last time a VAM was transmitted exceeds T_GenVamMax; when a Euclidian absolute distance between a current estimated position of a reference point of the originating ITS-S and an estimated position of a reference point previously included in a VAM exceeds a first predefined threshold; when a difference between a current estimated ground speed of the reference point of the originating ITS-S and an estimated absolute speed of the reference point of the originating ITS-S previously included in a VAM exceeds a second predefined threshold; when a difference between an orientation of a vector of a current estimated ground velocity of the reference point of the VRU and an estimated orientation of a vector of the ground velocity of the reference point of the originating ITS-S previously included in a VAM exceeds a third predefined threshold; when a difference between a current estimated trajectory interception probability with one or more vehicles or one or more other VRUs and a trajectory interception probability with previously reported vehicles or VRUs in a VAM exceeds a fourth predefined threshold; when the originating ITS-S is a VRU in a VRU-ACTIVE-STANDALONE VBS state and has decided to join a VRU cluster after a previous VAM transmission; and when the originating ITS-S is a VRU and has determined that one or more vehicles or one or more other VRUs have, after a previous VAM transmission: moved closer than minimum safe lateral distance (MSLaD) laterally, moved closer than minimum safe longitudinal distance (MSLoD) longitudinally, or moved closer than minimum safe vertical distance (MSVD) vertically.

Example 9 includes the method of example 7, wherein the consecutive VAM is a cluster VAM and generating the consecutive VAM comprises: generating the consecutive VAM when at least one condition of a plurality of conditions is met, wherein the plurality of conditions include: when a time elapsed since a last time a VRU cluster VAM was transmitted exceeds T_GenVamMax; when a Euclidian absolute distance between a current estimated position of a reference point of a VRU cluster and an estimated position of a reference point previously included in a VRU cluster VAM exceeds a first predefined threshold; when a difference between a current estimated distance from a cluster boundary and an estimated distance based on a previously transmitted VAM exceeds a second predefined threshold; when a difference between a current estimated ground speed of the reference point of the VRU cluster and an estimated absolute speed of the reference point previously included a VRU cluster VAM exceeds a third predefined threshold; when a difference between an orientation of a vector of the current estimated ground velocity of the reference point of the VRU cluster and an estimated orientation of the vector of the ground velocity of the reference point previously included in a VRU cluster VAM exceeds a fourth predefined threshold; when a VRU cluster leader has determined that there is difference between a current estimated trajectory interception probability with one or more vehicles or one or more VRUs and a trajectory interception probability with the one or more vehicles or the one or more VRUs previously reported in a cluster VAM exceeds a sixth predefined threshold; when a VRU cluster type has been changed after a previous VAM generation event; when the VRU cluster leader has determined to break up the VRU cluster after transmission of a previous VRU cluster VAM; when a number of VRUs have joined the VRU cluster after transmission of the previous VRU cluster VAM; when a number of VRUs have left the VRU cluster after transmission of the previous VRU cluster VAM; and when the VRU cluster leader has determined that one or more vehicles or VRUs not belonging to the VRU cluster have, after the previous VRU cluster VAM: moved closer than a minimum safe lateral distance (MSLaD) laterally, moved closer than a minimum safe longitudinal distance (MSLoD) longitudinally, and moved closer than a minimum safe vertical distance (MSVD) vertically to a VRU cluster bounding box Example 10 includes the method of any one of examples 7-9, further comprising: skipping generation or transmission of the consecutive VAM when a set of VAM mitigation techniques are met.

Example 11 includes the method of example 10, wherein the set of VAM mitigation techniques include: when a time elapsed since a last time a VAM was transmitted by the originating ITS-S does not exceed a predetermined number times T_GenVamMax; a Euclidian absolute distance between a current estimated position of a reference point of the originating ITS-S and an estimated position of a reference point in a received VAM from a peer ITS-S is less than a first threshold; a difference between a current estimated speed of the reference point of the originating ITS-S and an estimated absolute speed of the reference point in received VAM from the peer ITS-S is less than a second threshold; and a difference between an orientation of a vector of a current estimated ground velocity and an estimated orientation of a vector of a ground velocity of the reference point in the received VAM from the peer ITS-S is less than a third threshold.

Example 12 includes the method of any one of examples 1-11, wherein generating the VAM further comprises: generating the VAM within a predefined VAM assembly time, wherein the predefined VAM assembly time is a time difference between a time at which the VAM generation event is triggered and a time at which the generated VAM is delivered to a networking and transport layer of the originating ITS-S for transmission.

Example 13 includes the method of example 12, wherein a difference between the predefined VAM assembly time and a reference timestamp included in the generated VAM is less than 32,767 milliseconds Example 14 includes the method of any one of examples 1-13, wherein the originating ITS-S is a non-VRU ITS-S, and detecting occurrence of the VAM generation event comprises: detecting at least one VRU from which the non-VRU ITS-S has not received any VAMs for at least a VAM transmission duration; generating a VAM in response to detecting the at least one VRU; and causing transmission of the generated VAM.

Example 15 includes the method of example 14, wherein detecting the at least one VRU comprises: perceiving a location of the at least one VRU.

Example 16 includes the method of example 15, wherein generating the VAM further comprises: generating the VAM when the perceived location of the detected at least one VRU is outside a bounding box of a VRU cluster specified in any received VRU cluster VAMs during a previous VAM transmission duration.

Example 17 includes the method of example 15 or 16, wherein generating the VAM further comprises: generating the VAM when the detected no VRU is indicated by any VAMs received during a previous VAM transmission duration.

Example 18 includes the method of any one of examples 15-17, wherein generating the VAM further comprises: generating the VAM when the detected at least one VRU is outside a bounding box of a VRU cluster to be indicated in the generated VAM.

Example 19 includes the method of example 18, wherein generating the VAM further comprises: generating the VAM when the detected at least one VRU has been detected after a previous VAM generation event.

Example 20 includes the method of example 18 or 19, wherein generating the VAM further comprises: generating the VAM when a time elapsed since a last time the detected at least one VRU was indicated in a VAM exceeds a threshold amount of time.

Example 21 includes the method of any one of examples 18-20, wherein generating the VAM further comprises: generating the VAM when an Euclidian absolute distance between a current estimated position of a reference point for the detected at least one VRU and an estimated position of the reference point for the detected at least one VRU previously indicated in a VAM exceeds a predetermined threshold.

Example 22 includes the method of example 21, wherein generating the VAM further comprises: generating the VAM when a difference between a current estimated ground speed of the reference point for the detected at least one VRU and an estimated absolute speed of the reference point for the detected at least one VRU previously indicated in a VAM exceeds a predetermined threshold.

Example 23 includes the method of example 21 or 22, wherein generating the VAM further comprises: generating the VAM when a difference between an orientation of a vector of a current estimated ground velocity of the reference point for the detected at least one VRU and an estimated orientation of a vector of a ground velocity of the reference point for the detected at least one VRU previously indicated by a VAM exceeds a predetermined threshold.

Example 24 includes the method of any one of examples 21-23, wherein generating the VAM further comprises: determining a difference between a current estimated trajectory interception indication (TII) of the detected at least one VRU with an object and a TII of the detected at least one VRU with an object reported in a previous VAM; and generating the VAM when the determined difference is greater than a predetermined threshold.

Example 25 includes the method of any one of examples 18-24, wherein generating the VAM further comprises: generating the VAM when, after a previously transmitted VAM, one or more vehicle ITS-Ss or one or more other VRUs are: moving closer to the detected at least one VRU than a minimum safe lateral distance (MSLaD) laterally, moving closer to the detected at least one VRU than a minimum safe longitudinal distance (MSLoD) longitudinally, and moving closer to the detected at least one VRU than a minimum safe vertical distance (MSVD) vertically to the VRU.

Example 26 includes the method of any one of examples 14-25, wherein generating the VAM comprises: determining a set of VRUs or VRU clusters for reporting the VAM; generating the VAM to include a VAM extension container, the VAM extension container to include a first container and a second container, the first container indicating a total individual VRUs in the set of VRUs, and the second container indicating a total VRU clusters reported; and causing transmission of the generated VAM.

Example 27 includes the method of example 26, wherein the VAM extension container further includes, for each VRU or VRU cluster of the set of VRUs or VRU clusters, respective VRU low frequency containers, respective VRU high frequency containers, respective cluster information containers, respective cluster operation containers, and respective motion prediction containers.

Example 28 includes a Vehicle Intelligent Transport System Station (V-ITS-S) comprising: communication circuitry; and processor circuitry communicatively coupled with the communication circuitry, the processor circuitry arranged to perform the method of any one of examples 1-27.

Example 29 includes a Roadside Intelligent Transport System Station (R-ITS-S) comprising: interface circuitry, the interface circuitry arranged to communicatively couple the R-ITS-S with one or more remote radio units; and processor circuitry communicatively coupled with the interface circuitry, the processor circuitry arranged to perform the method of any one of examples 1-27.

Example 30 includes a Vulnerable Road User (VRU) Intelligent Transport System Station (ITS-S) comprising: communication circuitry; and processor circuitry communicatively coupled with the communication circuitry, the processor circuitry arranged to perform the method of any one of examples 1-27.

Example 31 includes one or more computer readable media comprising instructions, wherein execution of the instructions by processor circuitry is to cause the processor circuitry to perform the method of any one of examples 1-27.

Example 32 includes a computer program comprising the instructions of example 31.

Example 33 includes an Application Programming Interface defining functions, methods, variables, data structures, and/or protocols for the computer program of example 30.

Example 34 includes an apparatus comprising circuitry loaded with the instructions of example 31.

Example 35 includes an apparatus comprising circuitry operable to run the instructions of example 31.

Example 36 includes an integrated circuit comprising one or more of the processor circuitry of example 31 and the one or more computer readable media of example 30.

Example 37 includes a computing system comprising the one or more computer readable media and the processor circuitry of example 31.

Example 38 includes an apparatus comprising means for executing the instructions of example 31.

Example 39 includes a signal generated as a result of executing the instructions of example 31.

Example 40 includes a data unit generated as a result of executing the instructions of example 31.

Example 41 includes the data unit of example 34, wherein the data unit is a datagram, network packet, data frame, data segment, a PDU, a service data unit, "SDU", a message, or a database object.

Example 42 includes a signal encoded with the data unit of example 40 or 41.

Example 43 includes an electromagnetic signal carrying the instructions of example 31.

Example 44 includes an apparatus comprising means for performing the method of any one of examples 1-27.

An example implementation includes a Multi-access Edge Computing (MEC) host executing a service as part of one or more MEC applications instantiated on a virtualization infrastructure, the service being related to any of examples 1-44 or portions thereof and/or some other example(s) herein, and wherein the MEC host is configurable or operable to operate according to a standard from one or more ETSI MEC standards families.

An example implementation is an edge computing system, including respective edge processing devices and nodes to invoke or perform the operations of examples A01-A31, B01-B17, and C01-008, or other subject matter described herein. Another example implementation is a client endpoint node, operable to invoke or perform the operations of examples A01-A31, B01-B17, and C01-008, or other subject matter described herein. Another example implementation is an aggregation node, network hub node, gateway node, or core data processing node, within or coupled to an edge computing system, operable to invoke or perform the operations of examples 1-44, or other subject matter described herein. Another example implementation is an access point, base station, road-side unit, street-side unit, or on-premise unit, within or coupled to an edge computing system, operable to invoke or perform the operations of examples 1-44, or other subject matter described herein. Another example implementation is an edge provisioning node, service orchestration node, application orchestration node, or multi-tenant management node, within or coupled to an edge computing system, operable to invoke or perform the operations of examples 1-44, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of examples 1-44, or other subject matter described herein. Another example implementation is an edge computing system operable as an edge mesh, as an edge mesh with side car loading, or with mesh-to-mesh communications, operable to invoke or perform the operations of examples 1-44, or other subject matter described herein. Another example implementation is an edge computing system including network functions, acceleration functions, acceleration hardware, storage hardware, or computation hardware resources, operable to invoke or perform the use cases discussed herein, with use of examples 1-44, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples 1-44, or other subject matter described herein. Another example implementation is an edge computing system adapted for mobile wireless communications, including configurations according to an 3GPP 4G/LTE or 5G network capabilities, operable to invoke or perform the use cases discussed herein, with use of examples A01-A31, B01-B17, and C01-C08, and/or other subject matter described herein. Another example implementation is an edge computing system adapted for supporting xApps and operating according to O-RAN specifications, operable to invoke or perform the use cases discussed herein, with use of examples 1-44, or other subject matter described herein. Another example implementation is an edge computing system adapted for operating according to Open Visual Inference and Neural network Optimization (OpenVINO) specifications, operable to invoke or perform the use cases discussed herein, with use of examples 1-44, or other subject matter described herein. Another example implementation is an edge computing system adapted for operating according to OpenNESS specifications, operable to invoke or perform the use cases discussed herein, with use of examples 1-44, or other subject matter described herein. Another example implementation is an edge computing system adapted for operating according to a Smart Edge computing framework, operable to invoke or perform the use cases discussed herein, with use of examples 1-44, or other subject matter described herein.

Any of the above-described examples and/or example implementations may be combined with any other example (or combination of examples), unless explicitly stated otherwise.

8. Terminology

The terminology used herein is not intended to be limiting of the disclosure. The present disclosure has been described with reference to flowchart illustrations and/or block diagrams of methods, apparatus (systems), and/or computer program products. In the drawings, some structural or method features may be shown in specific arrangements and/or orderings. However, it should be appreciated that such specific arrangements and/or orderings may not be required. Rather, such features may be arranged in a different manner and/or order than shown in the illustrative figures. Additionally, the inclusion of a structural or method feature in a particular figure is not meant to imply that such feature is required and may not be included or may be combined with other features.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, and/or the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, and/or the like, or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, and/or the like). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a stand-alone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and/or the like. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and/or the like), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, and/or the like. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, and/or the like, during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, and/or the like), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" or "NFV" indicates the migration of NFs from embedded services inside proprietary hardware appliances to software-based virtualized NFs (or VNFs) running on standardized CPUs using industry standard virtualization and cloud computing technologies. In some aspects, NFV processing and data storage will occur at the edge data centers that are connected directly to the local cellular site, within the infrastructure edge. As used herein, the term "virtualized network function" or "VNF" indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some aspect of services or resources in an edge computing setting.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used for purposes of the present disclosure include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, and/or the like) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, and/or the like), V2X communication technologies (including C-V2X), Dedicated Short Range Communications (DSRC) communication systems such as Intelligent-Transport-Systems (ITS) including the European ITS-G5, ITS-GSB, ITS-GSC, and/or the like. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "interoperability" refers to the ability of UEs and/or stations, such as ITS-Ss including vehicle ITS-Ss (V-ITS-Ss), roadside ITS-Ss (R-ITS-Ss), and VRU ITS-Ss utilizing one RAT to communicate with other stations utilizing another RAT. The term "Coexistence" refers to sharing or allocating radiofrequency resources among stations/UEs using either vehicular communication system.

The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element (s) that integrate local data by utilizing a combination of localized network(s) and distributed computation.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, and/or the like, and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements.

The term "ego" used with respect to an element or entity, such as "ego ITS-S" or the like, refers to an ITS-S that is under consideration, the term "ego vehicle" refers to a vehicle embedding an ITS-S being considered, and the term "neighbors" or "proximity" used to describe elements or entities refers to other ITS-Ss different than the ego ITS-S and/or ego vehicle.

The term "Geo-Area" refers to one or more geometric shapes such as circular areas, rectangular areas, and elliptical areas. A circular Geo-Area is described by a circular shape with a single point A that represents the center of the circle and a radius r. The rectangular Geo-Area is defined by a rectangular shape with a point A that represents the center of the rectangle and a parameter a which is the distance between the center point and the short side of the rectangle (perpendicular bisector of the short side, a parameter b which is the distance between the center point and the long side of the rectangle (perpendicular bisector of the long side, and a parameter θ which is the azimuth angle of the long side of the rectangle. The elliptical Geo-Area is defined by an elliptical shape with a point A that represents the center of the rectangle and a parameter a which is the length of the long semi-axis, a parameter b which is the length of the short semi-axis, and a parameter θ which is the azimuth angle of the long semi-axis. An ITS-S can use a function F to determine whether a point P(x,y) is located inside, outside, at the center, or at the border of a geographical area. The function F(x,y) assumes the canonical form of the geometric shapes: The Cartesian coordinate system has its origin in the center of the shape. Its abscissa is parallel to the long side of the shapes. Point P is defined relative to this coordinate system. The various properties and other aspects of function F(x,y) are discussed in ETSI EN 302 931 v1.1.1 (2011-07).

The term "Interoperability" refers to the ability of ITS-Ss utilizing one communication system or RAT to communicate with other ITS-Ss utilizing another communication system or RAT. The term "Coexistence" refers to sharing or allocating radiofrequency resources among ITS-Ss using either communication system or RAT.

The term "ITS data dictionary" refers to a repository of DEs and DFs used in the ITS applications and ITS facilities layer. The term "ITS message" refers to messages exchanged at ITS facilities layer among ITS stations or messages exchanged at ITS applications layer among ITS stations.

The term "Collective Perception" or "CP" refers to the concept of sharing the perceived environment of an ITS-S based on perception sensors, wherein an ITS-S broadcasts information about its current (driving) environment. CP is the concept of actively exchanging locally perceived objects between different ITS-Ss by means of a V2X RAT. CP decreases the ambient uncertainty of ITS-Ss by contributing information to their mutual FoVs. The term "Collective Perception basic service" (also referred to as CP service (CPS)) refers to a facility at the ITS-S facilities layer to receive and process CPMs, and generate and transmit CPMs. The term "Collective Perception Message" or "CPM" refers to a CP basic service PDU. The term "Collective Perception data" or "CPM data" refers to a partial or complete CPM payload. The term "Collective Perception protocol" or "CPM protocol" refers to an ITS facilities layer protocol for the operation of the CPM generation, transmission, and reception. The term "CP object" or "CPM object" refers to aggregated and interpreted abstract information gathered by perception sensors about other traffic participants and obstacles. CP/CPM Objects can be represented mathematically by a set of variables describing, amongst other, their dynamic state and geometric dimension. The state variables associated to an object are interpreted as an observation for a certain point in time and are therefore always accompanied by a time reference. The term "Environment Model" refers to a current representation of the immediate environment of an ITS-S, including all perceived objects perceived by either local perception sensors or received by V2X. The term "object", in the context of the CP Basic Service, refers to the state space representation of a physically detected object within a sensor's perception range. The term "object list" refers to a collection of objects temporally aligned to the same timestamp.

The term "ITS Central System" refers to an ITS system in the backend, for example, traffic control center, traffic management center, or cloud system from road authorities, ITS application suppliers or automotive OEMs (see e.g., clause 4.5.1.1 of [EN302665]).

The term "personal ITS-S" refers to an ITS-S in a nomadic ITS sub-system in the context of a portable device (e.g., a mobile device of a pedestrian).

The term "vehicle" may refer to road vehicle designed to carry people or cargo on public roads and highways such as AVs, busses, cars, trucks, vans, motor homes, and motorcycles; by water such as boats, ships, and/or the like; or in the air such as airplanes, helicopters, UAVs, satellites, and/or the like.

The term "sensor measurement" refers to abstract object descriptions generated or provided by feature extraction algorithm(s), which may be based on the measurement principle of a local perception sensor mounted to an ITS-S. The feature extraction algorithm processes a sensor's raw data (e.g., reflection images, camera images, and/or the like) to generate an object description. The term "State Space Representation" is a mathematical description of a detected object, which includes state variables such as distance, speed, object dimensions, and the like. The state variables associated with/to an object are interpreted as an observation for a certain point in time, and therefore, are accompanied by a time reference.

The term "maneuvers" or "manoeuvres" refer to specific and recognized movements bringing an actor, e.g., pedestrian, vehicle or any other form of transport, from one position to another within some momentum (velocity, velocity variations and vehicle mass). The term "Maneuver Coordination" or "MC" refers to the concept of sharing, by means of a V2X RAT, an intended movement or series of intended movements of an ITS-S based on perception sensors, planned trajectories, and the like, wherein an ITS-S broadcasts information about its current intended maneuvers. The term "Maneuver Coordination basic service" (also referred to as Maneuver Coordination Service (MCS)) refers to a facility at the ITS-S facilities layer to receive and process MCMs, and generate and transmit MCMs. The term "Maneuver Coordination Message" or "MCM" refers to an MC basic service PDU. The term "Maneuver Coordination data" or "MCM data" refers to a partial or complete MCM payload. The term "Maneuver Coordination protocol" or "MCM protocol" refers to an ITS facilities layer protocol for the operation of the MCM generation, transmission, and reception. The term "MC object" or "MCM object" refers to aggregated and interpreted abstract information gathered by perception sensors about other traffic participants and obstacles, as well as information from applications and/or services operated or consumed by an ITS-S.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and/or the like). Furthermore, various standards (e.g., 3GPP, ETSI, and/or the like) may define various message formats, PDUs, containers, frames, and/or the like, as comprising a sequence of optional or mandatory data elements (DEs), data frames (DFs), information elements (IEs), and/or the like. However, it should be understood that the requirements of any particular standard should not be construed as limiting, and as such, any combination of containers, frames, DFs, DEs, IEs, values, actions, and/or features are possible in various implementations, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements The subject matter referred to herein, individually and/or collectively, merely for convenience and without intending to voluntarily limit the scope of the invention to any single disclosed implementation. This disclosure is intended to cover any and all adaptations or variations of the shown and described implementations. Combinations of the disclosed implementations and other implementations not specifically described herein will be apparent to those of skill in the art upon reviewing the present disclosure. Therefore, the present disclosure is not to be taken in a limiting sense. The scope of the invention is set out in the appended set of claims, along with the full range of equivalents to which such claims are entitled.

The invention claimed is:

1. An apparatus in an originating Intelligent Transportation System Station (ITS-S), the apparatus comprising:

memory circuitry to store instructions of a Vulnerable Road User (VRU) Basic Service (VBS) facility; and processor circuitry connected to the memory circuitry, wherein the processor circuitry is to operate the VBS to reduce VRU Awareness Message (VAM) overhead by:

detect a VAM generation event, generate a VAM in response to detecting the VAM generation event, cause the generated VAM to be transmitted or broadcasted; and skip generation or transmission of a consecutive VAM when a set of VAM mitigation techniques is met.

2. The apparatus of claim 1, wherein a minimum time elapsed between a start of consecutive VAM generation events is equal to or larger than a time for generating a VAM (T_GenVam) parameter, wherein T_GenVam is between a minimum time for generating a VAM (T_GenVamMin) parameter and a maximum time for generating a VAM (T_GenVamMax) parameter.

3. The apparatus of claim 2, wherein the VBS includes a VBS management entity, and the processor circuitry is to operate the VBS management entity to:

determine a value of the T_GenVam parameter in milliseconds.

4. The apparatus of claim 3, wherein the processor circuitry is to operate the VBS to:

set the T_GenVam parameter to a value of the T_GenVamMax parameter when the VBS management entity provides a value for the T_GenVam parameter that is greater than the value of the T_GenVamMax parameter;

set the T_GenVam parameter to a value of the T_GenVamMin parameter when the VBS management entity provides a value for the T_GenVam parameter that is lower than the value of the T_GenVamMin parameter; and set the T_GenVam parameter to the value of the T_GenVamMin parameter when the VBS management entity does not provide a value for the T_GenVam parameter.

5. The apparatus of claim 1, wherein the VAM generation event includes at least one of:

activation of the VBS;

entering or deciding to enter a VRU-ACTIVE-STANDALONE state from a VRU-IDLE VBS state;

entering or deciding to enter in VRU-ACTIVE-STANDALONE VBS state from a VRU-PASSIVE VBS state in response to determining to leave a VRU cluster;

entering or deciding to enter the VRU-ACTIVE-STANDALONE VBS state from the VRU-PASSIVE VBS state in response to determining that a VRU cluster leader of the VRU cluster is lost; or entering or deciding to enter the VRU-ACTIVE-STANDALONE VBS state from a VRU-ACTIVE-CLUSTER-LEADER VBS state in response to determining to break up the VRU cluster and transmitting a VRU cluster VAM with a disband indication.

6. The apparatus of claim 1, wherein the processor circuitry is to operate the VBS to:

generate the consecutive VAM as part of the detected VAM generation event; and cause transmission of the consecutive VAM.

7. The apparatus of claim 6, wherein, to generate the consecutive VAM, the processor circuitry is to operate the VBS to:

generate the consecutive VAM when at least one condition of a plurality of conditions is met, wherein the plurality of conditions include:

when a time elapsed since a last time a VAM was transmitted exceeds T_GenVamMax;

when a Euclidian absolute distance between a current estimated position of a reference point of the originating ITS-S and an estimated position of a reference point previously included in a VAM exceeds a first predefined threshold;

when a difference between a current estimated ground speed of the reference point of the originating ITS-S and an estimated absolute speed of the reference point of the originating ITS-S previously included in a VAM exceeds a second predefined threshold; and when a difference between an orientation of a vector of a current estimated ground velocity of the reference point of the VRU and an estimated orientation of a vector of the ground velocity of the reference point of the originating ITS-S previously included in a VAM exceeds a third predefined threshold.

8. The apparatus of claim 7, wherein the plurality of conditions further include:

when a difference between a current estimated trajectory interception probability with one or more vehicles or one or more other VRUs and a trajectory interception probability with previously reported vehicles or VRUs in a VAM exceeds a fourth predefined threshold;

when the originating ITS-S is a VRU in a VRU-ACTIVE-STANDALONE VBS state and has decided to join a VRU cluster after a previous VAM transmission; and when the originating ITS-S is a VRU and has determined that one or more vehicles or one or more other VRUs have, after a previous VAM transmission: moved closer than minimum safe lateral distance (MSLaD) laterally, moved closer than minimum safe longitudinal distance (MSLoD) longitudinally, or moved closer than minimum safe vertical distance (MSVD) vertically.

9. The apparatus of claim 7, wherein, when the consecutive VAM is a cluster VAM, the plurality of conditions include:

when a time elapsed since a last time a VRU cluster VAM was transmitted exceeds T_GenVamMax;

when a Euclidian absolute distance between a current estimated position of a reference point of a VRU cluster and an estimated position of a reference point previously included in a VRU cluster VAM exceeds a first predefined threshold;

when a difference between a current estimated distance from a cluster boundary and an estimated distance based on a previously transmitted VAM exceeds a second predefined threshold;

when a difference between a current estimated ground speed of the reference point of the VRU cluster and an estimated absolute speed of the reference point previously included a VRU cluster VAM exceeds a third predefined threshold; and when a difference between an orientation of a vector of the current estimated ground velocity of the reference point of the VRU cluster and an estimated orientation of the vector of the ground velocity of the reference point previously included in a VRU cluster VAM exceeds a fourth predefined threshold.

10. The apparatus of claim 9, wherein the plurality of conditions further include:

when a VRU cluster leader has determined that there is difference between a current estimated trajectory interception probability with one or more vehicles or one or more VRUs and a trajectory interception probability with the one or more vehicles or the one or more VRUs previously reported in a cluster VAM exceeds a sixth predefined threshold;

when a VRU cluster type has been changed after a previous VAM generation event;

when the VRU cluster leader has determined to break up the VRU cluster after transmission of a previous VRU cluster VAM;

when a number of VRUs have joined the VRU cluster after transmission of the previous VRU cluster VAM;

when a number of VRUs have left the VRU cluster after transmission of the previous VRU cluster VAM; and when the VRU cluster leader has determined that one or more vehicles or VRUs not belonging to the VRU cluster have, after the previous VRU cluster VAM: moved closer than a minimum safe lateral distance (MSLaD) laterally, moved closer than a minimum safe longitudinal distance (MSLoD) longitudinally, and moved closer than a minimum safe vertical distance (MSVD) vertically to a VRU cluster bounding box.

11. The apparatus of claim 6, wherein the set of VAM mitigation techniques include:

when a time elapsed since a last time a VAM was transmitted by the originating ITS-S does not exceed a predetermined number times T_GenVamMax;

a Euclidian absolute distance between a current estimated position of a reference point of the originating ITS-S and an estimated position of a reference point in a received VAM from a peer ITS-S is less than a first threshold;

a difference between a current estimated speed of the reference point of the originating ITS-S and an estimated absolute speed of the reference point in received VAM from the peer ITS-S is less than a second threshold; and a difference between an orientation of a vector of a current estimated ground velocity and an estimated orientation of a vector of a ground velocity of the reference point in the received VAM from the peer ITS-S is less than a third threshold.

12. The apparatus of claim 1, wherein, to generate the VAM, the processor circuitry is to operate the VBS to:

generate the VAM within a predefined VAM assembly time, wherein the predefined VAM assembly time is a time difference between a time at which the VAM generation event is triggered and a time at which the generated VAM is delivered to a networking and transport layer of the originating ITS-S for transmission.

13. The apparatus of claim 12, wherein a difference between the predefined VAM assembly time and a reference timestamp included in the generated VAM is less than 32,767 milliseconds.

14. The apparatus of claim 1, wherein the originating ITS-S is a VRU ITS-S or a non-VRU ITS-S.

15. One or more non-transitory computer readable media comprising instructions of a Vulnerable Road User (VRU) Basic Service (VBS) facility, wherein execution of the instructions by one or more processors of a non-Vulnerable Road User (VRU) Intelligent Transportation System Station (ITS-S) is to cause the non-VRU ITS-S to:

detect at least one VRU from which the non-VRU ITS-S has not received any VRU Awareness Messages (VAMs) for at least a VAM transmission duration;

generate a VAM in response to the detection of the at least one VRU;

cause transmission of the generated VAM; and skip generation or transmission of a consecutive VAM when a set of VAM mitigation techniques is met to reduce VAM overhead.

16. The one or more NTCRM of claim 15, wherein, to detect the at least one VRU, execution of the instructions is to cause the non-VRU ITS-S to:

perceive a location of the at least one VRU.

17. The one or more NTCRM of claim 16, wherein, to generate the VAM, execution of the instructions is to cause the non-VRU ITS-S to:

generate the VAM when the perceived location of the detected at least one VRU is outside a bounding box of a VRU cluster specified in any received VRU cluster VAMs during a previous VAM transmission duration.

18. The one or more NTCRM of claim 16, wherein, to generate the VAM, execution of the instructions is to cause the non-VRU ITS-S to:

generate the VAM when the detected no VRU is indicated by any VAMs received during a previous VAM transmission duration.

19. The one or more NTCRM of claim 16, wherein, to generate the VAM, execution of the instructions is to cause the non-VRU ITS-S to:

generate the VAM when the detected at least one VRU is outside a bounding box of a VRU cluster to be indicated in the generated VAM.

20. The one or more NTCRM of claim 19, wherein, to generate the VAM, execution of the instructions is to cause the non-VRU ITS-S to:

generate the VAM when the detected at least one VRU has been detected after a previous VAM generation event.

21. The one or more NTCRM of claim 19, wherein, to generate the VAM, execution of the instructions is to cause the non-VRU ITS-S to:

generate the VAM when a time elapsed since a last time the detected at least one VRU was indicated in a VAM exceeds a threshold amount of time.

22. The one or more NTCRM of claim 19, wherein, to generate the VAM, execution of the instructions is to cause the non-VRU ITS-S to:

generate the VAM when an Euclidian absolute distance between a current estimated position of a reference point for the detected at least one VRU and an estimated position of the reference point for the detected at least one VRU previously indicated in a VAM exceeds a predetermined threshold.

23. The one or more NTCRM of claim 22, wherein, to generate the VAM, execution of the instructions is to cause the non-VRU ITS-S to:

generate the VAM when a difference between a current estimated ground speed of the reference point for the detected at least one VRU and an estimated absolute speed of the reference point for the detected at least one VRU previously indicated in a VAM exceeds a predetermined threshold.

24. The one or more NTCRM of claim 22, wherein, to generate the VAM, execution of the instructions is to cause the non-VRU ITS-S to:

generate the VAM when a difference between an orientation of a vector of a current estimated ground velocity of the reference point for the detected at least one VRU and an estimated orientation of a vector of a ground velocity of the reference point for the detected at least one VRU previously indicated by a VAM exceeds a predetermined threshold.

25. The one or more NTCRM of claim 22, wherein, to generate the VAM, execution of the instructions is to cause the non-VRU ITS-S to:

determine a difference between a current estimated trajectory interception indication (TII) of the detected at least one VRU with an object and a TII of the detected at least one VRU with an object reported in a previous VAM; and generate the VAM when the determined difference is greater than a predetermined threshold.

26. The one or more NTCRM of claim 19, wherein, to generate the VAM, execution of the instructions is to cause the non-VRU ITS-S to:

generate the VAM when, after a previously transmitted VAM, one or more vehicle ITS-Ss or one or more other VRUs are:

detected or determined to be moving closer to the detected at least one VRU than a minimum safe lateral distance (MSLaD) laterally, detected or determined to be moving closer to the detected at least one VRU than a minimum safe longitudinal distance (MSLoD) longitudinally, and detected or determined to be moving closer to the detected at least one VRU than a minimum safe vertical distance (MSVD) vertically to the VRU.

27. The one or more NTCRM of claim 15, wherein the non-VRU ITS-S is a Vehicle ITS-S(V-ITS-S) or a Roadside ITS-S(R-ITS-S).

28. A method of operating a Vulnerable Road User (VRU) Basic Service (VBS) facility of a non-Vulnerable Road User (VRU) Intelligent Transportation System Station (ITS-S), the method comprising:

determining a set of VRUs or VRU clusters for reporting a VRU Awareness Message (VAM);

generating the VAM to include a VAM extension container, the VAM extension container to include a first container and a second container, wherein the first container indicates a total individual VRUs in the set of VRUs and the second container indicates a total VRU clusters reported;

causing transmission of the generated VAM; and skipping generation or transmission of a consecutive VAM when a set of VAM mitigation techniques is met to reduce VAM overhead.

29. The method of claim 28, wherein the VAM extension container further includes, for each VRU or VRU cluster of the set of VRUs or VRU clusters, respective VRU low frequency containers, respective VRU high frequency containers, respective cluster information containers, respective cluster operation containers, and respective motion prediction containers.

* * * * *